(12) United States Patent
Hosaka

(10) Patent No.: US 10,171,228 B2
(45) Date of Patent: Jan. 1, 2019

(54) RECEIVING CIRCUIT, ELECTRONIC DEVICE, TRANSMISSION/RECEPTION SYSTEM, AND RECEIVING CIRCUIT CONTROL METHOD

(71) Applicant: Sony Corporation, Tokyo (JP)

(72) Inventor: Hajime Hosaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/554,362

(22) PCT Filed: Feb. 2, 2016

(86) PCT No.: PCT/JP2016/053000
§ 371 (c)(1),
(2) Date: Aug. 29, 2017

(87) PCT Pub. No.: WO2016/147721
PCT Pub. Date: Sep. 22, 2016

(65) Prior Publication Data
US 2018/0041331 A1 Feb. 8, 2018

(30) Foreign Application Priority Data
Mar. 19, 2015 (JP) .................................. 2015-055544

(51) Int. Cl.
*H04L 7/00* (2006.01)
*H04L 25/49* (2006.01)
*H04L 25/02* (2006.01)

(52) U.S. Cl.
CPC .............. *H04L 7/0079* (2013.01); *H04L 7/00* (2013.01); *H04L 25/49* (2013.01); *H04L 25/02* (2013.01)

(58) Field of Classification Search
CPC combination set(s) only.
See application file for complete search history.

(56) References Cited

U.S. PATENT DOCUMENTS 5,251,079 A * 10/1993 Yamada ............. G11B 15/4678
360/77.14
6,594,004 B1 * 7/2003 Makita ............... G01M 11/3145
356/73.1

(Continued)

FOREIGN PATENT DOCUMENTS

JP 06-261092 A 9/1994
JP 2005-333508 A 12/2005

(Continued)

*Primary Examiner* — Wednel Cadeau
(74) *Attorney, Agent, or Firm* — Michael Best & Friedrich LLP

(57) ABSTRACT

In a self-synchronous transmission scheme, received data is accurately acquired. A timing signal generating unit generates timing signals indicating different timings in synchronization with a timing at which a status of a reception signal transitions. A first data signal generating unit generates a first data signal from statuses of the reception signal before and after a timing at which a predetermined first timing signal becomes a specific value, and outputs the first data signal in synchronization with a second timing signal different from the first timing signal. A second data signal generating unit generates a second data signal from statuses of the reception signal before and after a timing at which the second timing signal becomes the specific value, and outputs the second data signal in synchronization with a timing signal different from the first timing signal.

18 Claims, 55 Drawing Sheets

(56) References Cited

U.S. PATENT DOCUMENTS

| | | | | |
|---|---|---|---|---|
| 8,064,535 B2* | 11/2011 | Wiley | .................. | H04L 5/20 |
| | | | | 375/288 |
| 9,774,319 B2* | 9/2017 | Park | .................. | G01R 23/02 |
| 2009/0265490 A1* | 10/2009 | Setya | .................. | H04N 9/64 |
| | | | | 710/71 |

FOREIGN PATENT DOCUMENTS

| JP | 2010-520175 A | 6/2010 |
|---|---|---|
| JP | 2011-517159 A | 5/2011 |
| JP | 2011-517195 A | 5/2011 |

\* cited by examiner

FIG. 5

| STATUS NUMBER | RECEPTION SIGNALS A, B, C | BINARY DATA Da(A>C), Db(B>A), Dc(C>B) | INVERTED BINARY DATA DaN, DbN, DcN |
|---|---|---|---|
| 0 | +, −, 0 | 1, 0, 1 | 0, 1, 0 |
| 1 | 0, −, + | 0, 0, 1 | 1, 1, 0 |
| 2 | −, 0, + | 0, 1, 1 | 1, 0, 0 |
| 3 | −, +, 0 | 0, 1, 0 | 1, 0, 1 |
| 4 | 0, +, − | 1, 1, 0 | 0, 0, 1 |
| 5 | +, 0, − | 1, 0, 0 | 0, 1, 1 |

FIG. 7

| STATUS NUMBER | BINARY DATA Da, Db, Dc | INVERTED BINARY DATA DaN, DbN, DcN | STATUS DATA AB,CB,CA,,BA,BC,AC | INVERTED STATUS DATA ABN,CBN,CAN,,BAN, BCN,ACN |
|---|---|---|---|---|
| 0 | 1, 0, 1 | 0, 1, 0 | 1, 0, 0, 0, 0, 0 | 0, 1, 1, 1, 1, 1 |
| 1 | 0, 0, 1 | 1, 1, 0 | 0, 1, 0, 0, 0, 0 | 1, 0, 1, 1, 1, 1 |
| 2 | 0, 1, 1 | 1, 0, 0 | 0, 0, 1, 0, 0, 0 | 1, 1, 0, 1, 1, 1 |
| 3 | 0, 1, 0 | 1, 0, 1 | 0, 0, 0, 1, 0, 0 | 1, 1, 1, 0, 1, 1 |
| 4 | 1, 1, 0 | 0, 0, 1 | 0, 0, 0, 0, 1, 0 | 1, 1, 1, 1, 0, 1 |
| 5 | 1, 0, 0 | 0, 1, 1 | 0, 0, 0, 0, 0, 1 | 1, 1, 1, 1, 1, 0 |

FIG. 11

| ENABLE TERMINAL EN | ENABLE TERMINAL E | INPUT TERMINAL A | OUTPUT TERMINAL X |
|---|---|---|---|
| 0 | 1 | 0 | 1 (INVERTED OUTPUT) |
| 0 | 1 | 1 | 0 (INVERTED OUTPUT) |
| 1 | 0 | 0 | Z (INDEFINITE VALUE) |
| 1 | 0 | 1 | Z (INDEFINITE VALUE) |

FIG. 12

| G | GN | D | Q |
|---|---|---|---|
| 1 | 0 | — | HOLD INVERTED VALUE OF PREVIOUS D |
| 0 | 1 | 0 | 0 (TRANSMISSION) |
| 0 | 1 | 1 | 1 (TRANSMISSION) |

FIG. 13

| NUMBER OF STATUS TRANSITIONS | CLOCK SIGNAL Ck | CLOCK SIGNAL CkN |
|---|---|---|
| ODD-NUMBERED | 1 | 0 |
| EVEN-NUMBERED | 0 | 1 |

FIG. 16

| CLOCK TERMINAL Ck | CLOCK TERMINAL CkN | STATUS DETECTING CIRCUIT 240 | STATUS DETECTING CIRCUIT 250 |
|---|---|---|---|
| ↑ (TIMING T1) | 0 | HOLD PREVIOUS D OF T1 | — |
| 0 | ↑ (TIMING T2) | — | HOLD PREVIOUS D OF T2 |

FIG. 20

| STATUS X (TRANSITION SOURCE) | STATUS Y (TRANSITION DESTINATION) | DATA1 (3bits) |
|---|---|---|
| ABX | CBY | (1,1,0) |
| CBX | ACY | |
| CAX | BAY | |
| BAX | CBY | |
| BCX | ACY | |
| ACX | BAY | |
| ABX | CAY | (0,0,0) |
| CBX | ABY | |
| CAX | BCY | |
| BAX | CAY | |
| BCX | ABY | |
| ACX | BCY | |
| ABX | BAY | (1,0,1) |
| CBX | BCY | |
| CAX | ACY | |
| BAX | ABY | |
| BCX | CBY | |
| ACX | CAY | |
| ABX | BCY | (0,1,0) |
| CBX | CAY | |
| CAX | ABY | |
| BAX | BCY | |
| BCX | CAY | |
| ACX | ABY | |
| ABX | ACY | (1,0,0) |
| CBX | BAY | |
| CAX | CBY | |
| BAX | ACY | |
| BCX | BAY | |
| ACX | CBY | |

FIG. 33

| CLOCK SIGNAL Ck_4RH1 | CLOCK SIGNAL Ck_4RH2 | CLOCK SIGNAL D0N | CLOCK SIGNAL D1N | CLOCK SIGNAL D2N | CLOCK SIGNAL D3N |
|---|---|---|---|---|---|
| 0 | 0 | 1 | 0 | 0 | 0 |
| 0 | 1 | 0 | 1 | 0 | 0 |
| 1 | 0 | 0 | 0 | 1 | 0 |
| 1 | 1 | 0 | 0 | 0 | 1 | a b

FIG. 40

| r | y | z | x |
|---|---|---|---|
| 0 | 0 | 0 | 1 |
| 1 | 0 | 0 | 1 |
| 0 | 1 | 0 | 1 |
| 1 | 1 | 0 | 0 |
| 0 | 0 | 1 | 1 |
| 1 | 0 | 1 | 0 |
| 0 | 1 | 1 | 0 |
| 1 | 1 | 1 | 1 |

*FIG. 41*

| PREVIOUS STATUS NUMBER | CURRENT STATUS NUMBER | X,Y,Z | U,V,W |
|---|---|---|---|
| ODD NUMBER | EVEN NUMBER | — | UPDATE |
| EVEN NUMBER | ODD NUMBER | UPDATE | — | a b c a b ably fail to acquire data.

RECEIVING CIRCUIT, ELECTRONIC DEVICE, TRANSMISSION/RECEPTION SYSTEM, AND RECEIVING CIRCUIT CONTROL METHOD

TECHNICAL FIELD

The present technology relates to a receiving circuit, an electronic device, a transmission/reception system, and a receiving circuit control method. More particularly, the present technology relates to a receiving circuit, an electronic device, a transmission/reception system, and a receiving circuit control method, which are capable of receiving a signal in accordance with a self-synchronous transmission scheme.

BACKGROUND ART

In the past, when signals are transmitted via a plurality of wirings, an external synchronous transmission scheme of separately transmitting data signals and clock signals or a self-synchronous transmission scheme of transmitting those signals without separating them. Particularly, in a case where a difference in a wiring delay between signal lines is increased, signals are often transmitted in accordance with the self-synchronous transmission scheme. In the self-synchronous transmission scheme, the receiving circuit detects a transition of a status of a reception signal, generates an internal clock signal to be inverted at a transition timing, and generates a data signal from a transition pattern thereof each time a status transitions. Here, the transition pattern indicates each set in a case where permutations in which a pre-transition status and a post-transition status are arranged in order are classified into two or more sets when a status transitions. For example, in a case where there are 6 statuses, the number of permutations in which a pre-transition status and a post-transition status are selected and arranged in order is 6×5 ($=_6P_2$), but in a case where they are classified into 5 sets, the number of patterns is 5. Further, a circuit subsequent to the receiving circuit acquires a data signal in synchronization with the internal clock signal.

Here, in the self-synchronous transmission scheme, the internal clock signal is inverted at a timing at which a value of the data signal changes. Therefore, if the subsequent circuit performs sampling on the data signal at an unstable timing at which the value of the data signal is changing, it is likely to fail to acquire the data signal. In this regard, a receiving circuit that generates a delay clock signal obtained by delaying an internal clock signal through a delay element and supplies the delay clock signal to a subsequent circuit together with a data signal has been proposed (for example, see Patent Document 1).

CITATION LIST

Patent Document

Patent Document 1: U.S. Pat. No. 8,064,535

SUMMARY OF THE INVENTION

Problems to be Solved by the Invention

In the related art described above, the internal clock signal is delayed through the delay element, but there is a problem in that if a variation occurs in a delay time of the delay element, a variation occurs in a timing at which the delay clock signal is inverted, and thus the subsequent circuit fails to acquire data.

The present technology was made in light of the foregoing, and it is an object of the present technology to accurately acquire received data in the self-synchronous transmission scheme.

Solutions to Problems

The present technology was made to solve the above problem, and a first aspect of the present technology is a receiving circuit and a control method thereof, the receiving circuit including: a timing signal generating unit that generates a plurality of timing signals indicating different timings in synchronization with a timing at which a status of a reception signal transitions; a first data signal generating unit that generates, each time a predetermined first timing signal among the plurality of timing signals becomes a specific value, a first data signal from statuses of the reception signal before and after a timing at which the predetermined first timing signal becomes the specific value, and outputs the first data signal in synchronization with a second timing signal different from the first timing signal among the plurality of timing signals; and a second data signal generating unit that generates, each time the second timing signal becomes the specific value, a second data signal from statuses of the reception signal before and after timing at which the second timing signal becomes the specific value, and outputs the second data signal in synchronization with a timing signal different from the first timing signal among the plurality of timing signals. Accordingly, an operation in which the first data signal generated from the status of the reception signal before and after the timing at which the first timing signal becomes the specific value is output in synchronization with the second timing signal is obtained.

Further, in the first aspect, the receiving circuit may further include a separating unit that separates the statuses of the reception signal into a first status just before the first timing signal becomes the specific value and a second status just before the second timing signal becomes the specific value, in which the first data signal generating unit may generate data indicating a transition pattern from the first status to the second status as the first data signal, and the second data signal generating unit may generate data indicating a transition pattern from the second status to the first status as the second data signal. Accordingly, an operation in which the first and second data signals indicating the transition pattern are generated is obtained Further, in the first aspect, the timing signal generating unit may include a binary counter circuit that counts a 1-bit counter value each time the reception signal transitions and outputs a signal of the counter value as the first timing signal, and a second timing signal generating circuit that generates a signal obtained by inverting the first timing signal as the second timing signal. Accordingly, an operation in which the signal of the counter value obtained by counting the 1-bit counter value is generated as the first timing signal is obtained.

Further, in the first aspect, the binary counter circuit may include a plurality of latch circuits associated with different statuses, and a multiplexer, each of the plurality of latch circuits may hold an inverted signal obtained by inverting a feedback signal in a case where the reception signal transitions to the corresponding status, and the multiplexer may invert the held inverted signal, feed the held inverted signal back to the plurality of latch circuits as a new feedback signal, and output the new feedback signal as the first timing signal. Accordingly, an operation in which the first timing signal is generated by a plurality of latch circuits and a multiplexer is obtained.

Further, in the first aspect, the receiving circuit may further includes a third data signal generating unit that generates, each time a third timing signal different from the first and second timing signals among the plurality of timing signals becomes a specific value, a third data signal from statuses of the reception signal before and after a timing at which the third timing signal becomes the specific value, and outputs the third data signal in synchronization with the first timing signal, in which the second data signal generating unit may output the second data signal in synchronization with the third timing signal. Accordingly, an operation in which the second data signal generated from the statuses of the reception signal before and after the timing at which the second timing signal becomes the specific value is output in synchronization with the third timing signal, and the third data signal generated from the statuses of the reception signal before and after the timing at which the third timing signal becomes the specific value is output in synchronization with the first timing signal is obtained.

Further, in the first aspect, the clock signal generating unit may include a senary counter circuit that counts a 3-bit counter value each time the status transitions, separates the counter value into the first, second, and third timing signals, and outputs the first, second, and third timing signals. Accordingly, an operation in which the 3-bit counter value is separated into the first, second and third timing signals is obtained.

Further, in the first aspect, the receiving circuit may further includes: a third data signal generating unit that generates, each time a third timing signal different from the first and second timing signals among the plurality of timing signals becomes a specific value, a third data signal from statuses of the reception signal before and after a timing at which the third timing signal becomes the specific value, and outputs the third data signal in synchronization with a fourth timing signal different from the first, second, and third timing signals among the plurality of timing signals; and a fourth data signal generating unit that generates, each time the fourth timing signal becomes a specific value, a fourth data signal from statuses of the reception signal before and after a timing at which the fourth timing signal becomes the specific value, and outputs the fourth data signal in synchronization with the first timing signal, in which the second data signal generating unit may output the second data signal in synchronization with the third timing signal. Accordingly, an operation in which the second data signal is output in synchronization with the third timing signal, the third data signal is output in synchronization with the fourth timing signal, and the fourth data signal is output in synchronization with the first timing signal is obtained.

Further, in the first aspect, the timing signal generating unit may include a quaternary counter circuit that counts a 2-bit counter value each time the reception signal transitions, and a counter value decoder that analyzes the counter value and generates the first, second, third, and fourth timing signals on the basis of an analysis result. Accordingly, an operation in which the first, second, third, and fourth timing signals are generated from the 2-bit counter value is obtained.

Further, a second aspect of the present technology is an electronic device, including: a receiving circuit that generates a plurality of timing signals indicating different timings in synchronization with a timing at which a status of a reception signal transitions; and a processing circuit including a first data signal generating unit that generates, each time a predetermined first timing signal among the plurality of timing signals becomes a specific value, a first data signal from statuses of the reception signal before and after a timing at which the predetermined first timing signal becomes the specific value, and outputs the first data signal in synchronization with a second timing signal different from the first timing signal among the plurality of timing signals, and a second data signal generating unit that generates, each time the second timing signal becomes the specific value, a second data signal from statuses of the reception signal before and after timing at which the second timing signal becomes the specific value, and outputs the second data signal in synchronization with a timing signal different from the first timing signal among the plurality of timing signals. Accordingly, an operation in which the first data signal generated from the statuses of the reception signal before and after the timing at which the first timing signal becomes the specific value is output in synchronization with the second timing signal is obtained.

Further, in the second aspect, the receiving circuit may include a timing signal generating unit that generates the plurality of timing signals, and a separating unit that separates statuses of the reception signal into a first status just before the first timing signal becomes the specific value and a second status just before the second timing signal becomes the specific value, the first data signal generating unit may generate data indicating a transition pattern from the first status to the second status as the first data signal, and the second data signal generating unit may generate data indicating a transition pattern from the second status to the first status as the second data signal. Accordingly, an operation in which the first and second data signals indicating the transition patterns are generated is obtained.

Further, in the second aspect, the separating unit may include a first latch circuit that holds a signal obtained by inverting a previous feedback signal each time the status of the reception signal transitions to the first status and outputs the held value as an output signal, a second latch circuit that holds a signal obtained by inverting the previous output signal each time the status of the reception signal transitions to the second status, and outputs the held value as the feedback signal, a first inverting unit that outputs a signal obtained by inverting the output signal as first status data indicating the first status, and a second inverting unit that outputs a signal obtained by inverting the feedback signal as second status data indicating the second status. Accordingly, an operation in which the status data is generated by the latch circuit and the inverting unit is obtained.

Further, in the second aspect, the electronic device may further include a status transition limiting circuit that limits the transition pattern of the output signal to a plurality of specific patterns. Accordingly, an operation in which the transition pattern of the output signal is limited to a plurality of specific patterns is obtained.

Further, in the second aspect, the electronic device may further include a converting unit that converts the reception signal into a new reception signal having a different number of statuses, in which the timing signal generating unit may generate the first and second timing signals from the new reception signal. Accordingly, an operation in which the reception signal is converted into a new reception signal having a different number of statuses is obtained.

Further, in the second aspect, the converting unit may convert the reception signal in which the number of statuses is 6 into the new reception signals in which the number of statuses is 3. Accordingly, an operation in which the reception signal in which the number of statuses is 6 is converted into the new reception signal in which the number of statuses is 3 is obtained.

Further, in the second aspect, the converting unit may count a counter value each time the status of the reception signal transitions and supply a signal indicating the counter value to the timing signal generating unit as the new reception signal. Accordingly, an operation in which the signal indicating the counter value counted each time the status of the reception signal transitions is generated as a new reception signal is obtained.

Further, in the second aspect, the electronic device may further include a transfer speed converting unit that converts the reception signal into a plurality of new reception signals having a transfer speed slower than the reception signal and supplies any one of the plurality of reception signals to the timing signal generating unit and the separating circuit. Accordingly, an operation in which the reception signal is converted into a plurality of reception signals having a low transfer speed is obtained.

Further, a third aspect of the present technology is a transmission/reception system, including: a transmitting circuit that transmits a transmission signal; a timing signal generating unit that receives the transmission signal as a reception signal and generates a plurality of timing signals indicating different timings in synchronization with a timing at which a status of the reception signal transitions; a first data signal generating unit that generates, each time a predetermined first timing signal among the plurality of timing signals becomes a specific value, a first data signal from statuses of the reception signal before and after a timing at which the predetermined first timing signal becomes the specific value, and outputs the first data signal in synchronization with a second timing signal different from the first timing signal among the plurality of timing signals; and a second data signal generating unit that generates, each time the second timing signal becomes the specific value, a second data signal from statuses of the reception signal before and after timing at which the second timing signal becomes the specific value, and outputs the second data signal in synchronization with a timing signal different from the first timing signal among the plurality of timing signals. Accordingly, an operation in which the first data signal generated from the statuses of the reception signal before and after the timing at which the first timing signal becomes the specific value is output in synchronization with the second timing signal is obtained.

Effects of the Invention

According to the present technology, an excellent effect in that received data can be accurately acquired in the self-synchronous transmission scheme can be obtained. Note that the effect described herein is not necessarily limited, and any effect described in the present disclosure may be included.

BRIEF DESCRIPTION OF DRAWINGS

FIG. 5 is an example of a truth table of the ternary-to-binary converting unit in the first embodiment.

FIG. 7 is an example of a truth table of the high-speed data decoder in the first embodiment.

FIG. 11 is an example of a truth table of the inverter in the first embodiment.

FIG. 12 is an example of a truth table of the latch circuit in the first embodiment.

FIG. 13 is a table for describing an operation of the clock signal generating unit in the first embodiment.

FIG. 16 is an example of a truth table of a status detecting circuit in the first embodiment.

FIG. 20 is an example of a truth table of the low-speed data decoder in the first embodiment.

FIG. 33 is an example of a truth table of a counter value decoder in the second embodiment.

FIG. 40 is an example of a truth table of a booby trap circuit in the third embodiment.

FIG. 41 is a table illustrating an example of an operation of a separating unit in the third embodiment.

MODE FOR CARRYING OUT THE INVENTION

Hereinafter, modes for carrying out the present technology (hereinafter referred to as "embodiments") will be described. The description will proceed in the following order.

1. First embodiment (example of generating data signals of 2 systems from reception signal)
2. Second embodiment (example of generating data signals of 4 systems from reception signal)
3. Third embodiment (example of generating status data of 2 systems from reception signal)
4. Fourth embodiment (example of converting reception signal into 6-status 2-transition signal and then generating status data of 2 systems)
5. Fifth embodiment (example of generating data signals of 3 systems from reception signal)

1. First Embodiment

Configuration Example of Electronic Device

Figure 1:
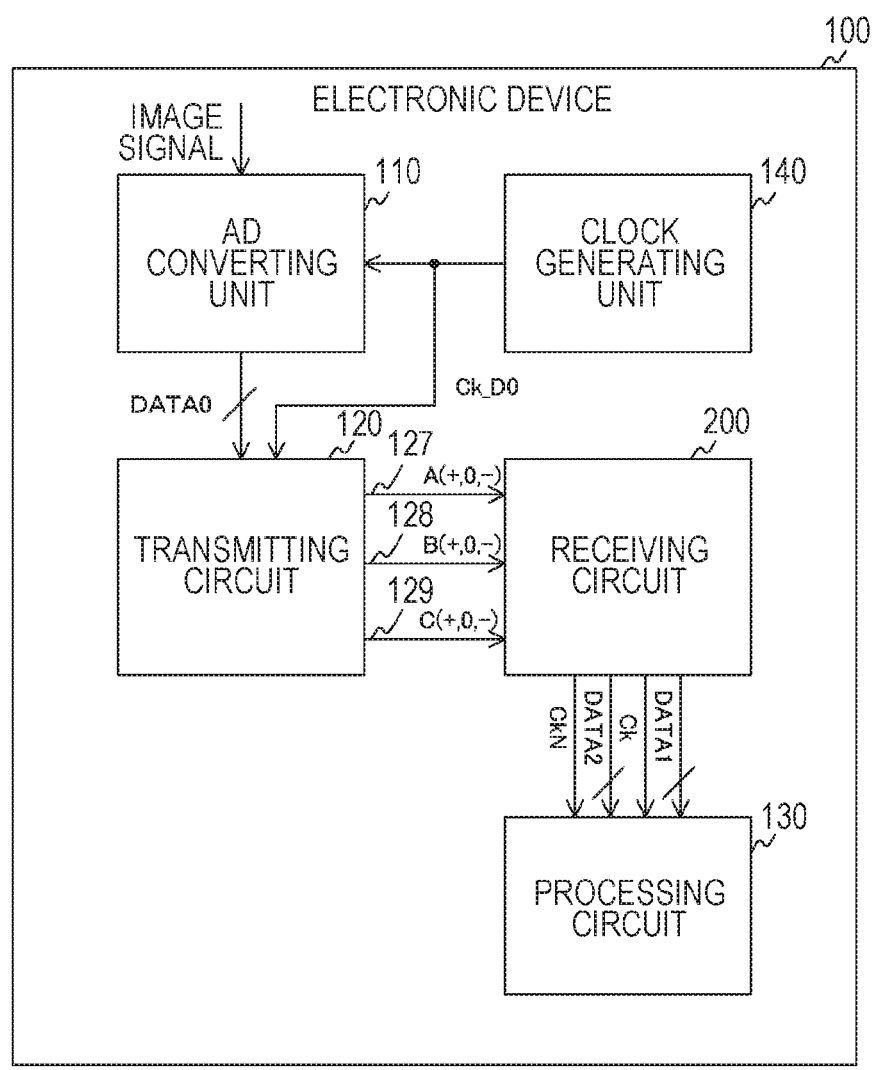
FIG. 1 is a block diagram illustrating a configuration example of an electronic device in a first embodiment.

FIG. 1 is a block diagram illustrating a configuration example of the electronic device 100 in the first embodiment. The electronic device 100 is assumed to be a mobile phone device having an imaging function, an imaging device, or the like. The electronic device 100 includes an analog to digital (AD) converting unit 110, a transmitting circuit 120, a processing circuit 130, a clock generating unit 140, and a receiving circuit 200.

The AD converting unit 110 converts an analog image signal into a digital data signal DATA0 in synchronization with a clock signal received from the clock generating unit 140. The AD converting unit 110 supplies the data signal DATA0 to the transmitting circuit 120.

The clock generating unit 140 generates a clock signal Ck_D0 of a predetermined frequency. The clock generating unit 140 supplies the generated clock signal Ck_D0 to the AD converting unit 110 and the transmitting circuit 120.

The transmitting circuit 120 causes statuses of a plurality of signal lines to transition in synchronization with the clock signal Ck_D0 in accordance with a transition pattern corresponding to a value of the data signal DATA0. Here, the transition pattern indicates each set in a case where permutations in which a pre-transition status and a post-transition status are arranged in order are classified into two or more sets when a status transitions. Since the transmitting circuit 120 associates the transition pattern with the value of the data signal, the receiving circuit 200 is able to acquire the value of the data signal from the transition pattern. A transmission scheme of causing the status of the signal line to transition in accordance with the transition pattern corresponding to the value of the data signal and transmitting the data signal as described above is referred to as a "self-synchronous transmission scheme."

In the self-synchronous transmission scheme, a plurality of signal lines are used, and a potential of each of signals transmitted via the signal lines is controlled. For example, reception signals A, B, and C are transmitted via three signal lines 127, 128, and 129, and control is performed such that each potential has any one of a high level higher than a middle level, the middle level, and a low level lower than the middle level. The number of statuses of the signal lines is $3^3$, but six statuses among the statuses are used for transmission. Further, the value of the data signal DATA0 to be transmitted is allocated to each of transition patterns from one of the statuses to other statuses. The number of transition patterns from one of the six statuses to the other five statuses is 6×5 (=30), but the 30 patterns are classified into 5 groups, and any one value of decimal numbers "0" to "4" is allocated to each of the groups. Each time the status transitions, any one value of "0" to "4" corresponding to the transition pattern is transmitted. As described above, a signal that transits from any one of n (n is an integer) statuses to k (k is an integer less than n) other statuses is referred to as an "n-status k-transition signal." In the first embodiment, since the reception signals transition from one of the six statuses to one of the five other statuses, the reception signals are 6-status 5-transition signals.

The receiving circuit 200 generates two sets of data signals and clock signals from statuses of a plurality of signal lines. The transfer speed of the data signals is assumed to be half the transfer speed of the data signal DATA0 generated by the AD converting unit 110. A circuit that separates one data signal into data signals of two or more systems having a low transfer speed as described above is also referred to as a "deserializer." The receiving circuit 200 supplies the generated data signals and clock signals to the processing circuit 130.

Note that the transmitting circuit 120 and the receiving circuit 200 are installed in the same apparatus, but these circuits may be installed in separate apparatuses. In this configuration, the transmitting circuit 120 and the receiving circuit 200 are used as external interfaces for performing transmission of signals with an external device. Further, the AD converting unit 110 performs AD conversion on image signals but may performs AD conversion on analog signals other than image signals such as audio signals. Further, the receiving circuit 200 is installed in the mobile phone device or the imaging device, but the receiving circuit 200 may be installed in other devices such as a recording device. Note that a system equipped with the transmitting circuit 120 and the receiving circuit 200 is an example of a transmission/reception system set forth in claims.

Figure 2:
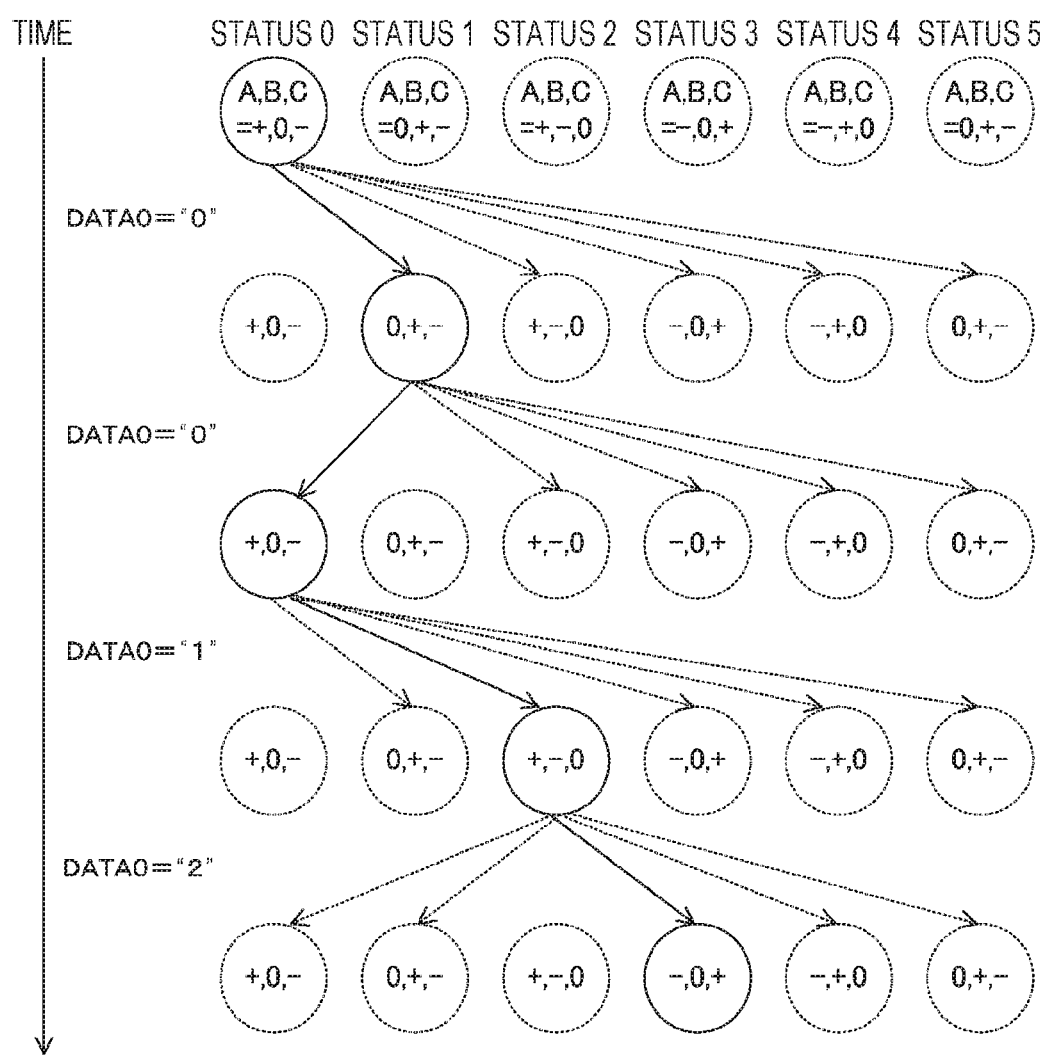
FIG. 2 is a diagram illustrating an example of a status transition of a signal line in the first embodiment.

FIG. 2 is a diagram illustrating an example of the status transition of the signal line in the first embodiment. In FIG. 2, "+" indicates that a potential of the signal line has the high level, "0" indicates that a potential of the signal line has the middle level, and "−" indicates that a potential of the signal line has the low level. For example, the signal lines 127, 128 and 129 for transmitting the reception signals A, B, and C are assumed to have a status 0 of "+, 0, −" as an initial status. As described above, the transition patterns in which transition from any one of the six statuses to the other status is performed are classified into five groups, and the data signals of the decimal numbers "0" to "4" are allocated to each group. The transmitting circuit 120 performs a status transition in accordance with the transition pattern corresponding to the data signal when transmitting the data signal.

For example, when the data signal of "0" is transmitted, the transmitting circuit 120 performs transition from the status 0 to a status 1 in synchronization with clock signal. Then, when the data signal of "0" is transmitted, the transmitting circuit 120 performs a transition from the status 1 to the status 0 in synchronization with the clock signal. Then, when the data signal of "1" is transmitted, the transmitting circuit 120 performs a transition from the status 1 to a status 2 in synchronization with the clock signal. On the other hand, the receiving circuit 200 generates a clock signal which is inverted when the status of the signal line transitions, and generates a data signal of a value corresponding to the transition pattern. As described above, in the self-synchronous transmission scheme, since it is unnecessary to separately transmit the data signal and the clock signal, the transmitting circuit 120 and the receiving circuit 200 are able to perform transmission and reception of data accurately even though the difference in the wiring delay between the signal lines is increased.

Configuration Example of Receiving Circuit

Figure 3:
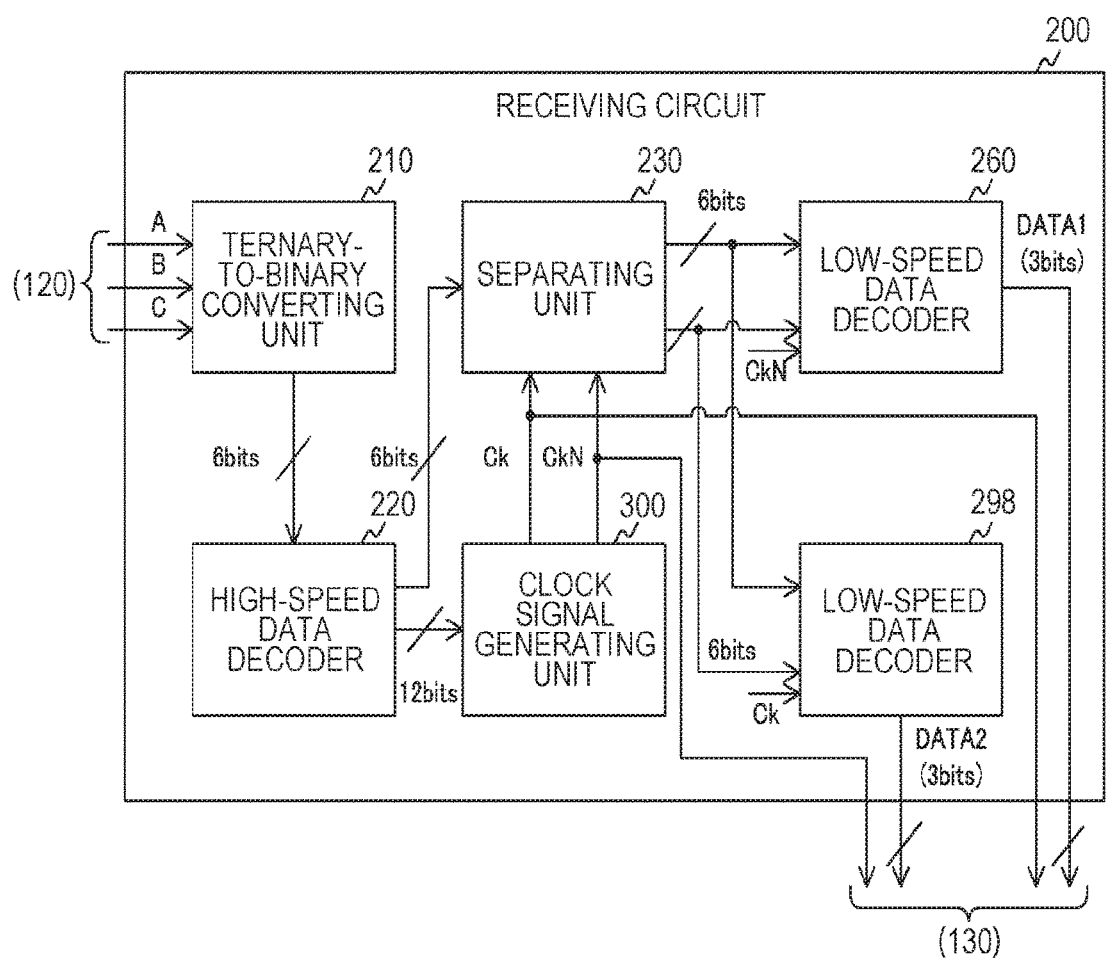
FIG. 3 is a block diagram illustrating a configuration example of a receiving circuit in the first embodiment.

FIG. 3 is a block diagram illustrating a configuration example of the receiving circuit 200 in the first embodiment. The receiving circuit 200 includes a ternary-to-binary converting unit 210, a high-speed data decoder 220, a separating unit 230, a clock signal generating unit 300, and low-speed data decoders 260 and 298.

The ternary-to-binary converting unit 210 converts three-value reception signals A, B, and C into 3-bit binary data. The binary data indicates whether or not the status of the reception signal is one of the six statuses. Further, the ternary-to-binary converting unit 210 generates inverted binary data in which each bit of the binary data is inverted and supplies the inverted binary data to the high-speed data decoder 220 together with the binary data.

The high-speed data decoder 220 decodes the binary data and the inverted binary data and converts them into 6-bit status data. One status is allocated to each of digits of the status data, and the binary data is converted to one hot status data in which digit corresponding to the status of the reception signal is "1," and the other digits are "0." Further, the high-speed data decoder 220 also generates inverted status data in which each bit of the status data is inverted. Further, the high-speed data decoder 220 supplies the 6-bit status data to the separating unit 230 and supplies 12-bit data including the status data and the inverted status data to the clock signal generating unit 300.

The clock signal generating unit 300 generates a clock signal Ck which is inverted each time the status indicated by the data transitions from the status data and the inverted status data. Further, the clock signal generating unit 300 generates an inverted clock signal CkN obtained by inverting the clock signal Ck. Further, the clock signal generating unit 300 supplies the clock signal Ck to the separating unit 230, the low-speed data decoder 260, and the processing circuit 130. Further, the clock signal generating unit 300 supplies the inverted clock signal CkN to the separating unit 230, the low-speed data decoder 298, and the processing circuit 130. Note that the clock signal generating unit 300 is an example of a timing signal generating unit set forth in claims.

The separating unit 230 separates the status data into status data X and status data Y. Here, the status data X indicates a status X just before the clock signal Ck rises, and the status data Y indicates a status Y just before the clock signal CkN rises. The separating unit 230 supplies the status data X and the status data Y to the low-speed data decoders 260 and 298.

The low-speed data decoder 260 generates a data signal DATA1 from the statuses (X and Y) before and after the clock signal Ck becomes the high level and outputs the data signal DATA1 to the processing circuit 130 in synchronization with the inverted clock signal CkN. 3-bit data having a value corresponding to a transition pattern from the status X to the status Y is generated as the data signal DATA1. Note that the low-speed data decoder 260 is an example of a first data signal generating unit set forth in claims.

The low-speed data decoder 298 generates a data signal DATA2 from the statuses (Y and X) before and after the inverted clock signal CkN becomes the high level and outputs the data signal DATA2 to the processing circuit 130 in synchronization with the clock signal Ck. 3-bit data having a value corresponding to a transition pattern from the status Y to the status X is generated as the data signal DATA2. Note that the low-speed data decoder 298 is an example of a second data signal generating unit set forth in claims.

The processing circuit 130 acquires the data signal DATA1 in synchronization with the clock signal Ck, acquires the data signal DATA2 in synchronization with the inverted clock signal CkN, and processes the data signals. For example, various kinds of image processing such as a white balance process and a demosaic process are performed on the data signals.

Configuration Example of Ternary-to-Binary Converting Unit

Figure 4:
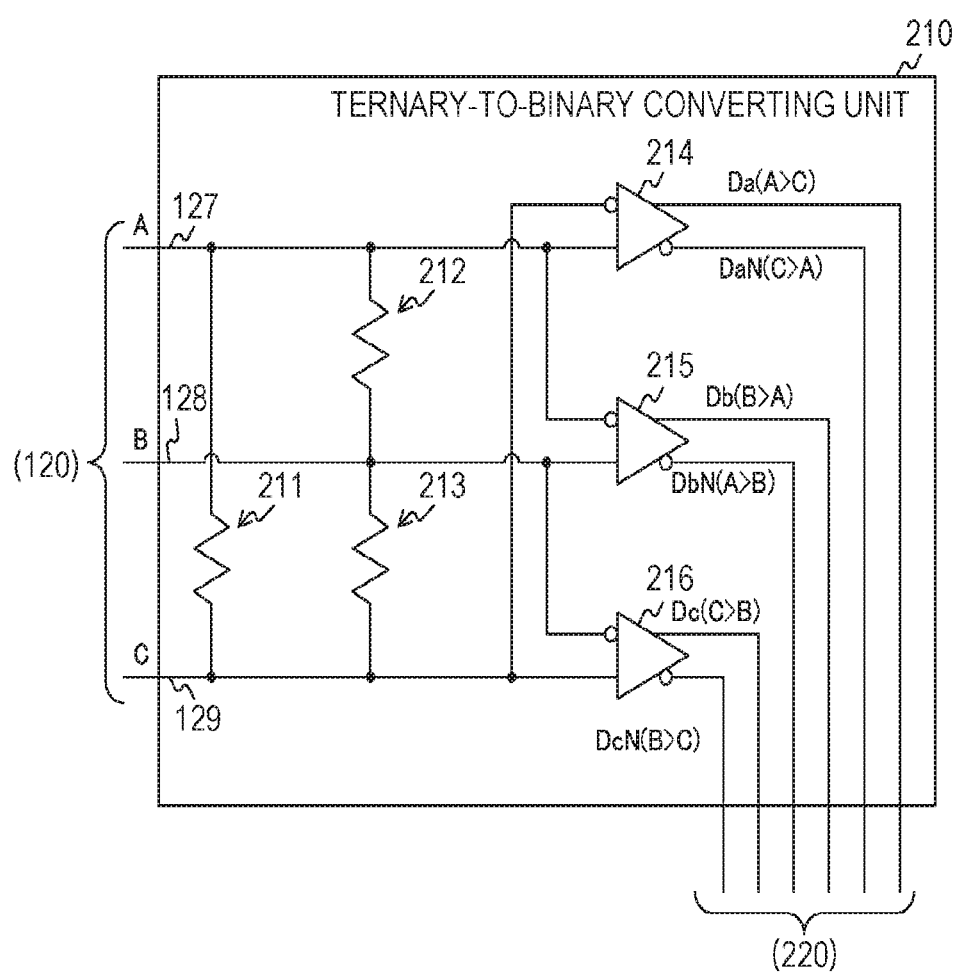
FIG. 4 is a circuit diagram illustrating a configuration example of a ternary-to-binary converting unit in the first embodiment.

FIG. 4 is a circuit diagram illustrating a configuration example of the ternary-to-binary converting unit 210 in the first embodiment. The ternary-to-binary converting unit 210 includes resistors 211, 212, and 213 and comparators 214, 215, and 216.

Both ends of the resistor 211 are connected to the signal line 127 corresponding to the reception signal A and the signal line 129 corresponding to the reception signal C, and both ends of the resistor 212 are connected to the signal line 127 and the signal line 128 corresponding to the reception signal B. Further, both ends of the resistor 213 are connected to the signal line 128 and the signal line 129.

The comparator 214 compares potentials of the reception signal A and the reception signal C with each other. One of differential input terminals of the comparator 214 is connected to the signal line 129, and the other differential input terminal is connected to the signal line 127. Further, the comparator 214 outputs a bit indicating whether or not the reception signal A is higher than the reception signal C to the high-speed data decoder 220 as Da through one of the differential output terminals, and outputs DaN obtained by inverting Da to the high-speed data decoder 220 through the other differential output terminal.

The comparator 215 compares potentials of the reception signal A and the reception signal B with each other. One of the differential input terminals of the comparator 215 is connected to the signal line 127, and the other differential input terminal is connected to the signal line 128. Further, the comparator 215 outputs a bit indicating whether or not the reception signal B is higher than the reception signal A to the high-speed data decoder 220 as Db through one of the differential output terminals, and outputs DbN obtained by inverting Db to the high-speed data decoder 220 through the other differential output terminal.

The comparator 216 compares potentials of the reception signal B and the reception signal C with each other. One of the differential input terminals of the comparator 216 is connected to the signal line 128, and the other differential input terminal is connected to the signal line 129. Further, the comparator 216 outputs a bit indicating whether or not the reception signal C is higher than the reception signal B to the high-speed data decoder 220 as Dc through one of the differential output terminals, and outputs DcN obtained by inverting Dc to the high-speed data decoder 220 through the other differential output terminal.

Data configured with the bits Da, Db, and Dc corresponds to the binary data, and data configured with the bits DaN, DbN and DcN corresponds to the inverted binary data.

FIG. 5 illustrates an example of a truth table of the ternary-to-binary converting unit 210 in the first embodiment. Here, the statuses of the reception signals A, B, and C are classified into six, and different status numbers are allocated to respective statuses. For example, a status number "0" is allocated to a status in which the values of the reception signals A, B, and C are "+, −, 0", and a status number "1" is allocated to a status in which the values of the reception signals A, B, and C are "0, −, +." A status number "2" is allocated to a status in which the values of the reception signals A, B, and C are "−, 0, +," and a status number "3" is allocated to a status in which the values of the reception signals A, B, and C are "−, +, 0." Further, a status number "4" is allocated to a status in which the values of the reception signals A, B, and C are "0, +, −," and a status number "5" is allocated to a status in which the values of the reception signals A, B, and C are "+, 0, −." Note that a combination of A, B, and C for each status in FIG. 5 is an example, and other combinations may be used. The similar applies to the 6-status 2-transition signal and the 3-status 2-transition signal which will be described later.

The ternary-to-binary converting unit 210 converts the reception signal of the status number "0" into 3-bit binary data "1, 0, 1" and converts the reception signal of the status number "1" into the binary data "0, 0, 1." A first bit of the binary data is Da, a second bit is Db, and a third bit is Dc. Further, the ternary-to-binary converting unit 210 converts the reception signal of the status number "2" into binary data "0, 1, 1" and converts the reception signal of the status number "3" into binary data "0, 1, 0." Further, the ternary-to-binary converting unit 210 converts the reception signal of the status number "4" into binary data "1, 1, 0" and converts the reception signal of the status number "5" to binary data "1, 0, 0." Further, the ternary-to-binary converting unit 210 generates the inverted binary data in which each bit of the binary data is inverted.

Configuration Example of High-Speed Data Decoder

Figure 6:
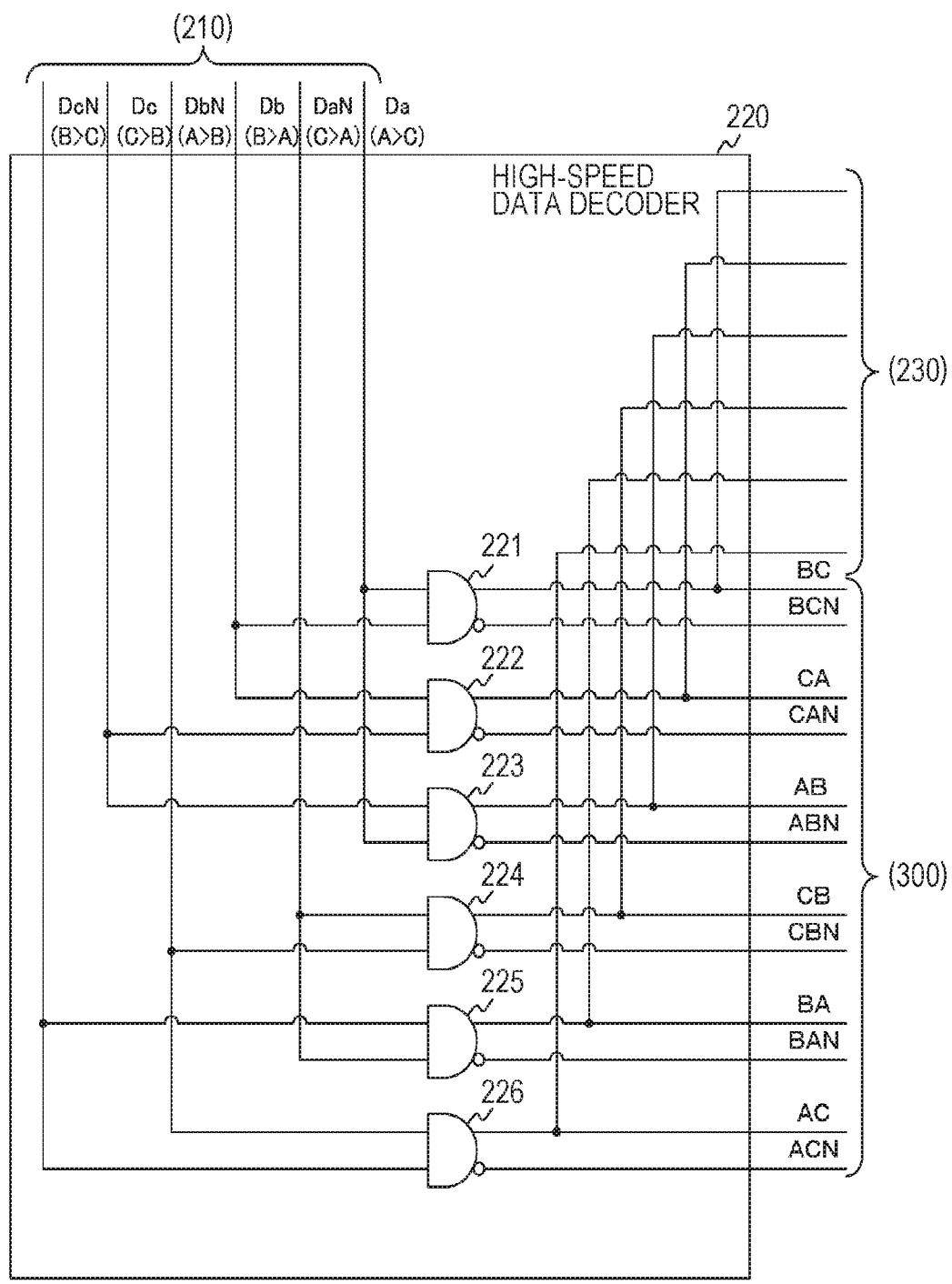
FIG. 6 is a circuit diagram illustrating a configuration example of a high-speed data decoder in the first embodiment.

FIG. 6 is a circuit diagram illustrating a configuration example of the high-speed data decoder 220 in the first embodiment. The high-speed data decoder 220 includes AND gates 221, 222, 223, 224, 225, and 226.

The AND gates 221, 222, 223, 224, 225, and 226 output a logical product of input values. The AND gate 221 generates a bit BC which is a logical product of the bits Da and Db and supplies the bit BC to the clock signal generating unit 300 together with an inverted bit BCN of BC. The AND gate 222 generates a bit CA which is a logical product of the bits Db and Dc and supplies the bit CA to the clock signal generating unit 300 together with a reverse bit CAN of CA. The AND gate 223 generates the bit AB which is a logical product of the bits Da and Dc and supplies the bit AB to the clock signal generating unit 300 together with an inverted bit ABN of AB.

Further, the AND gate 224 generates a bit CB which is a logical product of the bits DaN and DbN and supplies the bit CB to the clock signal generating unit 300 together with an inverted bit CBN of CB. The AND gate 225 generates a bit BA which is a logical product of the bits DaN and DcN and supplies the bit BA to the clock signal generating unit 300 together with an inverted bit BAN of BA. Further, the AND gate 226 generates a bit AC which is a logical product of the bits DbN and DcN and supplies the bit AC to the clock signal generating unit 300 together with an inverted bit ACN of AC.

Further, the AND gates 221, 222, 223, 224, 225, and 226 also supply binary data configured with the bits BC, CA, AB, CB, BA, and AC to the separating unit 230 in addition to the clock signal generating unit 300.

FIG. 7 is an example of a truth table of the high-speed data decoder 220 in the first embodiment. If the binary data and the inverted binary data corresponding to the status number "0" are input, the high-speed data decoder 220 generates status data in which only a first bit is set to "1" and inverted status data thereof. If the binary data and the inverted binary data corresponding to the status number "1" are input, the high-speed data decoder 220 generates status data in which only a second bit is set to "1" and inverted status data thereof.

Similarly, if the binary data corresponding to the status number "2" is input, the high-speed data decoder 220 generates status data in which only a third bit is set to "1." If the binary data corresponding to the status number "3" is input, the high-speed data decoder 220 generates status data in which only a fourth bit is set to "1." Further, if the binary data corresponding to the status number "4" is input, the high-speed data decoder 220 generates status data in which only a fifth bit is set to "1." If the binary data corresponding to the status number "5" is input, the high-speed data decoder 220 generates status data in which only a sixth bit is set to "1."

As described above, the binary data is converted to one hot status data in which only a bit related to the "status" corresponding to the binary data is set to "1."

Figure 8:
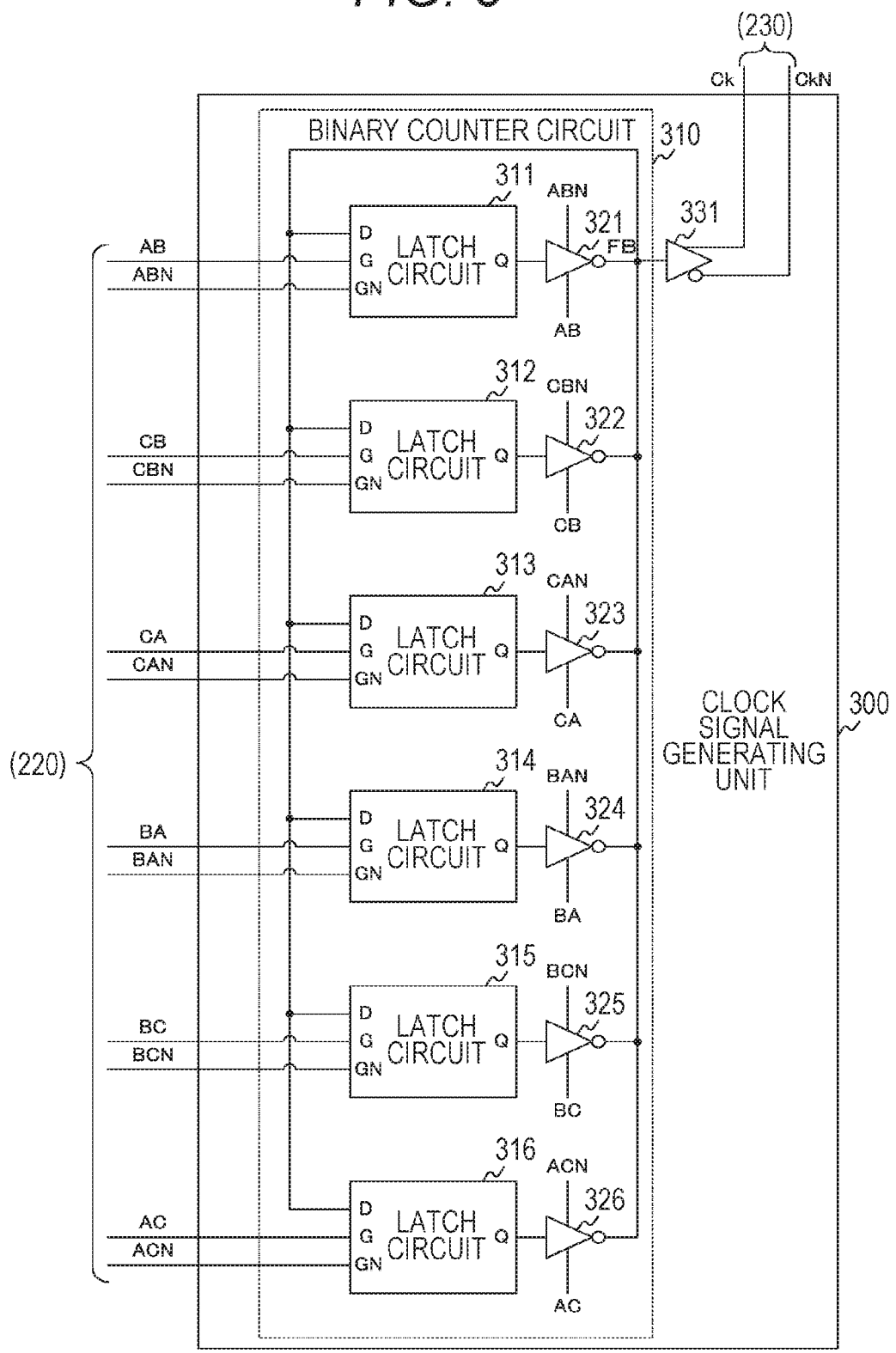
FIG. 8 is a block diagram illustrating a configuration example of a clock signal generating unit in the first embodiment.

FIG. 8 is a block diagram illustrating a configuration example of the clock signal generating unit 300 in the first embodiment. The clock signal generating unit 300 includes a binary counter circuit 310 and an inverter 331.

The binary counter circuit 310 counts a 1-bit counter value each time the status indicated by the status data and the inverted status data transitions. The binary counter circuit 310 includes latch circuits 311, 312, 313, 314, 315, and 316 and inverters 321, 322, 323, 324, 325, and 326.

The latch circuit 311 includes input terminals D, G, and GN and an output terminal Q, and the input terminal D is connected to output terminals of the inverters 321, 322, 323, 324, 325, and 326. Further, the bit AB is input to the input terminal G, and the bit ABN is input to the input terminal GN. The output terminal Q is connected to an input terminal of the inverter 321.

The input terminal D of the latch circuit 312 is connected to the output terminals of the inverters 321, 322, 323, 324, 325, and 326. Further, the bit CB is input to the input terminal G, and the bit CBN is input to the input terminal GN. The output terminal Q is connected to an input terminal of the inverter 322.

The input terminal D of the latch circuit 313 is connected to the output terminals of the inverters 321, 322, 323, 324, 325, and 326. Further, the bit CA is input to the input terminal G, and the bit CAN is input to the input terminal GN. The output terminal Q is connected to an input terminal of the inverter 323.

The input terminal D of the latch circuit 314 is connected to the output terminals of the inverters 321, 322, 323, 324, 325, and 326. Further, the bit BA is input to the input terminal G, and the bit BAN is input to the input terminal GN. The output terminal Q is connected to an input terminal of the inverter 324.

The input terminal D of the latch circuit 315 is connected to the output terminals of the inverters 321, 322, 323, 324, 325, and 326. Further, the bit BC is input to the input terminal G, and the bit BCN is input to the input terminal GN. The output terminal Q is connected to an input terminal of the inverter 325.

The input terminal D of the latch circuit 316 is connected to the output terminals of the inverters 321, 322, 323, 324, 325, and 326. Further, the bit AC is input to the input terminal G, and the bit ACN is input to the input terminal GN. The output terminal Q is connected to an input terminal of the inverter 326.

In a case where the bit (AB or the like) input to the input terminal G becomes the high level, the latch circuits transition to a hold status and hold a value obtained by inverting a feedback signal FB input to the input terminal D. On the other hand, in a case where the bit input to the input terminal G becomes the low level, the latch circuit transmits the feedback signal FB. Here, the bit of the input terminal G becomes the high level when transition to the status corresponding to the bit is performed. For this reason, the operation of the latch circuit can be regarded as transitioning to the hold status when transition to a corresponding status is performed and transitioning to the transmission status in the other statuses.

Further, the inverters 321 to 326 are provided with differential input enable terminals. The bit AB is input to a ground side of the enable terminal of the inverter 321, and ABN is input to a power source side. Further, the output terminals of the inverters 321 to 326 are connected to the input terminals D of the latch circuits and the input terminal of the inverter 331.

The bit CB is input to a ground side of the enable terminal of the inverter 322, and CBN is input to a power source side. The bit CA is input to a ground side of the enable terminal of the inverter 323, and CAN is input to a power source side. The bit BA is input to a ground side of the enable terminal of the inverter 324, and BAN is input to a power source side.

The bit BC is input to a ground side of the enable terminal of the inverter 325, and BCN is input to a power source side. The bit AC is input to a ground side of the enable terminal of the inverter 326 and ACN is input to a power source side. The inverters operate as a multiplexer that selects only an output of a latch circuit in the hold status and inverts it. The inverter 331 has differential output terminals, and outputs an input signal as the clock signal Ck through one differential output terminal and outputs a signal obtained by inverting the input signal as the clock signal CkN through the other differential output terminal. Note that the inverter 331 is an example of a second timing signal generating circuit set forth in claims.

As described above, only one latch circuit corresponding to a transitioned status among the six latch circuits transitions to the hold status. Further, the multiplexer configured with the inverter inverts only an output value of the latch circuit in the hold status and feeds the output value back to each latch circuit. The value of the feedback signal corresponds to a counter value of the binary counter circuit 310 that counts the number of status transitions.

Configuration Example of Latch Circuit

Figure 9:
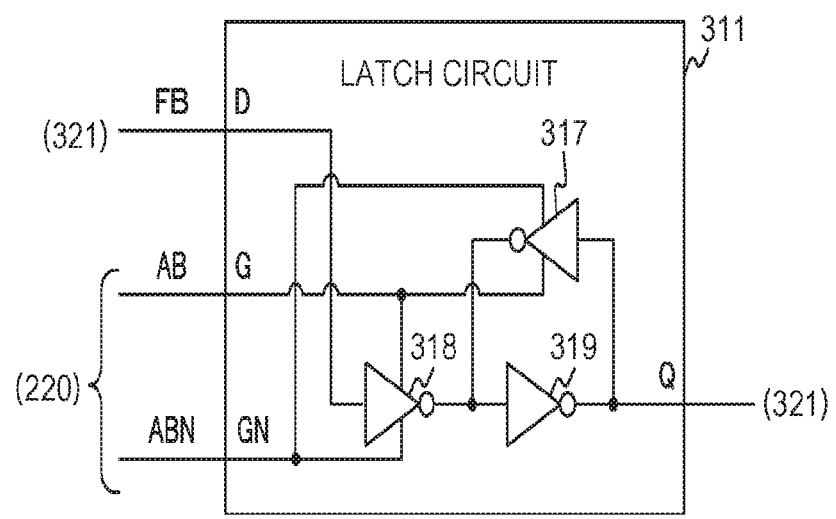
FIG. 9 is a circuit diagram illustrating a configuration example of a latch circuit in the first embodiment.

FIG. 9 is a circuit diagram illustrating a configuration example of the latch circuit 311 in the first embodiment. The latch circuit 311 includes inverters 317, 318, and 319. An input terminal of the inverter 318 is connected to the input terminal D of the latch circuit 311, an output terminal of the inverter 318 is connected to an output terminal of the inverter 317 and an input terminal of the inverter 319. The inverters 317 and 319 are connected in an annular form. Further, the input terminal of the inverter 317 and the output terminal of the inverter 319 are connected to the output terminal Q of the latch circuit 311. Further, a power source side of an enable terminal of the inverter 318 is connected to the input terminal G to which the bit AB is input, and a ground side is connected to the input terminal GN to which the bit ABN is input. On the other hand, a power source side of an enable terminal of the inverter 319 is connected to the input terminal GN, and a ground side is connected to the input terminal G.

With this configuration, in a case where the bit AB is "1," and the bit ABN is "0," the inverters 317 and 318 hold the feedback signal FB inverted by the inverter 318. On the other hand, in a case where the bit AB is "0," and the bit ABN is "1," the latch circuit 311 transmits the feedback signal FB.

Configuration Example of Inverter

Figure 10:
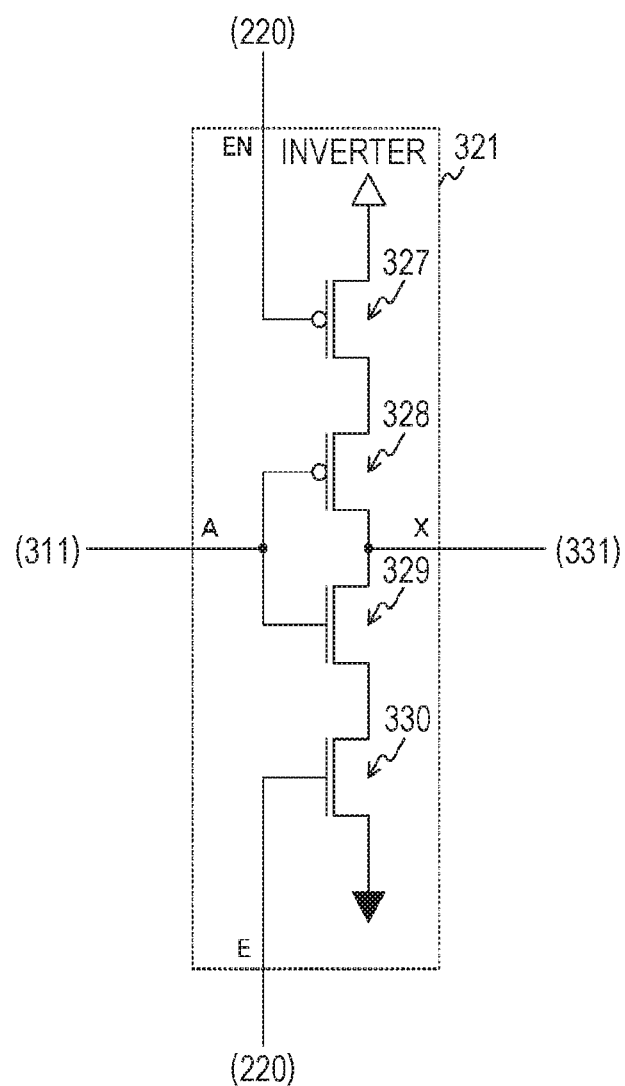
FIG. 10 is a circuit diagram illustrating a configuration example of an inverter in the first embodiment.

FIG. 10 is a circuit diagram illustrating a configuration example of the inverter 321 in the first embodiment. The inverter 321 includes P-type transistors 327 and 328 and N-type transistors 329 and 330. For example, a field effect transistor is used as the transistors.

The P-type transistors 327 and 328 are connected in series between a power source and a drain of the N-type transistor 329. The N-type transistors 327 and 328 are connected in series between a ground terminal and a drain of the P-type transistor 328. Further, a gate of the P-type transistor 327 is connected to an enable terminal EN of the inverter 321, and gates of the P-type transistor 328 and the N-type transistor 329 are connected in common to an input terminal A of the inverter 321. A gate of the N-type transistor 330 is connected to an enable terminal E of the inverter 321, and drains of the P-type transistor 328 and the N-type transistor 329 are connected in common to an output terminal X of the inverter 321.

With this configuration, in a case where "0" is input to the enable terminal EN, and "1" is input to the enable terminal E, the inverter 321 inverts a signal input from the input terminal A and outputs an inverted signal.

FIG. 11 illustrates an example of a truth table of the inverter 321 in the first embodiment. In a case where "0" is input to the enable terminal EN, and "1" is input to the enable terminal E, the inverter 321 inverts a signal input from the input terminal A and outputs an inverted signal from the output terminal X. On the other hand, in a case where "1" is input to the enable terminal EN, and "0" is input to the enable terminal E, the inverter 321 outputs an indefinite value from the output terminal X.

FIG. 12 is an example of a truth table of the latch circuit 311 in the first embodiment. In a case where the input terminal G is "1," and the input terminal GN is "0," the latch circuit 311 holds the inverted value of the feedback signal input from a previous input terminal D. On the other hand, in a case where the input terminal G is "0," and the input terminal GN is "1," the latch circuit 311 transmits the signal input from the input terminal D.

FIG. 13 is a table for describing an operation of the clock signal generating unit 300 in the first embodiment. The clock signal generating unit 300 outputs the clock signal Ck of "1" if the status transition of the signal line is an odd-numbered transition and outputs the clock signal Ck of "0" if the status transition of the signal line is an even-numbered transition. Further, the clock signal generating unit 300 outputs the clock signal CkN obtained by inverting the clock signal Ck.

Configuration Example of Separating Unit

Figure 14:
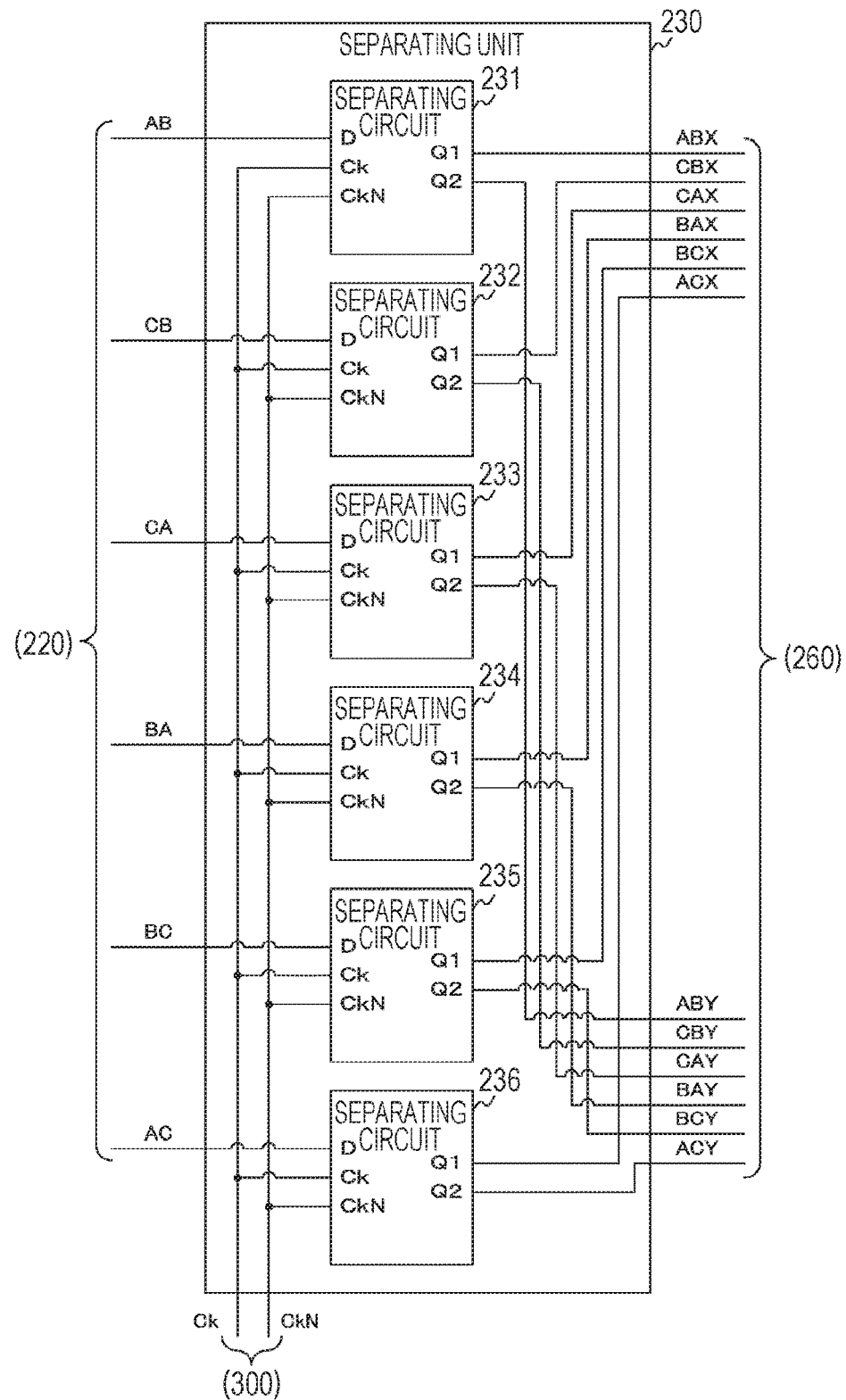
FIG. 14 is a block diagram illustrating a configuration example of a separating unit in the first embodiment.

FIG. 14 is a block diagram illustrating a configuration example of the separating unit 230 in the first embodiment. The separating unit 230 includes separating circuits 231, 232, 233, 234, 235, and 236. Each of the separating circuits includes an input terminal D, clock terminals Ck and CkN, and output terminals Q1 and Q2.

The bit AB is input to the input terminal D of the separating circuit 231, and the bit CB is input to the input terminal D of the separating circuit 232. The bit CA is input to the input terminal D of the separating circuit 233, and the bit BA is input to the input terminal D of the separating circuit 234. Further, bit BC is input to the input terminal D of the separating circuit 235, and the bit AC is input to the input terminal D of the separating circuit 236.

The clock signal Ck is input to each of the clock terminals Ck of the separating circuits 231, 232, 233, 234, 235, and 236, and the clock signal CkN is input to each of the clock terminals CkN. Further, the output terminals Q1 and Q2 of the separating circuits are connected in common to the low-speed data decoders 260 and 298.

Each of the separating circuits holds the value of the input terminal D just before the clock signal Ck rises and outputs it from the output terminal Q1, and holds the value of the input terminal D just before the clock signal CkN rises and outputs it from the output terminal Q2.

Further, bits of ABX, CBX, CAX, BAX, BCX, and ACX are output from the output terminals Q1 of the separating circuits 231, 232, 233, 234, 235, and 236, and data configured with these bits corresponds to the status data X. On the other hand, bits of ABY, CBY, CAY, BAY, BCY, ACY are output from the output terminals Q2 of the separating circuits 231, 232, 233, 234, 235, and 236, and data configured with these bits corresponds to the status data Y.

Configuration Example of Separating Circuit

Figure 15:
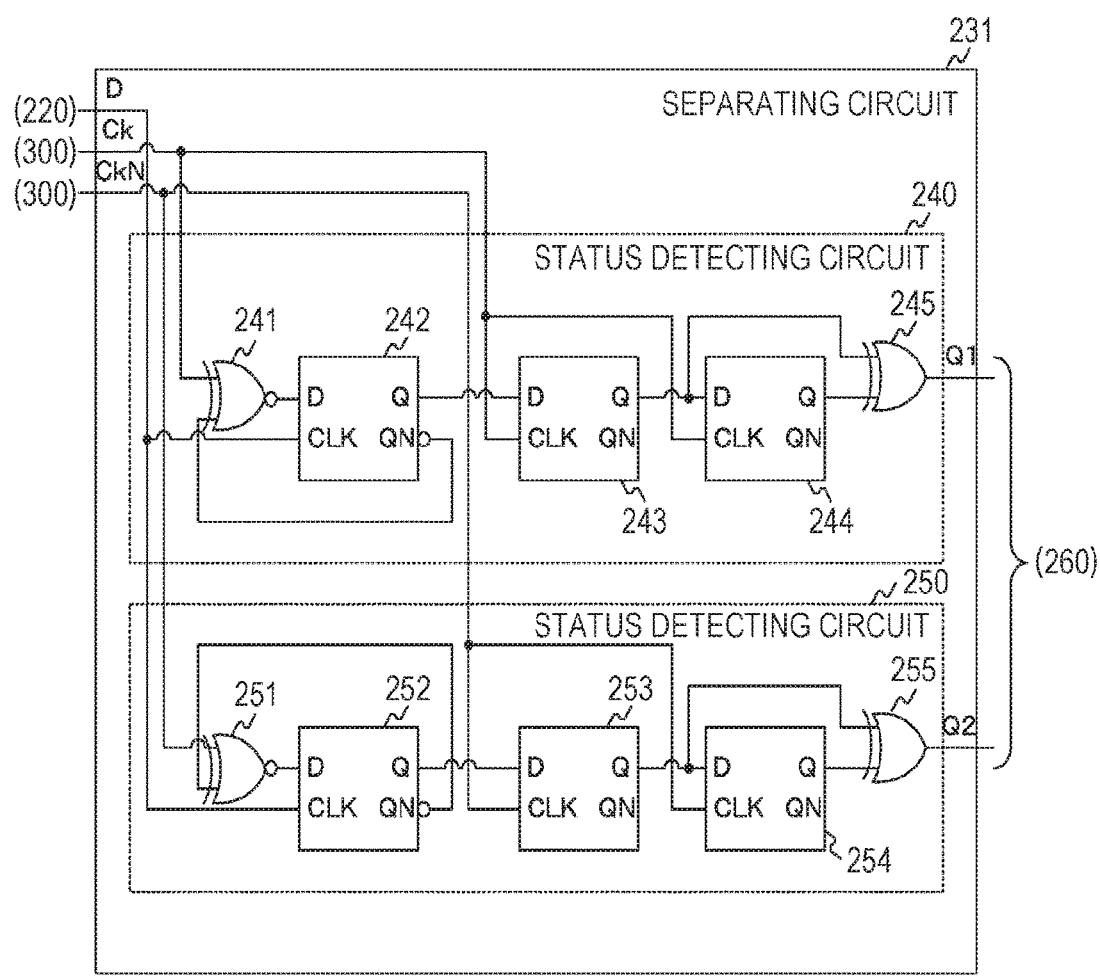
FIG. 15 is a circuit diagram illustrating a configuration example of the separating circuit in the first embodiment.

FIG. 15 is a circuit diagram illustrating a configuration example of the separating circuit 231 in the first embodiment. The separating circuit 231 includes status detecting circuits 240 and 250. The status detecting circuit 240 includes exclusive logical sum (XOR) gates 241 and 245 and flip flops 242, 243, and 244. The status detecting circuit 250 includes XOR gates 251 and 255 and flip flops 252, 253, and 254.

Each of the flip flops 242, 243, 244, 252, 253, and 254 includes an input terminal D, a clock terminal CLK, and output terminals Q and QN. Here, an inverted value of the output terminal Q is output from the output terminal QN. Further, for example, a D flip flop is used as the flip flops. The input terminal D of the flip flop 242 is connected to an output terminal of the XOR gate 241, and the clock terminal CLK is connected to the input terminal D of the separating circuit 231. Further, the output terminal Q of the flip flop 242 is connected to the input terminal D of the flip flop 243, and the output terminal QN is connected to an input terminal of the XOR gate 241.

The clock terminal CLK of the flip flop 243 is connected to the clock terminal Ck of the separating circuit 231, and the output terminal Q is connected to the input terminal D of the flip flop 244. The clock terminal CLK of the flip flop 244 is connected to the clock terminal Ck of the separating circuit 231, and the output terminal Q is connected to an input terminal of the XOR gate 245.

The input terminal D of the flip flop 252 is connected to an output terminal of the XOR gate 251, and the clock terminal CLK is connected to the input terminal D of the separating circuit 231. Further, the output terminal Q of the flip flop 252 is connected to the input terminal D of the flip flop 253, and the output terminal QN is connected to an input terminal of the XOR gate 251.

The clock terminal CLK of the flip flop 253 is connected to the clock terminal CkN of the separating circuit 231, and the output terminal Q is connected to an input terminal D of the flip flop 254. The clock terminal CLK of the flip flop 254 is connected to the clock terminal CkN of the separating circuit 231, and the output terminal Q is connected to an input terminal of the XOR gate 255.

Further, each of the XOR gates 241, 245, 251, and 255 outputs an exclusive logical sum of input values. The XOR gate 241 outputs a logical sum of the clock signal Ck and the output terminal QN of the flip flop 242. The XOR gate 245 outputs a logical sum of the output terminals Q of the flip flops 243 and 244 to the output terminal Q1 of the separating circuit 231.

The XOR gate 251 outputs a logical sum of the clock signal CkN and the output terminal QN of the flip flop 252. The XOR gate 255 outputs a logical sum of the output terminals Q of the flip flops 253 and 254 to the output terminal Q2 of the separating circuit 231.

FIG. 16 illustrates an example of a truth table of the status detecting circuits 240 and 250 in the first embodiment. The status detecting circuit 240 holds the value of the input terminal D just before the clock signal Ck rises and outputs the held value. On the other hand, the status detecting circuit 250 holds the value of the input terminal D just before the clock signal CkN rises and outputs the held value.

Figure 17:
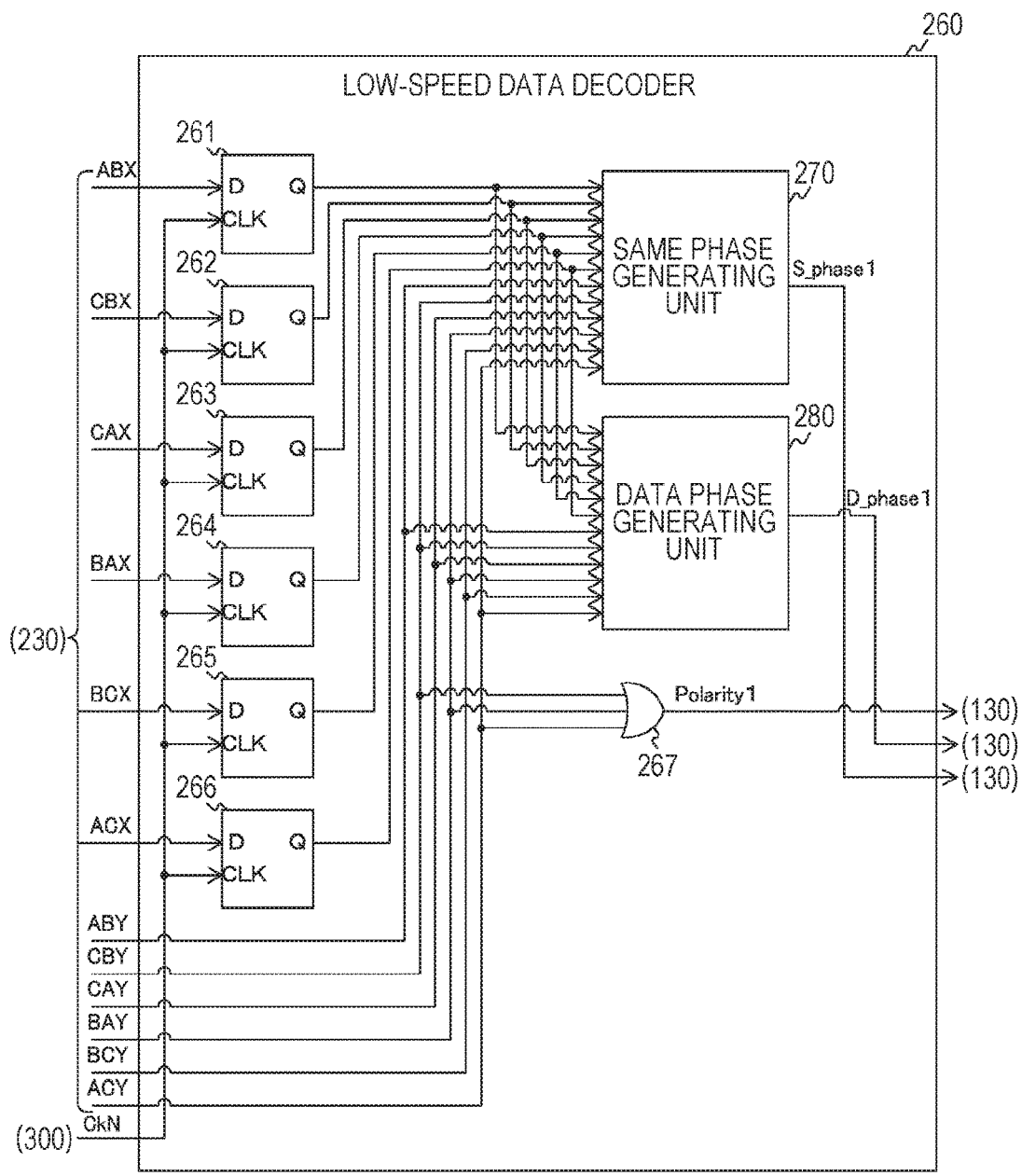
FIG. 17 is a circuit diagram illustrating a configuration example of a low-speed data decoder in the first embodiment.

FIG. 17 is a circuit diagram illustrating a configuration example of the low-speed data decoder 260 in the first embodiment. The low-speed data decoder 260 includes flip flops 261, 262, 263, 264, 265, and 266, a same phase generating unit 270, a data phase generating unit 280, and a logical sum (OR) gate 267.

Each of the flip flops 261, 262, 263, 264, 265 and 266 has an input terminal D, a clock terminal CLK, and an output terminal Q. For example, a D flip flop is used as the flip flops. The bits of ABX, CBX, CAX, BAX, BCX, and ACX are input to the input terminals D of the flip flops 261, 262, 263, 264, 265, and 266. Further, the clock signal CkN is input to the clock terminals CLK of the flip flops, and the output terminals Q are connected in common to the same phase generating unit 270 and the data phase generating unit 280. With the flip flops, the status data X is held in synchronization with the clock signal CkN.

The same phase generating unit 270 generates an S_phase 1 from the status data X and Y. The data phase generating unit 280 generates a D_phase 1 from the status data X and Y. The OR gate 267 outputs a logical sum of the bits CBY, BAY, and ACY as a Polarity 1. Here, the Polarity 1 is the first bit of the data signal DATA1, the S_phase 1 is the second bit, and the D_phase 1 is the third bit.

Note that the configuration of the low-speed data decoder 298 is similar to that of the low-speed data decoder 260. However, in the low-speed data decoder 298, the status data Y is input to the flip flop instead of the status data X, and the status data X is input to the same data generating unit or the like instead of the status data Y. Further, the clock signal Ck is input instead of the clock signal CkN.

Configuration Example of Same Phase Generating Unit

Figure 18:
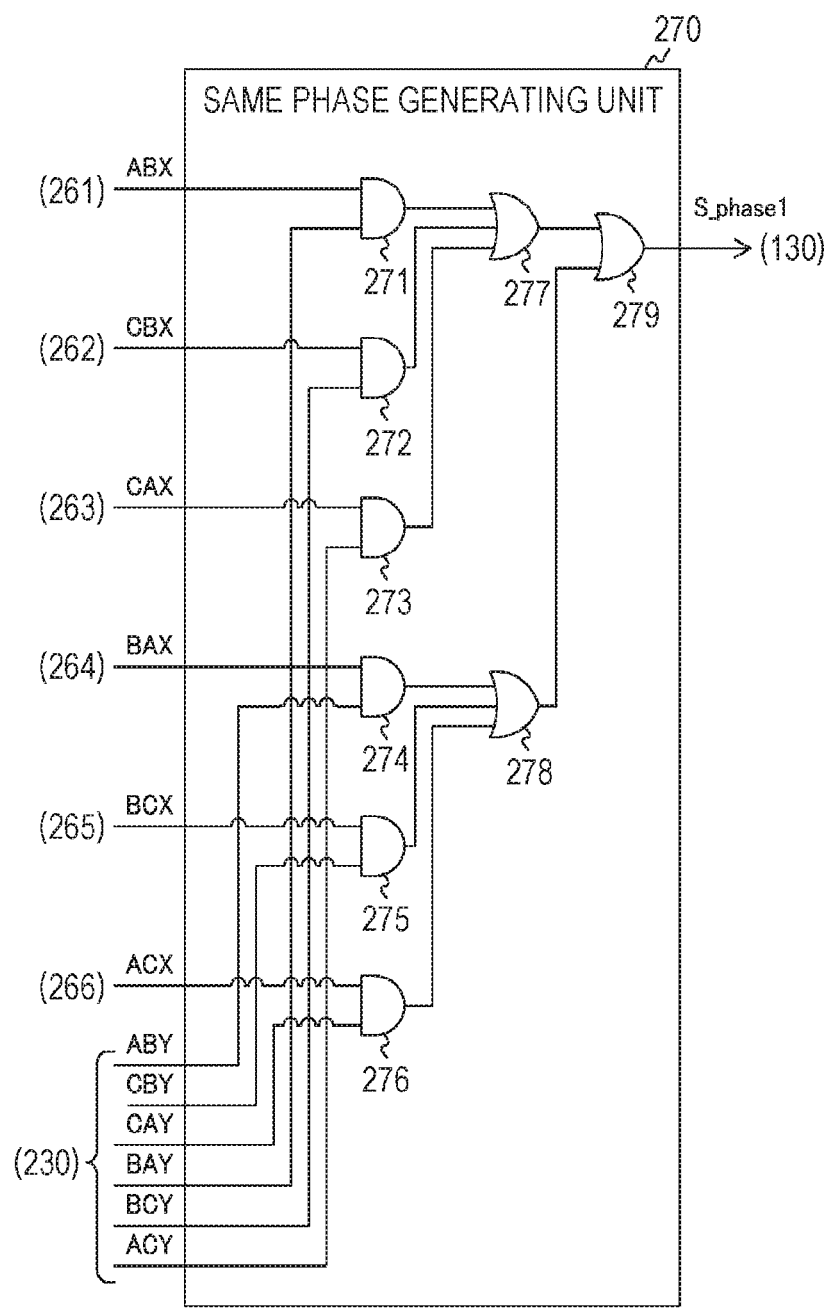
FIG. 18 is a circuit diagram illustrating a configuration example of a same phase generating unit in the first embodiment.

FIG. 18 is a circuit diagram illustrating a configuration example of the same phase generating unit 270 in the first embodiment. The same phase generating unit 270 includes logical product (AND) gates 271, 272, 273, 274, 275, and 276 and OR gates 277, 278, and 279.

Each of the AND gates 271, 272, 273, 274, 275, and 276 outputs a logical product of input values. The AND gate 271 outputs a logical product of ABX and BAY to the OR gate 277. The AND gate 272 outputs a logical product of CBX and BCY to the OR gate 277. The AND gate 273 outputs a logical product of CAX and ACY to the OR gate 277. The AND gate 274 outputs a logical product of BAX and ABY to the OR gate 278. The AND gate 275 outputs a logical product of BCX and CBY to the OR gate 278. The AND gate 276 outputs a logical product of ACX and CAY to the OR gate 278.

Each of the OR gates 277, 278, and 279 outputs a logical sum of input values. The OR gate 277 outputs a logical sum of output values of the AND gates 271, 272, and 273 to the OR gate 279, and the OR gate 278 outputs a logical sum of output values of the AND gates 274, 275 and 276 to the OR gate 279. The OR gate 279 outputs a logical sum of the output values of the OR gates 277 and 278 as the S_phase 1.

Configuration Example of Data Phase Generating Unit

Figure 19:
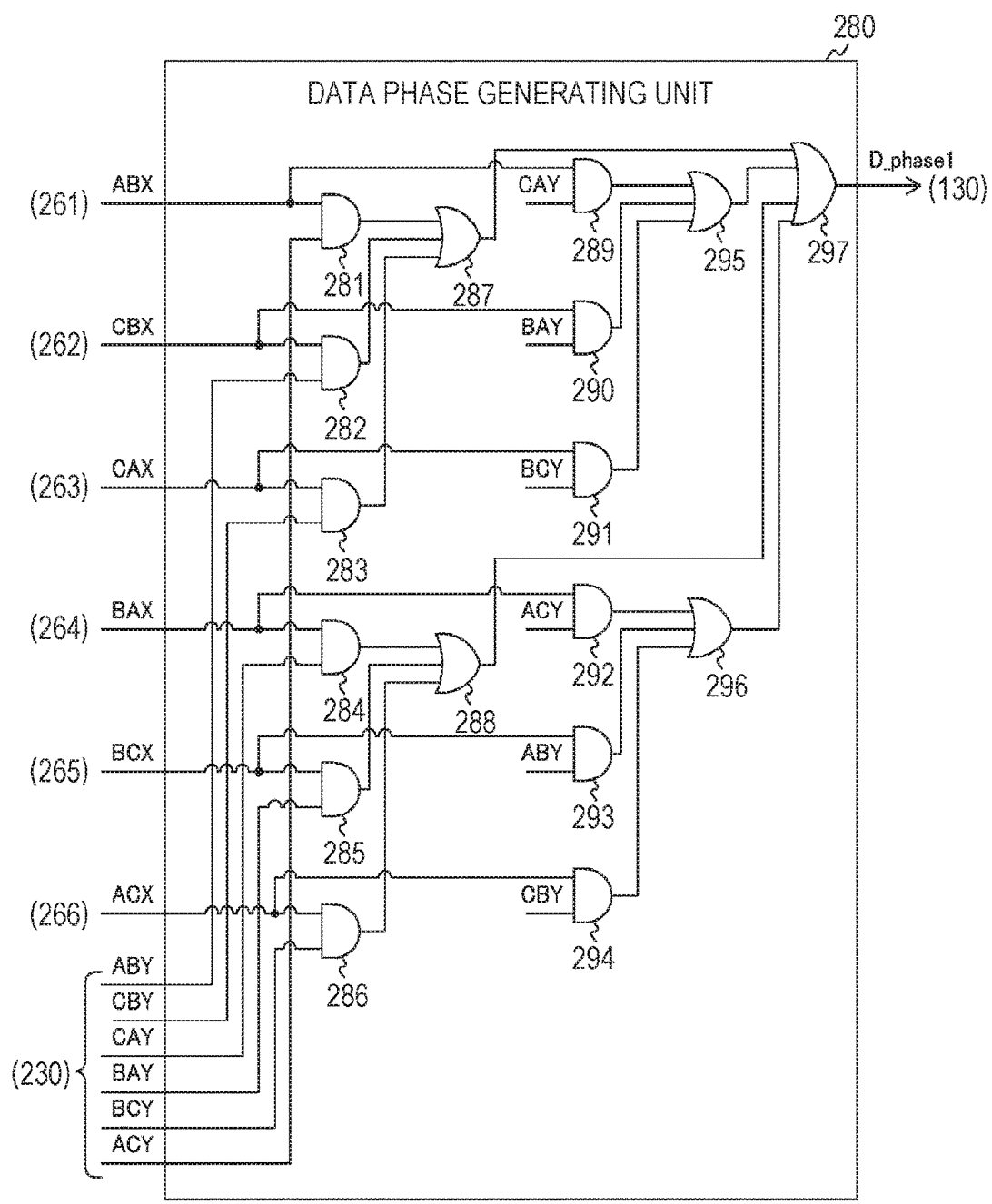
FIG. 19 is a circuit diagram illustrating a configuration example of a data phase generating unit in the first embodiment.

FIG. 19 is a circuit diagram illustrating a configuration example of the data phase generating unit 280 in the first embodiment. The data phase generating unit 280 includes AND gates 281, 282, 283, 284, 285, 286, 289, 290, 291, 292, 293, and 294 and OR gates 287, 288, 295, 296, and 297.

Each of the AND gates 281, 282, 283, 284, 285, 286, 289, 290, 291, 292, 293, and 294 outputs a logical product of input values. The AND gate 281 outputs a logical product of ABX and ACY to the OR gate 287, and the AND gate 282 outputs a logical product of CBX and ABY to the OR gate 287. The AND gate 283 outputs a logical product of CAX and CBY to the OR gate 287, and the AND gate 284 outputs a logical product of BAX and CAY to the OR gate 288. The AND gate 285 outputs a logical product of BCX and BAY to the OR gate 288, and the AND gate 286 outputs a logical product of ACX and BCY to the OR gate 288.

Each of the OR gates 287, 288, 295, 296 and 297 outputs a logical sum of input values. The OR gate 287 outputs a logical sum of the output values of the AND gates 281, 282, and 283 to the OR gate 297. The OR gate 288 outputs a logical sum of the output values of the AND gates 284, 285, and 286 to the OR gate 297.

The AND gate 289 outputs a logical product of ABX and CAY to the OR gate 295, and the AND gate 290 outputs a logical product of CBX and BAY to the OR gate 295. The AND gate 291 outputs a logical product of CAX and BCY to the OR gate 295, and the AND gate 292 outputs a logical product of BAX and ACY to the OR gate 296. The AND gate 293 outputs a logical product of BCX and ABY to the OR gate 296, and the AND gate 294 outputs a logical product of ACX and CBY to the OR gate 296.

The OR gate 295 outputs a logical sum of the output values of the AND gates 289, 290, and 291 to the OR gate 297. The OR gate 296 outputs a logical sum of the output values of the AND gates 292, 293, and 294 to the OR gate 297. The OR gate 297 outputs a logical sum of the output values of the OR gates 287, 288, 295, and 296 as the D_phase 1.

FIG. 20 illustrates an example of a truth table of the low-speed data decoder 260 in the first embodiment. The low-speed data decoder 260 generates the 3-bit data signal DATA1 indicating the transition pattern from the status X to the status Y. In FIG. 20, a signal name in a column of the status X indicates a status X in which only a bit of the name is "1," and a signal name in a column of the status Y indicates a status Y in which only a bit of the name is "1." There are 30 transition patterns from one of the six statuses to the other statuses, but the 30 transition patterns are classified into five groups, and a different data signal is allocated to each group.

For example, in a case where transition from the status X in which only ABX is "1" to the status Y in which only CBY is "1" is performed, DATA1 of "110" is generated. Similarly, DATA1 of "000," "101," "010," or "100" is generated on the basis of the transition pattern.

Operation Example of Receiving Circuit

Figure 21:
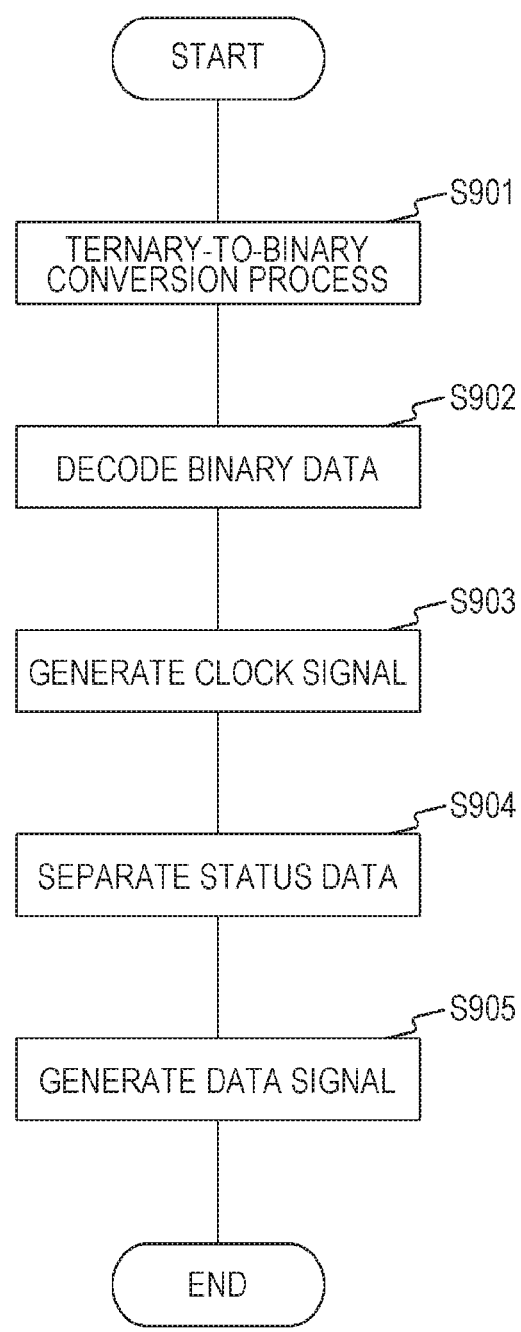
FIG. 21 is a flowchart illustrating an example of an operation of the receiving circuit in the first embodiment.

FIG. 21 is a flowchart illustrating an example of an operation of the receiving circuit 200 in the first embodiment. For example, the operation is executed each time the receiving circuit 200 receives the reception signal.

The receiving circuit 200 performs a ternary-to-binary conversion process of converting a ternary reception signal into binary data (step S901), and decodes the binary data as one hot status data (step S902). The receiving circuit 200 generates the clock signal from the status data (step S903), and separates the status data into the status data X and the status data Y (step S904). Then, the receiving circuit 200 generates the data signal from the separated status data X and Y (step S905). After step S905, the receiving circuit 200 ends the reception operation.

Figure 22:
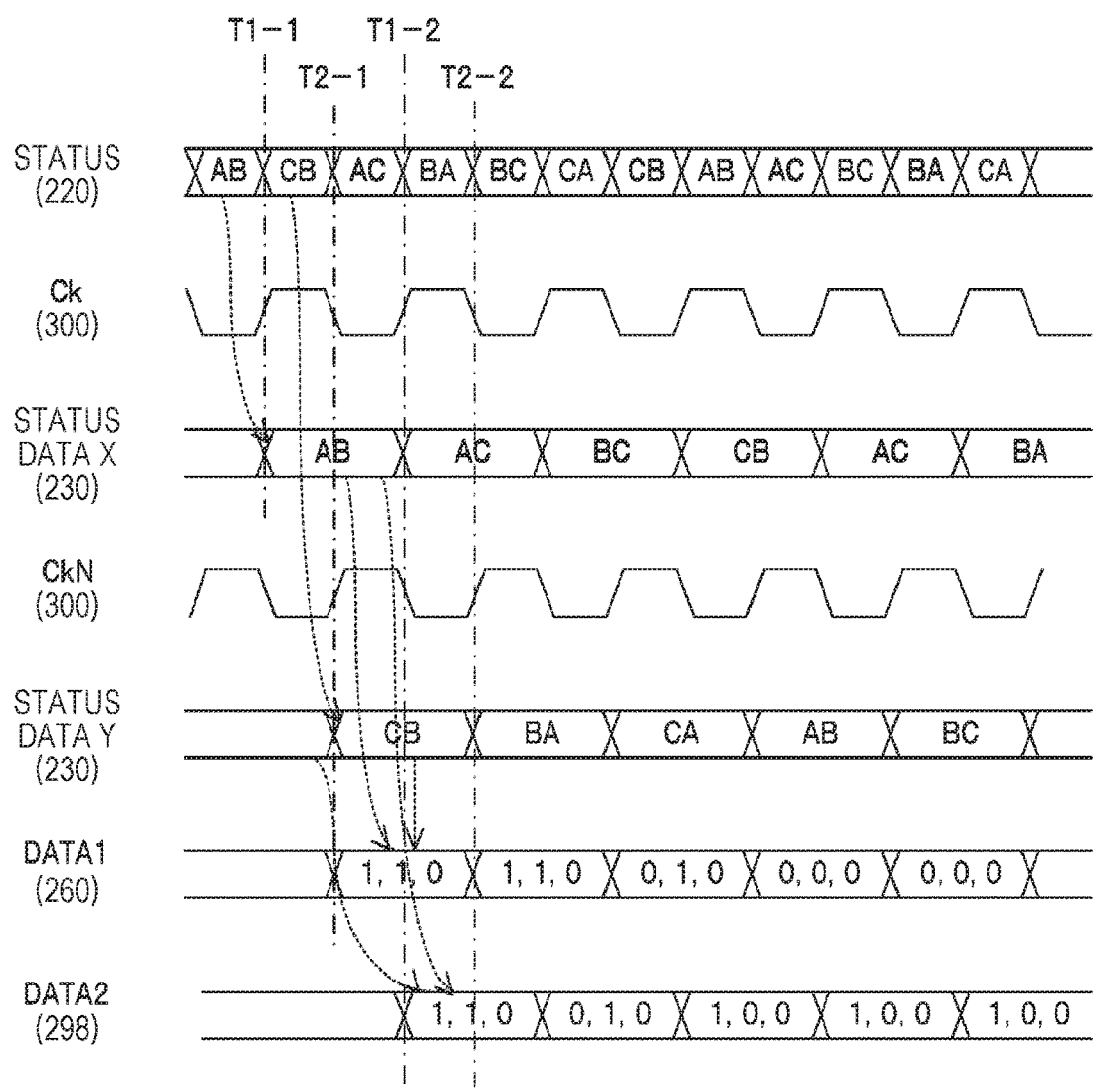
FIG. 22 is a timing chart illustrating an example of an operation of the receiving circuit in the first embodiment.

FIG. 22 is a timing chart illustrating an example of the operation of the receiving circuit 200 in the first embodiment. The high-speed data decoder 220 converts the binary data whose status transitions at each of timings T1-1, T2-1, T1-2, T2-2, and the like into the status data. The clock signal generating unit 300 generates the clock signal Ck whose value is inverted each time the status transitions and the clock signal CkN obtained by inverting the clock signal Ck.

Further, the separating unit 230 separates the status data into the status data X indicating the status just before the clock signal Ck rises and the status data Y indicating the status just before the clock signal CkN rises. For example, it is assumed that the clock signal Ck rises at the timing T1-1, the clock signal CkN then rises at the timing T2-1, transition from AB to CB is performed at the timing T1-1, and transition from CB to AC is performed at the timing T2-1. In this case, the status data is separated into the status data X indicating AB or AC and the status data Y indicating CB.

Further, the low-speed data decoder 260 generates the data signal DATA1 corresponding to the transition pattern from the status data X to the status data Y and outputs the data signal DATA1 in synchronization with the clock signal CkN. On the other hand, the low-speed data decoder 298 generates the data signal DATA2 corresponding to the transition pattern from the status data Y to the status data X and outputs the data signal DATA2 in synchronization with the clock signal Ck.

As described above, the low-speed data decoder 260 outputs the data signal DATA1 generated from the statuses before and after the clock signal Ck in synchronization with the clock signal CkN. Therefore, the timing (for example, T1-1) at which the clock signal Ck rises and the timing (for example, T2-1) at which the data signal DATA1 is output are shifted in phase by a ½ cycle of the clock signal Ck or CkN. Therefore, the processing circuit 130 at the subsequent stage is able to reliably acquire the data signal DATA1 in synchronization with the clock signal Ck. Similarly, since the low-speed data decoder 298 outputs the data signal DATA2 in synchronization with the clock signal Ck, the processing circuit 130 is able to reliably acquire the data signal DATA2 in synchronization with the clock signal CkN whose phase is shifted by the ½ cycle. Further, since each of the transfer speeds of the data signals DATA1 and DATA2 is half the transfer speed of the original reception signal, the processing circuit 130 is able to process the data signal in accordance with a drive clock signal having a lower frequency than that of a transmission side.

Figure 23:
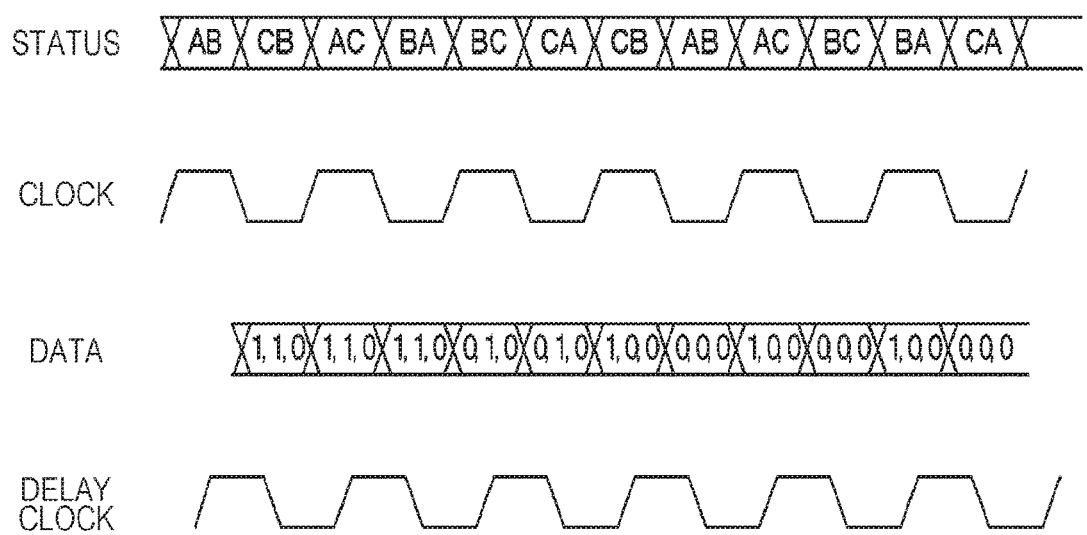
FIG. 23 is a timing chart illustrating an example of an operation of a receiving circuit in a comparative example.

FIG. 23 is a timing chart illustrating an example of an operation of a receiving circuit in a comparative example. As described in Patent Document 1, the receiving circuit of the comparative example is assumed to delay the clock signal which is inverted each time the status transitions and transmit the delayed clock signal together with the data signal. In the comparative example, if there is a variation in the delay time of the delay element that delays the clock signal, the subsequent circuit is likely to fail to acquire data.

In contrast, as illustrated in FIG. 22, the receiving circuit 200 does not delay the clock signal, and the output timing of the data signal and the rising timing of the clock signal are shifted by the ½ cycle, and thus the processing circuit 130 at the subsequent stage is able to reliably acquire data.

As described above, according to the first embodiment of the present technology, the receiving circuit 200 outputs the data signal obtained from the statuses before and after the rising of the clock signal Ck in synchronization with the clock signal CkN and thus is able to output the data signal at a timing different from the rising of the clock signal Ck. At the output timing of this data signal, the value of data signal is not stable, but the processing circuit at the subsequent stage acquires the data signal in synchronization with the clock signal Ck indicating the timing different from the output timing thereof, and thus the data signal having the stable value can be acquired.

First Modified Example

In the first embodiment described above, the clock signal generating unit 300 generates the clock signal through the binary counter circuit 310 including the latch circuits and the inverters. However, a binary counter circuit that counts each time the status transitions is able to generate the clock signal through a binary counter that does not use a latch circuit. For example, the clock signal generating unit 300 is able to generate the clock signal through a binary counter circuit including buffers and inverters. The clock signal generating unit 300 in the first modified example of the first embodiment is different from that of the first embodiment in that the clock signal is generated through a binary counter circuit including buffers and inverters.

Figure 24:
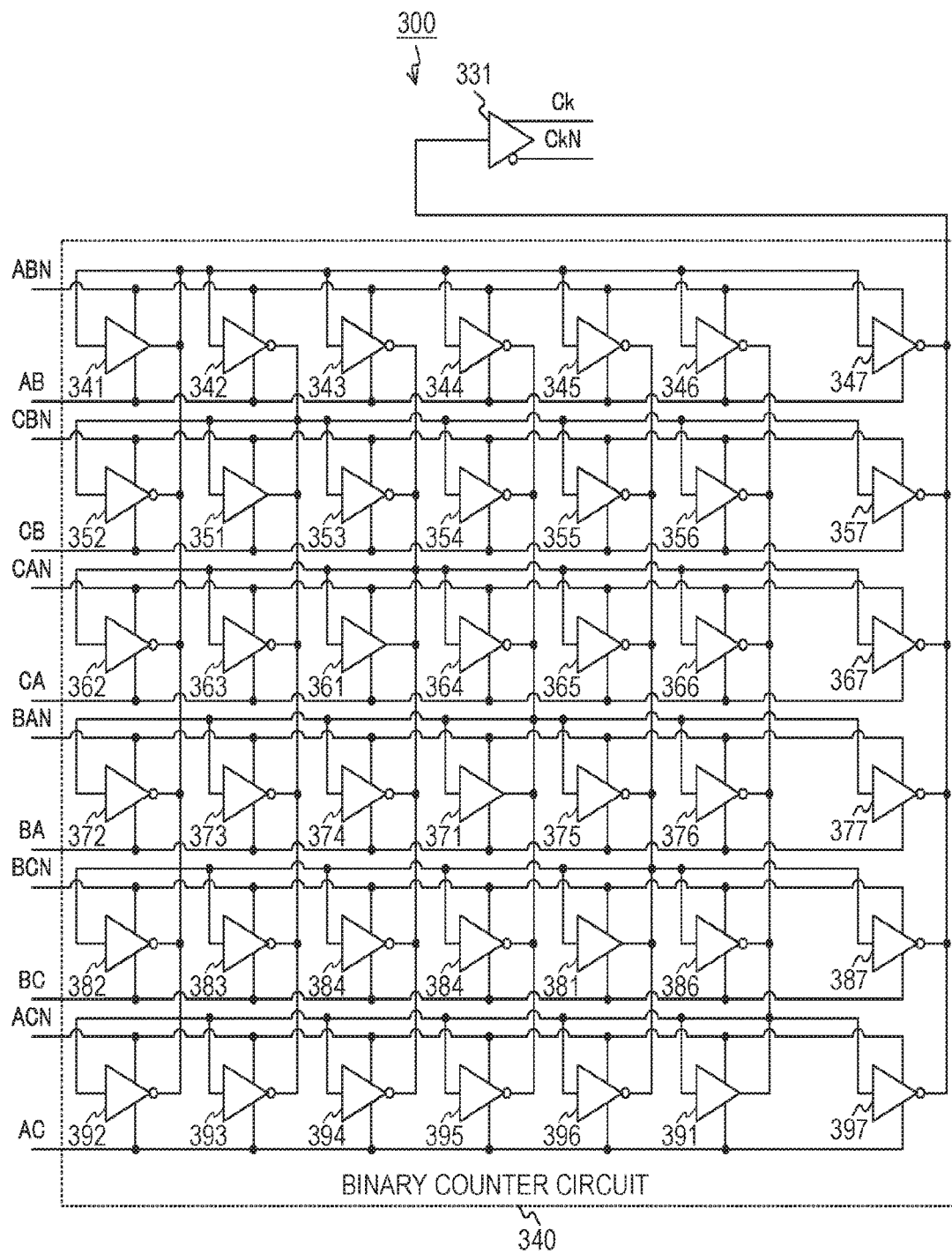
FIG. 24 is a circuit diagram illustrating a configuration example of a clock signal generating unit in a first modified example of the first embodiment.

FIG. 24 is a circuit diagram illustrating a configuration example of the clock signal generating unit 300 in the first modified example of the first embodiment. The clock signal generating unit 300 of the first modified example is different from that of the first embodiment in that a binary counter circuit 340 is provided instead of the binary counter circuit 310.

The binary counter circuit 340 includes buffers 341, 351, 361, 371, 381, and 391 and inverters 342 to 347. Further, the binary counter circuit 340 includes inverters 352 to 357, 362 to 367, 372 to 377, 382 to 387, and 392 to 397.

Each of the inverters and the buffers has a differential input enable terminal. Each of the buffers has a similar configuration to that of the inverter except that the buffer does not invert an input signal.

The bit ABN is input to a power source side enable terminal of each element in a first row including the buffer 341 and the inverters 342 to 347, and the bit AB is input to a ground side enable terminal. The bit CBN is input to a power source side enable terminal of each element in a second row including the buffer 351 and the inverters 352 to 357, and the bit CB is input to a ground side enable terminal. The bit CAN is input to a power source side enable terminal of each element in a third row including the buffer 361 and the inverters 362 to 367, and the bit CA is input to a ground side enable terminal.

Further, the bit BAN is input to a power source side enable terminal of each element in a fourth row including the buffer 371 and the inverters 372 to 377, and the bit BA is input to a ground side enable terminal. The bit BCN is input to a power source side enable terminal of each element in a fifth row including the buffer 381 and the inverters 382 to 387, and the bit BC is input to a ground side enable terminal. The bit ACN is input to a power source side enable terminal of each element in a sixth row including the buffer 391 and the inverters 392 to 397, and the bit AC is input to a ground side enable terminal. Here, the buffer 351 is arranged in a second column, the buffer 361 in a third column, the buffer 371 in a fourth column, the buffer 381 in a fifth column, and the buffer 391 in a sixth column.

Further, an output terminal of each element in the first column such as the buffer 341 is connected to input terminals of the elements in the first row. An output terminal of each element in the second column such as the buffer 351 is connected to input terminals of the elements in the second row. An output terminal of each element in the third column such as the buffer 361 is connected to input terminals of the elements in the third row. An output terminal of each element in the fourth column such as the buffer 371 is connected to input terminals of the elements in the fourth row. An output terminal of each element in the fifth column such as the buffer 381 is connected to input terminals of the elements in the fifth row. An output terminal of each element in the sixth column such as the buffer 391 is connected to input terminals of the elements in the sixth row. Further, an output terminal of each element in the seventh column such as the inverter 347 is connected to the input terminal of the inverter 331. With this configuration, the clock signal Ck is generated.

As described above, according to the first modified example of the first embodiment of the present technology, since the binary counter circuit 340 including the buffers and the inverters is installed in the clock signal generating unit 300, it is possible to generate the clock signal without using the latch circuit.

Second Modified Example

In the first embodiment described above, the separating unit 230 separates the status data into two and generates the data signal DATA1 or the like from the separated data, but a configuration having no separating unit 230 may be provided. A receiving circuit 200 of the first embodiment differs from that of the first embodiment in that the receiving circuit 200 generates the data signal without using the separating unit 230.

Figure 25:
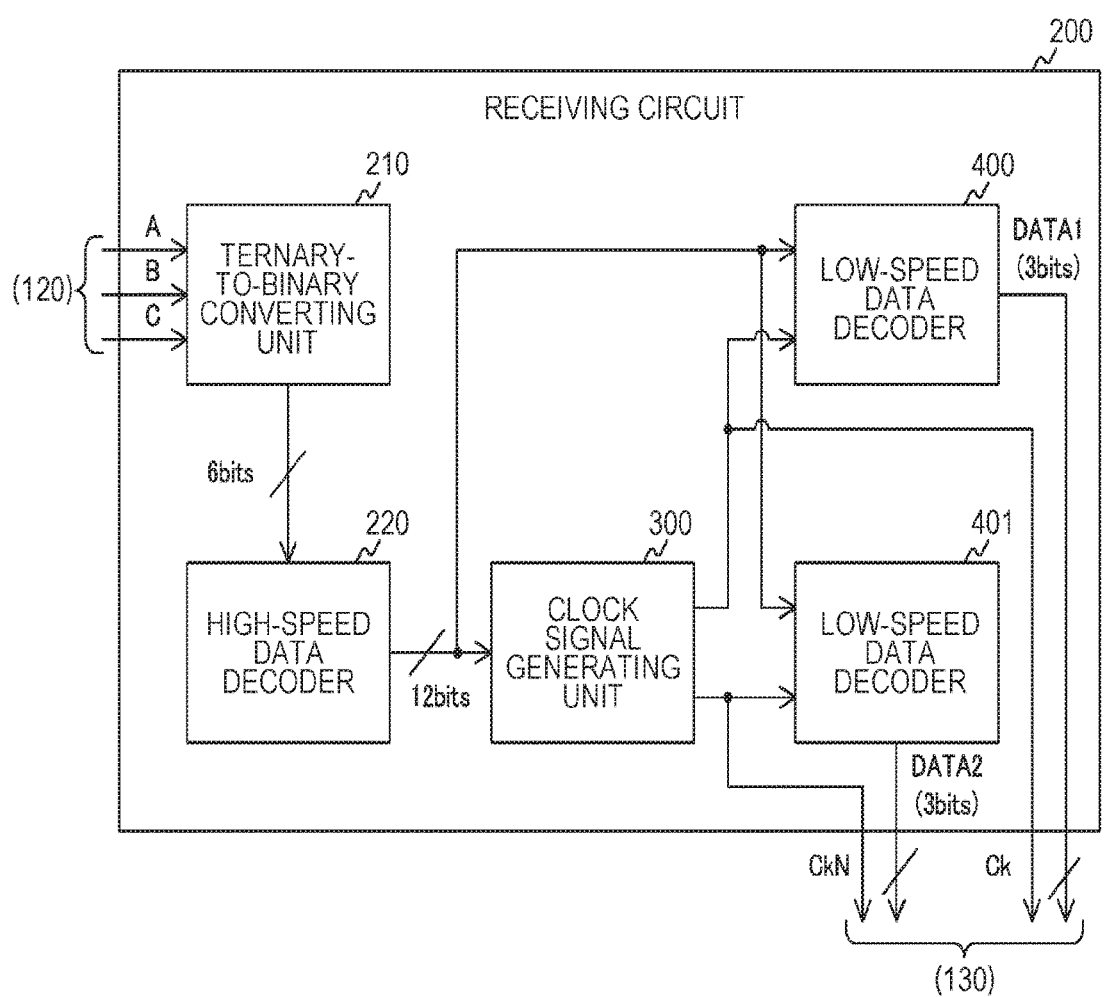
FIG. 25 is a block diagram illustrating a configuration example of a receiving circuit in a second modified example of the first embodiment.

FIG. 25 is a block diagram illustrating a configuration example of the receiving circuit 200 in the second modified example of the first embodiment. The receiving circuit 200 of the second modified example is different from that of the first embodiment in that the receiving circuit 200 does not include the separating unit 230 but includes low-speed data decoders 400 and 401 instead of the low-speed data decoders 260 and 298.

The low-speed data decoder 400 generates the data signal DATA1 from the status data and the inverted status data input from the high-speed data decoder 220. The low-speed data decoder 401 generates the data signal DATA2 from the status data and the inverted status data input from the high-speed data decoder 220.

Further, the clock signal generating unit 300 of the second modified example supplies the clock signal Ck to the low-speed data decoder 400 and supplies the clock signal CkN to the low-speed data decoder 401.

Figure 26:
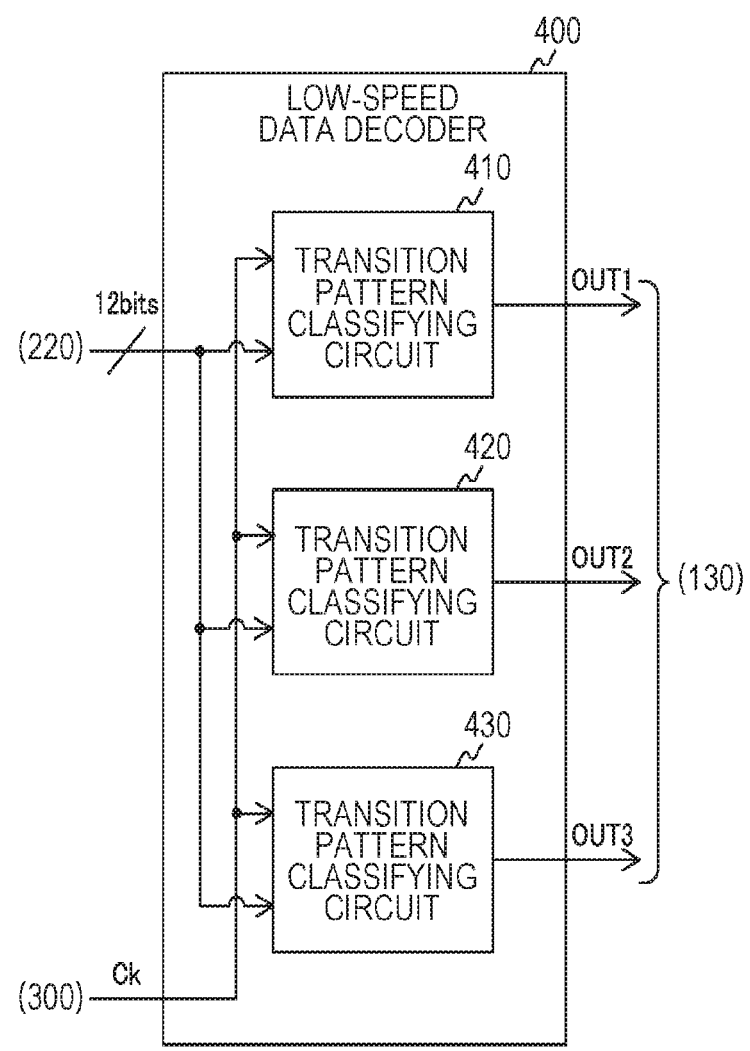
FIG. 26 is a block diagram illustrating a configuration example of a low-speed data decoder in the second modified example of the first embodiment.

FIG. 26 is a block diagram illustrating a configuration example of the low-speed data decoder 400 in the second modified example of the first embodiment. The low-speed data decoder 400 includes transition pattern classifying circuits 410, 420, and 430. Each of the transition pattern classifying circuits 410, 420, and 430 classifies the transition pattern of the status from the status data and the inverted status data. The transition pattern classifying circuit 410 outputs a bit OUT1 indicating a classification result to the processing circuit 130, and the transition pattern classifying circuit 420 outputs a bit OUT2 indicating a classification result to the processing circuit 130. The transition pattern classifying circuit 430 outputs a bit OUT3 indicating a classified result to the processing circuit 130. Data including OUT1 to OUT3 corresponds to the data signal DATA1.

Figure 27:
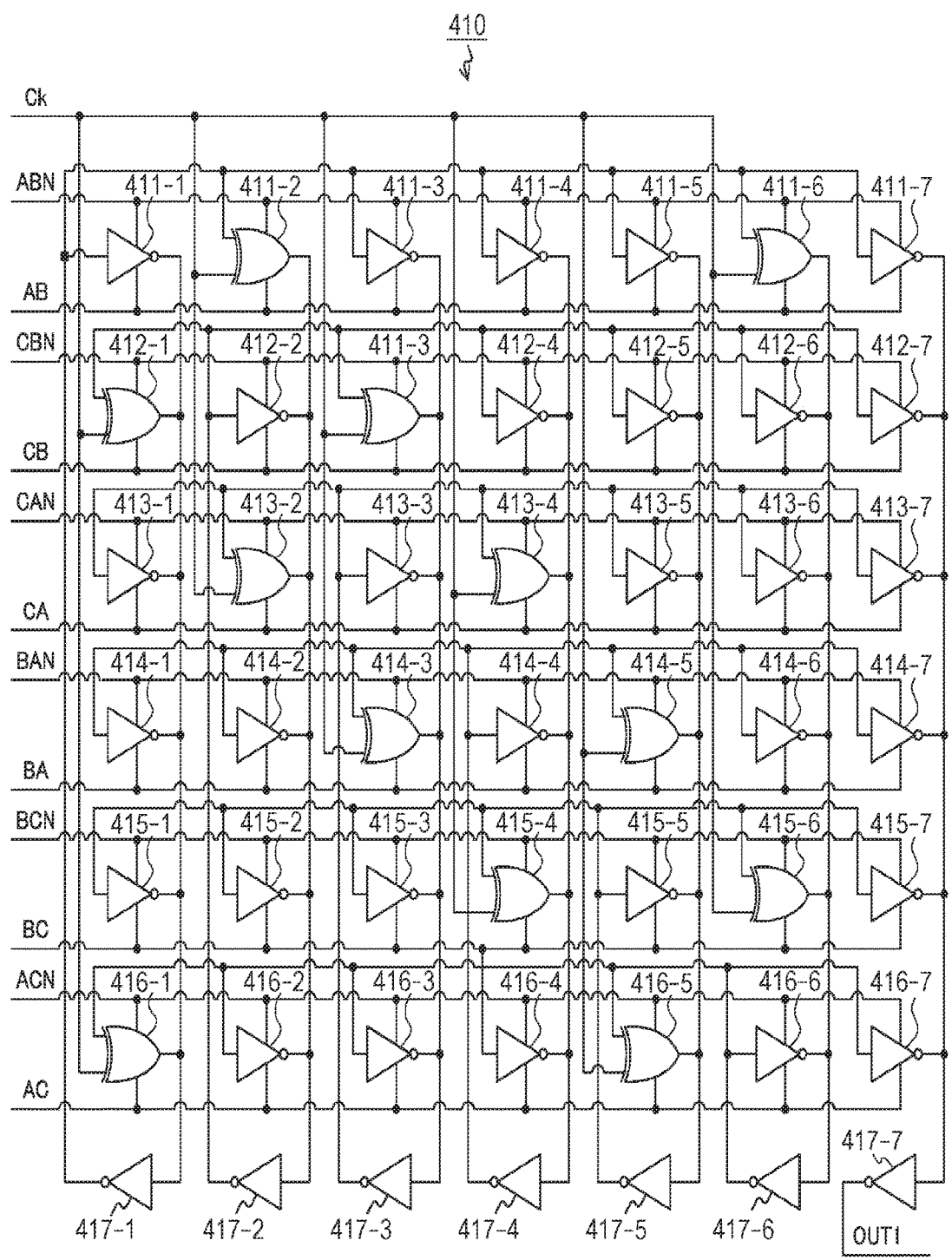
FIG. 27 is a circuit diagram illustrating a configuration example of a transition pattern classifying circuit that outputs a first bit in the second modified example of the first embodiment.

FIG. 27 is a circuit diagram illustrating a configuration example of the transition pattern classifying circuit 410 that outputs the first bit in the second modified example of the first embodiment. The transition pattern classifying circuit 410 includes an inverter 411-1, an XOR gate 411-2, inverters 411-3, 411-4, and 411-5, an XOR gate 411-6, and an inverter 411-7 which are arranged in a first row. Further, the transition pattern classifying circuit 410 includes an XOR gate 412-1, an inverter 412-2, an XOR gate 412-3, inverters 412-4, 412-5, 412-6, and 412-7 which are arranged in a second row. Further, the transition pattern classifying circuit 410 includes an inverter 413-1, an XOR gate 413-2, an inverter 413-3, an XOR gate 413-4, inverters 413-5, 413-6, and 413-7 which are arranged in a third row.

Further, the transition pattern classifying circuit 410 includes inverters 414-1 and 414-2, an XOR gate 414-3, an inverter 414-4, an XOR gate 414-5, inverters 414-6 and 413-7 which are arranged in a fourth row. Further, the transition pattern classifying circuit 410 includes inverters 415-1, 415-2, and 415-3, an XOR gate 415-4, an inverter 415-5, an XOR gate 415-6, and an inverter 415-7 which are arranged in a fifth row. Further, the transition pattern classifying circuit 410 includes an XOR gate 416-1, inverters 416-2 to 416-4, an XOR gate 416-5, and inverters 416-6 and 416-7 which are arranged in a sixth row. Further, the transition pattern classifying circuit 410 includes inverters 417-1 to 417-7.

Each of the inverters and the XOR gates in the first to sixth rows includes a differential input enable terminal. An operation of the XOR gate which is performed in response to a signal input to the enable terminal is similar to that of the inverter except that the XOR gate outputs an exclusive logical sum instead of performing inversion. ABN is input to a power source side enable terminal of each element in the first row, and AB is input to a ground side enable terminal. CBN is input to a power source side enable terminal of each element in the second row, and CB is input to a ground side enable terminal.

Further, CAN is input to a power source side enable terminal of each element in the third row, and CA is input to a ground side enable terminal. BAN is input to a power source side enable terminal of each element in the fourth row, and BA is input to a ground side enable terminal. BCN is input to a power source side enable terminal of each element in the fifth row, and BC is input to a ground side enable terminal. ACN is input to a power source side enable terminal of each element in the sixth row, and AC is input to a ground side enable terminal.

Each of output terminals of the elements in a first column is connected to an input terminal of the inverter 417-1, and an output terminal of the inverter 417-1 is connected to an input terminal of each element in the first row. Each of output terminals of the elements in a second column is connected to an input terminal of the inverter 417-2, and an output terminal of the inverter 417-2 is connected to an input terminal of each element in the second row. Each of output terminals of the elements in a third column is connected to an input terminal of the inverter 417-3, and an output terminal of the inverter 417-3 is connected to an input terminal of each element in the third row.

Further, each of output terminals of the elements in a fourth column is connected to an input terminal of the inverter 417-4, and an output terminal of the inverter 417-4 is connected to an input terminal of each element in the fourth row. Each of output terminals of the elements in a fifth column is connected to an input terminal of the inverter 417-5, and an output terminal of the inverter 417-5 is connected to an input terminal of each element in the fifth row. Each of output terminals of the elements in a sixth column is connected to an input terminal of the inverter 417-6, and an output terminal of the inverter 417-6 is connected to an input terminal of each element in the sixth row. Further, each of the output terminals of the inverters in the seventh column is connected to an input terminal of the inverter 417-7, and the inverter 417-1 outputs OUT1. Further, the clock signal Ck is input to one of the input terminals of each XOR gate.

Figure 28:
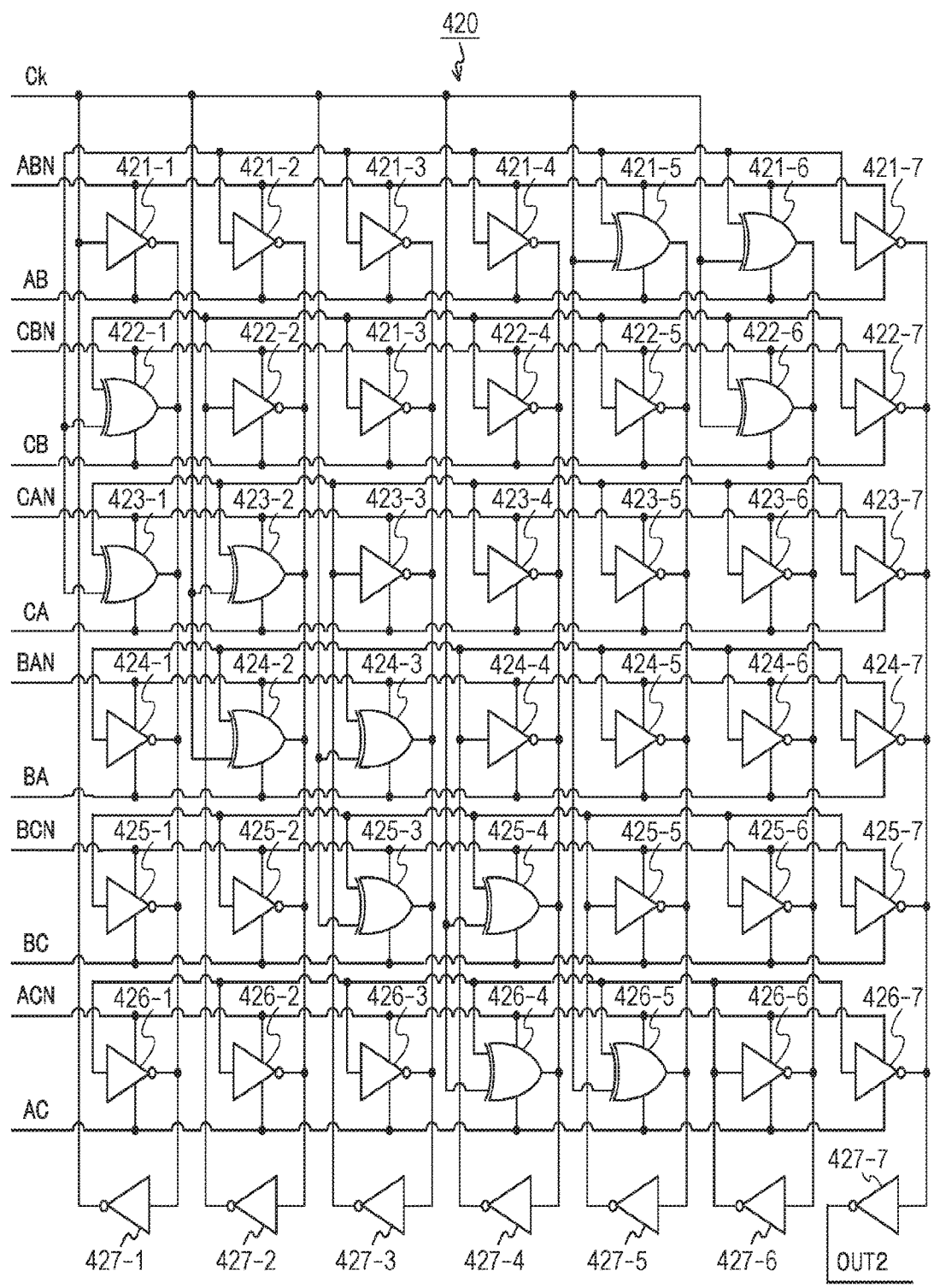
FIG. 28 is a circuit diagram illustrating a configuration example of a transition pattern classifying circuit that outputs a second bit in the second modified example of the first embodiment.

FIG. 28 is a circuit diagram illustrating a configuration example of the transition pattern classifying circuit 420 that outputs the second bit in the second modified example of the first embodiment. In the transition pattern classifying circuit 420, 7×7 elements are arranged similarly to the transition pattern classifying circuit 410, but positions of the XOR gates are different from those of the transition pattern classifying circuit 410.

XOR gates are arranged in the fifth column and the sixth column in the first row and XOR gates are arranged in the first column and the sixth column in the second row. XOR gates are arranged in the first column and the second column in the third row and XOR gates are arranged in the second column and the third column in the fourth row. XOR gates are arranged in the third column and the fourth column in the fifth row, and XOR gates are arranged in the fourth column and the fifth column in the sixth row.

Figure 29:
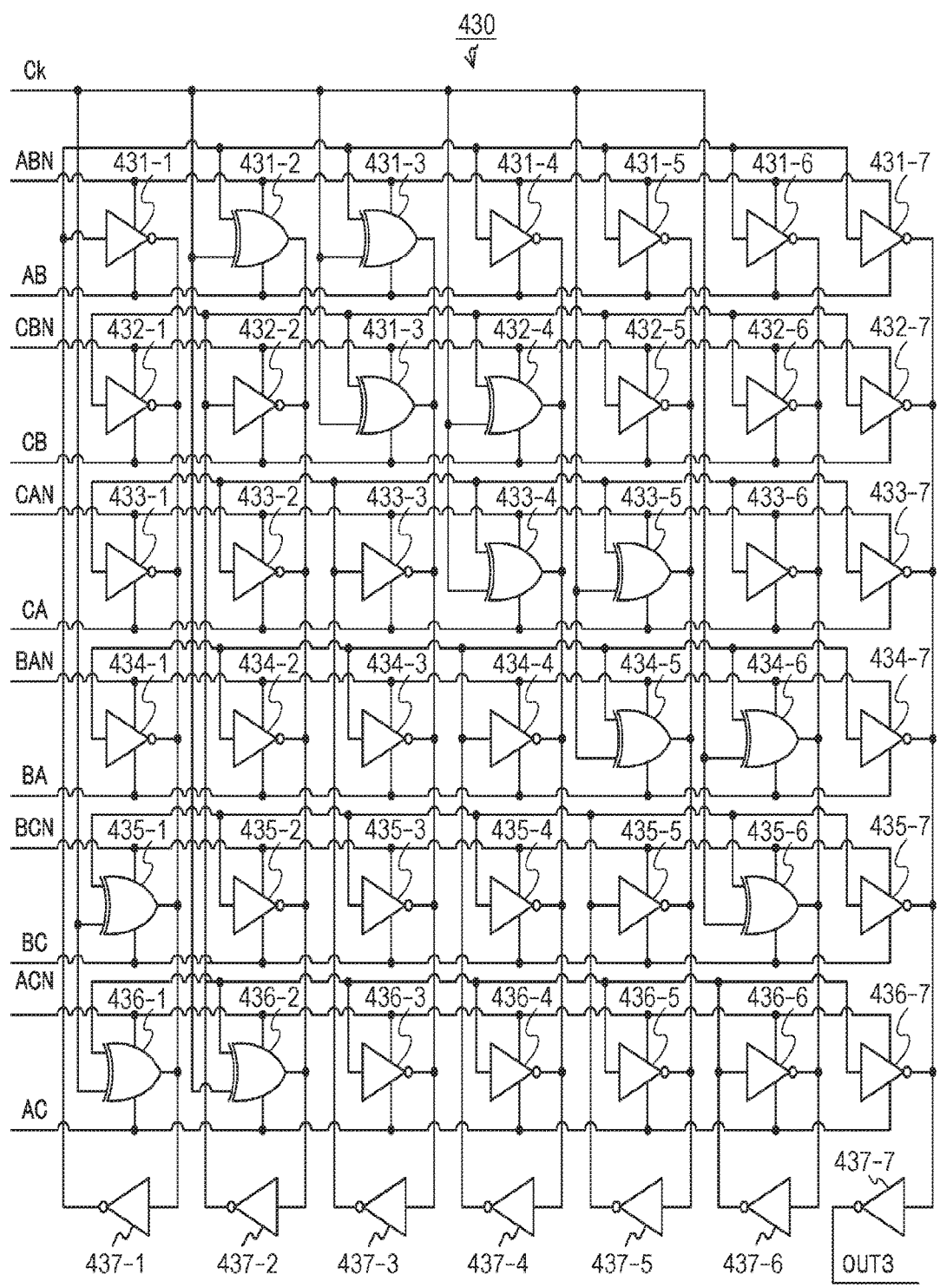
FIG. 29 is a circuit diagram illustrating a configuration example of a transition pattern classifying circuit that outputs a third bit in the second modified example of the first embodiment.

FIG. 29 is a circuit diagram illustrating a configuration example of the transition pattern classifying circuit 430 that outputs the third bit in the second modified example of the first embodiment. In the transition pattern classifying circuit 430, 7×7 elements are arranged similarly to the transition pattern classifying circuit 410, but positions of the XOR gates are different from those of the transition pattern classifying circuit 410.

XOR gates are arranged in the second column and the third column in the first row, and XOR gates are arranged in the third column and the fourth column in the second row. XOR gates are arranged in the fourth column and fifth column in the third row, and XOR gates are arranged in the fifth column and the sixth column in the fourth row. XOR gates are arranged in the first column and the sixth column in the fifth row, and XOR gates are arranged in the first column and the second column in the sixth row. With this configuration, the data signal DATA1 having the value corresponding to the transition patterns of the statuses is generated from the status data X and Y.

Note that the configuration of the low-speed data decoder 401 is similar to that of the low-speed data decoder 400 except that the clock signal CkN is input instead of the clock signal Ck. Further, the circuits illustrated in FIGS. 27 to 29 are examples of a circuit that deal with the transition pattern of the 6-status 5-transition signal, and it is possible to deal with a reception signal (for example, a 6-status 2-transition signal) other than the 6-status 5-transition signal by changing an arrangement of the inverters or the XOR gates or the number of the inverters or the XOR gates.

As described above, according to the second modified example of the first embodiment of the present technology, the low-speed data decoders 400 and 401 generate the data signal corresponding to the transition pattern, and thus it is unnecessary to install the separating unit 230.

2. Second Embodiment

In the first embodiment described above, the receiving circuit 200 separates the reception signal into the data signals of 2 systems whose transfer speed is half, but the reception signal may be separated into data signals of 4 systems whose transfer speed is ¼. A receiving circuit 200 of a second embodiment is different from that of the first embodiment in that the receiving circuit 200 separates the reception signal into data signals of 4 systems.

Figure 30:
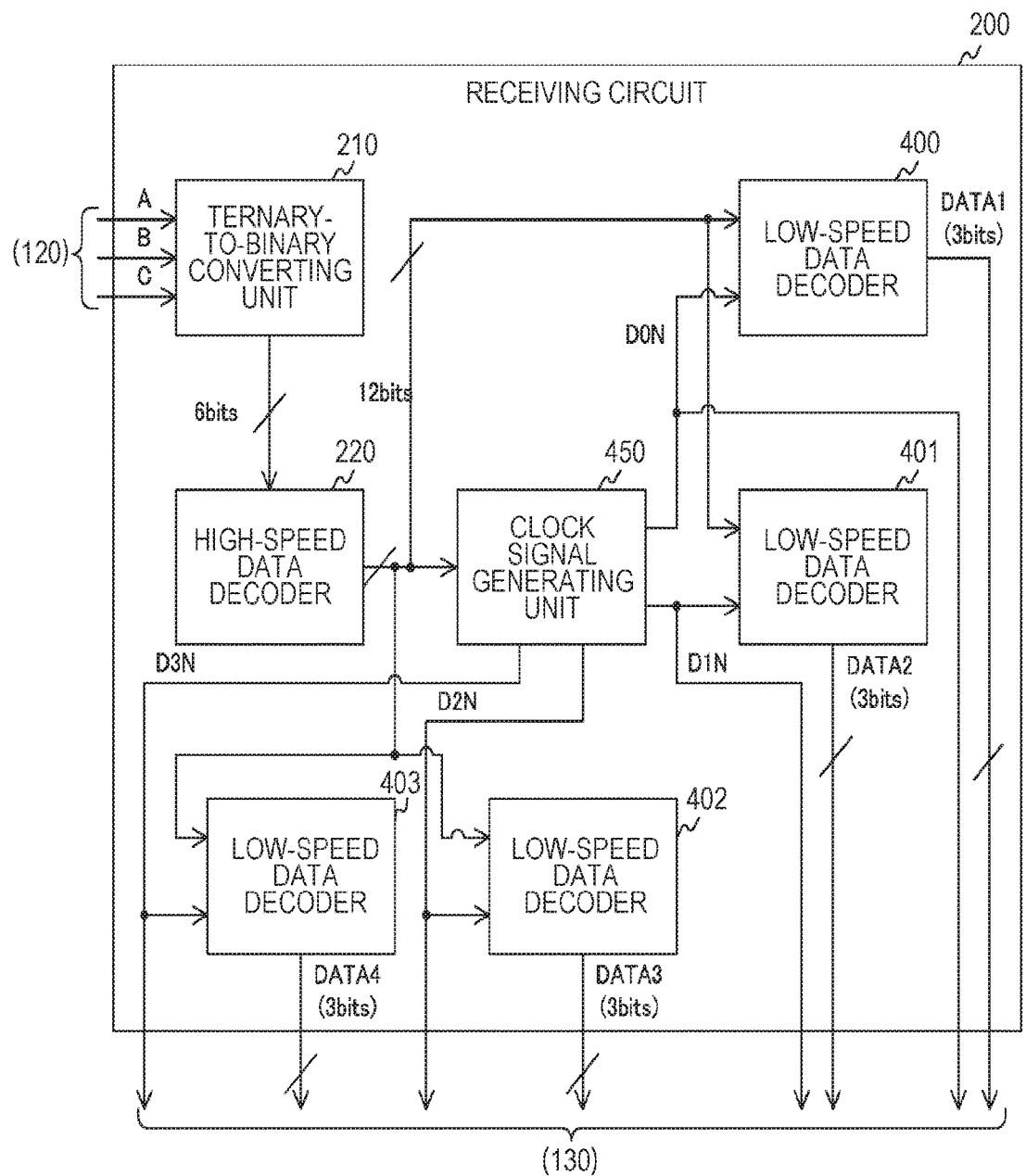
FIG. 30 is a block diagram illustrating a configuration example of a receiving circuit in a second embodiment.

FIG. 30 is a block diagram illustrating a configuration example of the receiving circuit 200 in the second embodiment. The receiving circuit 200 of the second embodiment is different from that of the first embodiment in that receiving circuit 200 does not include the separating unit 230 but includes a clock signal generating unit 450 instead of the clock signal generating unit 300. Further, the receiving circuit 200 of the second embodiment differs from that of the first embodiment in that receiving circuit 200 includes low-speed data decoders 400, 401, 402, and 403 instead of the low-speed data decoders 260 and 298.

Each time the reception signal transitions, the clock signal generating unit 450 selects and inverts one of the clock signals D0N, D1N, D2N, and D3N in order. The clock signal generating unit 450 supplies the clock signal D0N to the low-speed data decoder 400 and supplies the clock signal D1N to the low-speed data decoder 401. Further, the clock signal generating unit 450 supplies the clock signal D2N to the low-speed data decoder 402 and supplies the clock signal D3N to the low-speed data decoder 403. Further, the clock signal generating unit 450 supplies the clock signal D1N to the processing circuit 130 as a signal corresponding to the data signal DATA1 and supplies the clock signal D2N to the processing circuit 130 as a signal corresponding to the data signal DATA2. The clock signal generating unit 450 supplies the clock signal D3N to the processing circuit 130 as a signal corresponding to a data signal DATA3 and supplies the clock signal D0N to the processing circuit 130 as a signal corresponding to the data signal DATA4.

The processing circuit 130 of the second embodiment acquires the data signal DATA1 in synchronization with the clock signal D1N and acquires the data signal DATA2 in synchronization with the clock signal D2N. Further, the processing circuit 130 acquires the data signal DATA3 in synchronization with the clock signal D3N, and acquires the data signal DATA4 in synchronization with the clock signal D0N. Note that each of the low-speed data decoders 401, 402, and 403 has a similar configuration to that of the low-speed data decoder 400 in the second modified example of the first embodiment. The low-speed data decoder 402 generates the data signal DATA3, and the low-speed data decoder 403 generates the data signal DATA4 and outputs it to the processing circuit 130.

Figure 31:
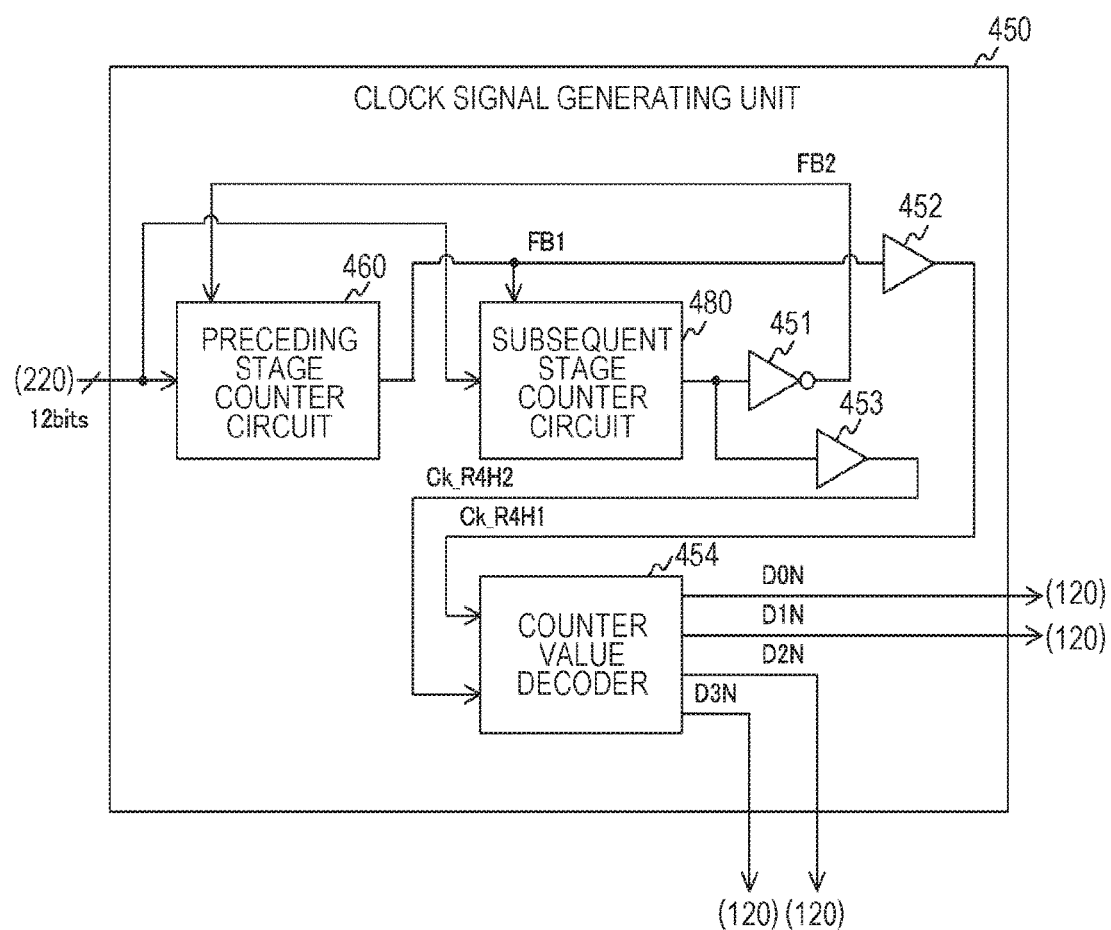
FIG. 31 is a circuit diagram illustrating a configuration example of a clock signal generating unit in the second embodiment.

FIG. 31 is a circuit diagram illustrating a configuration example of the clock signal generating unit 450 in the second embodiment. The clock signal generating unit 450 includes a preceding stage counter circuit 460, a subsequent stage counter circuit 480, an inverter 451, buffers 452 and 453, and a counter value decoder 454.

A circuit including the preceding stage counter circuit 460 and the subsequent stage counter 480 operates as a quaternary Johnson counter circuit that counts a 2-bit counter value each time the status transitions.

The preceding stage counter circuit 460 generates a feedback signal FB1 from the status data, the inverted status data, and a feedback signal FB2 and outputs the feedback signal FB1 to the subsequent stage counter circuit 480 and the buffer 452. The subsequent stage counter circuit 480 generates an output signal from the status data, the inverted status data, and the feedback signal FB1 and supplies the output signal to the inverter 451 and the buffer 453.

The inverter 451 inverts the output signal of the subsequent stage counter circuit 480 and outputs the inverted output signal to the preceding stage counter circuit 460 as the feedback signal FB2. The buffer 452 supplies the feedback signal FB1 to the counter value decoder 454 as a clock signal Ck_R4H1. The buffer 453 supplies the output signal of the subsequent stage counter circuit 480 to the counter value decoder 454 as a clock signal Ck_R4H2.

The counter value decoder 454 converts the clock signal Ck_R4H1 and the clock signal Ck_R4H2 into the clock signals D0N, D1N, D2N, and D3N.

Figure 32:
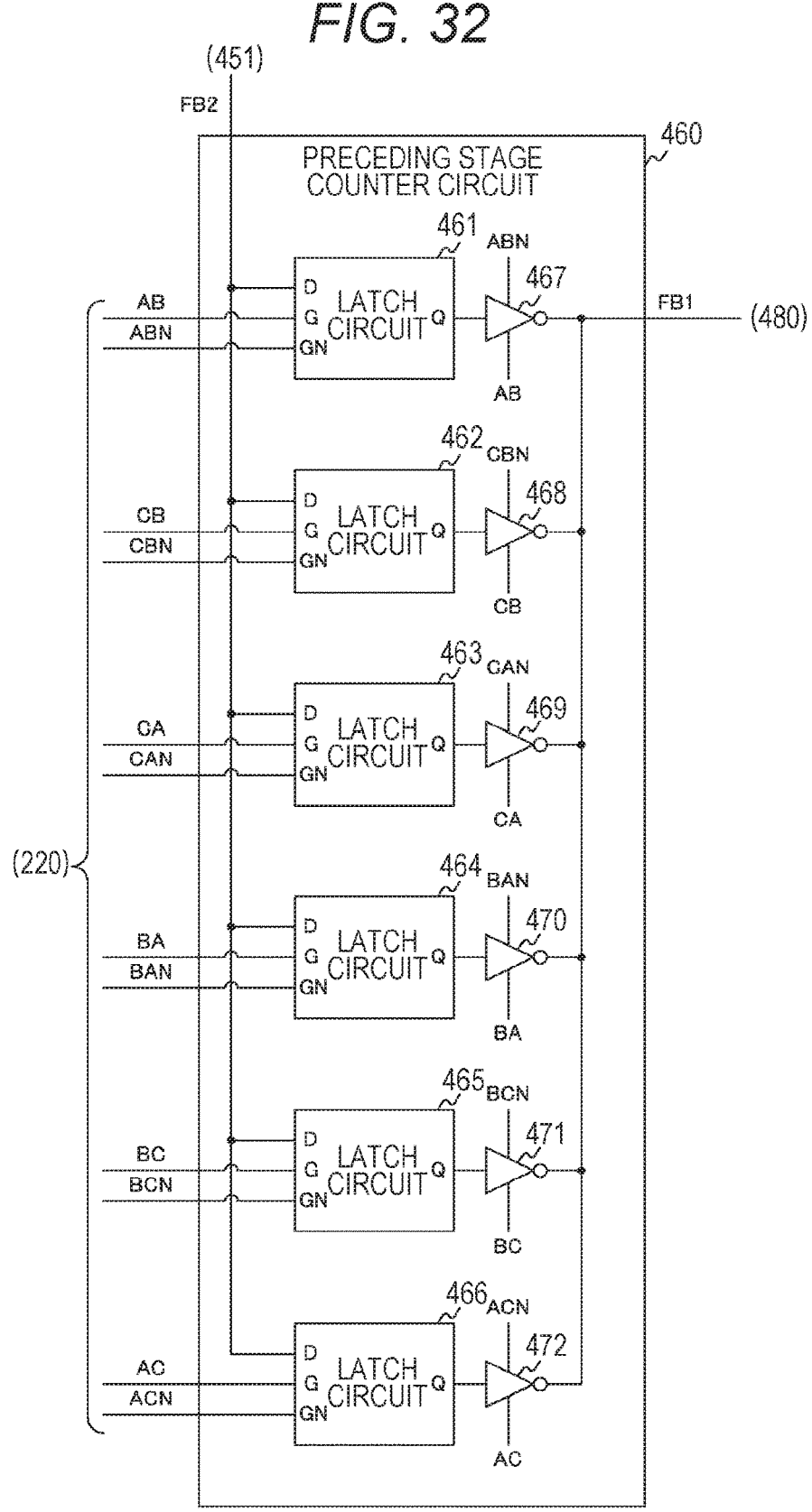
FIG. 32 is a circuit diagram illustrating a configuration example of a preceding stage counter circuit in the second embodiment.

FIG. 32 is a circuit diagram illustrating a configuration example of the preceding stage counter circuit 460 in the second embodiment. The preceding stage counter circuit 460 includes latch circuits 461, 462, 463, 464, 465, and 466 and inverters 467, 468, 469, 470, 471, and 472. Connections of the circuits and the elements are similar to those of the binary counter circuit 310 except that the feedback signal FB1 is input to the latch circuits instead of the output of the inverter. Note that a configuration of the subsequent stage counter circuit 480 is similar to that of the preceding stage counter circuit 460 except that the feedback signal FB1 is input to the latch circuits instead of the feedback signal FB2.

FIG. 33 illustrates an example of a truth table of the counter value decoder 454 in the second embodiment. In a case where both of the clock signals Ck_R4H1 and Ck_R4H2 are "0," the counter value decoder 454 sets only the clock signal D0N to "1." In a case where the clock signal Ck_R4H1 is "0," and the clock signal Ck_R4H2 is "1," the counter value decoder 454 sets only the clock signal D1N to "1." In a case where the clock signal Ck_R4H1 is "1," and the clock signal Ck_R4H2 is "0," the counter value decoder 454 sets only the clock signal D2N to "1." Further, in a case where both of the clock signals Ck_R4H1 and Ck_R4H2 are "1," the counter value decoder 454 sets only the clock signal D3N to "1."

As described above, a quaternary counter circuit including the preceding stage counter circuits 460 and 480 counts a 2-bit counter value (the clock signals Ck_R4H1 and Ck_R4H2) each time the status transitions. Then, each time the counter value is counted, the counter value decoder 454 sequentially selects one of the clock signals D0N, D1N, D2N, and D3N and sets only the selected signal to "1." As a result, each time the status transitions, any one of the clock signals D0N, D1N, D2N, and D3N is selected, and only the selected signal becomes "1." The clock signals D0N, D1N, D2N, and D3N have different phases and have a frequency which is ¼ of that of the clock signal Ck_D0 on the transmission side.

Note that the receiving circuit 200 may separate the reception signal into data signals of p systems (p is an integer of 5 or more). In this case, it is preferable that p circuits similar to the low-speed data decoder 400 be provided, and the clock signal generating unit 450 generate p clock signals having different phases through a p-ary counter circuit instead of the quaternary counter circuit.

As described above, according to the second embodiment of the present technology, since the receiving circuit 200 separates the reception signal into the data signals of 4 systems whose transfer speed is ¼, and thus the processing circuit 130 is able to process the data signals in parallel at the speed which is ¼ of the transmission side.

3. Third Embodiment

In the first embodiment described above, the receiving circuit 200 generates the data signal and the clock signal, but instead of the receiving circuit 200, the processing circuit at the subsequent stage may generate the data signal. An electronic device 100 of a third embodiment differs from that of the first embodiment in that instead of the receiving circuit 200, the processing circuit at the subsequent stage generates the data signal.

Figure 34:
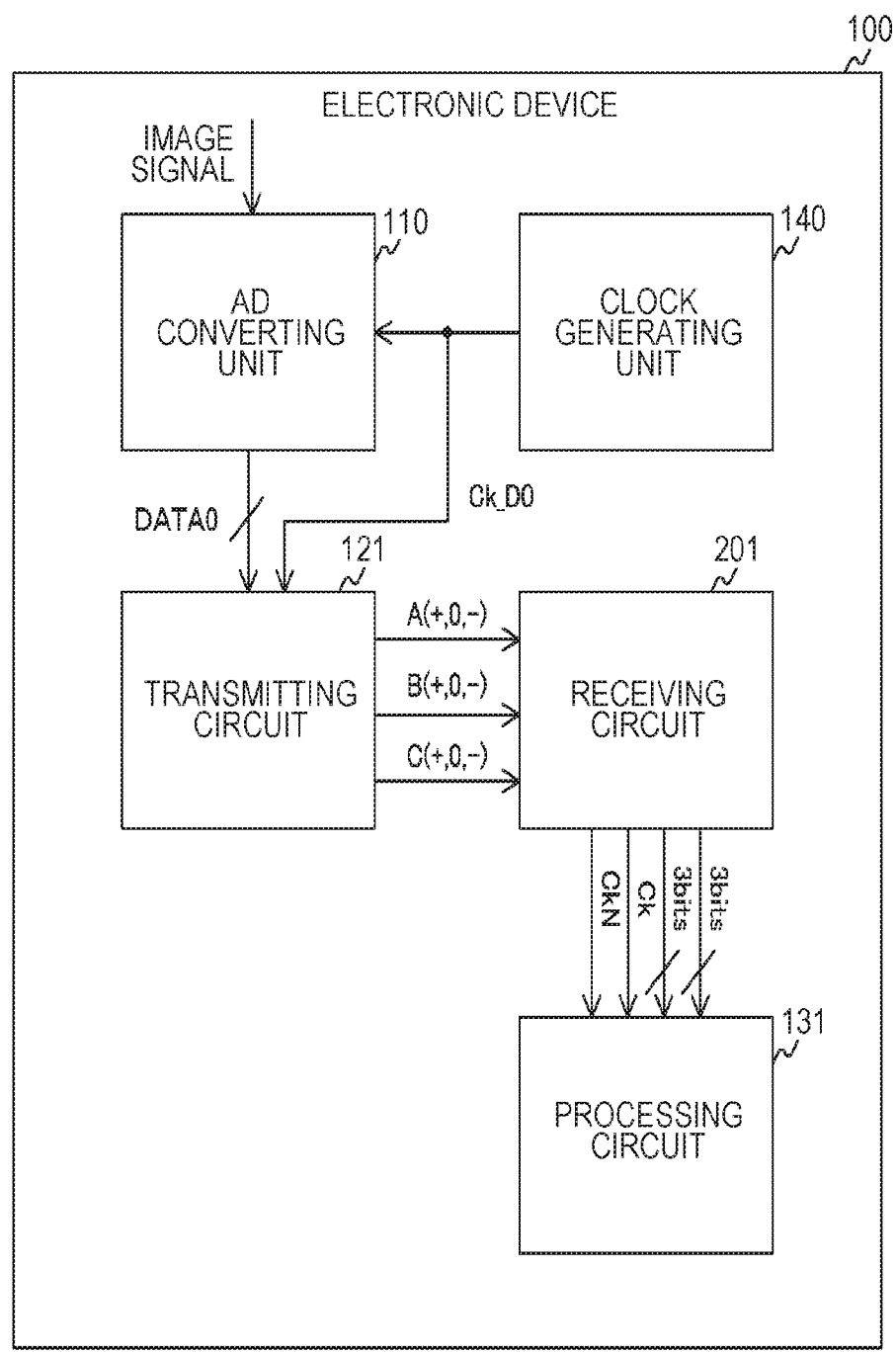
FIG. 34 is a block diagram illustrating a configuration example of an electronic device in a third embodiment.

FIG. 34 is a block diagram illustrating a configuration example of the electronic device 100 in the third embodiment. The electronic device 100 of the third embodiment is different from that of the first embodiment in that a transmitting circuit 121, a receiving circuit 201, and a processing circuit 131 are provided in place of the transmitting circuit 120, the receiving circuit 200, and the processing circuit 130.

The transmitting circuit 121 is different from the transmitting circuit 120 of the first embodiment in that the transmitting circuit 121 transmits a 6-status 2-transition signal instead of the 6-status 5-transition signal. Further, the receiving circuit 201 separates the status data into two and supplies the separated data to the processing circuit 131 together with the clock signals Ck and CkN. The processing circuit 131 has a similar function to that of the low-speed data decoder 260 or the like and generates the data signal from the status data and the clock signal input from the receiving circuit 131.

Figure 35:
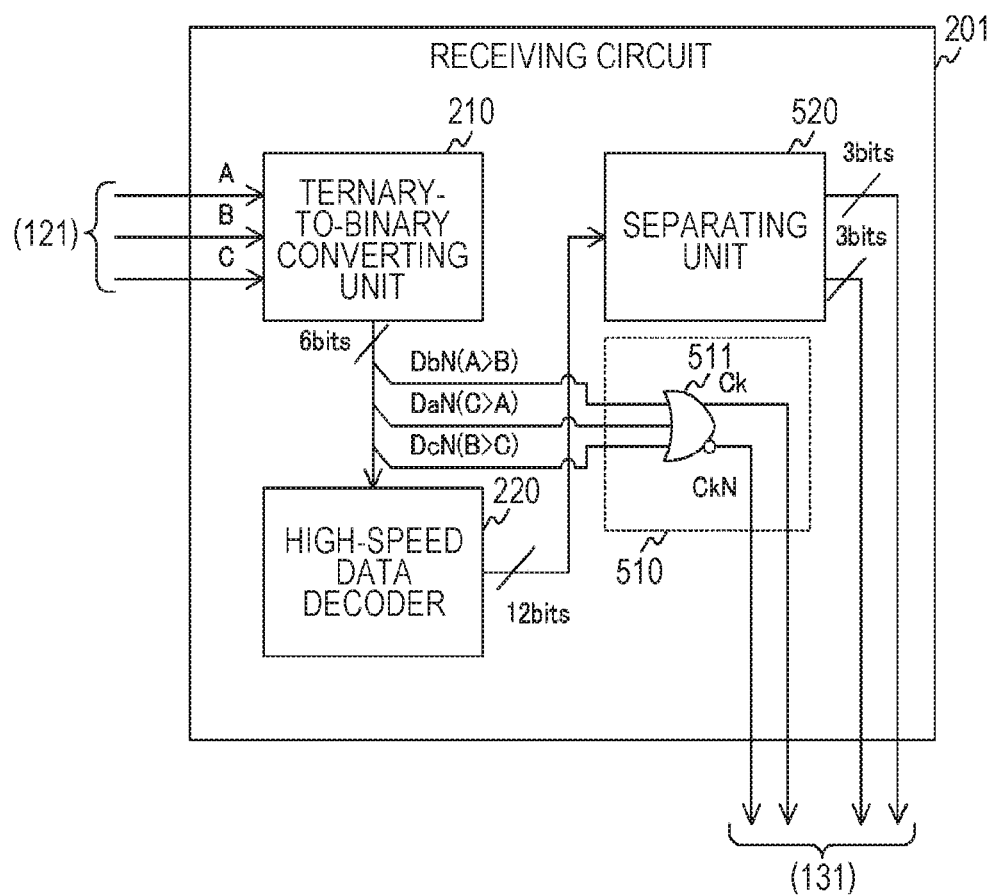
FIG. 35 is a block diagram illustrating a configuration example of a receiving circuit in the third embodiment.

FIG. 35 is a block diagram illustrating a configuration example of the receiving circuit 201 in the third embodiment. The receiving circuit 201 of the third embodiment is different from that of the first embodiment in that the receiving circuit 201 does not include the low-speed data decoders 260 and 298 and includes a separating unit 520 and a clock signal generating unit 510 instead of the separating unit 230 and the clock signal generating unit 300. The clock signal generating unit 510 includes an OR gate 511.

The OR gate 511 outputs a logical sum signal of the bits DaN, DbN, and DcN as the clock signal Ck and outputs a signal of an inverted value of the logical sum as the clock signal CkN.

The separating unit 520 separates the status data input from the high-speed data decoder into 2 systems and supplies them to the processing circuit 131.

Figure 36:
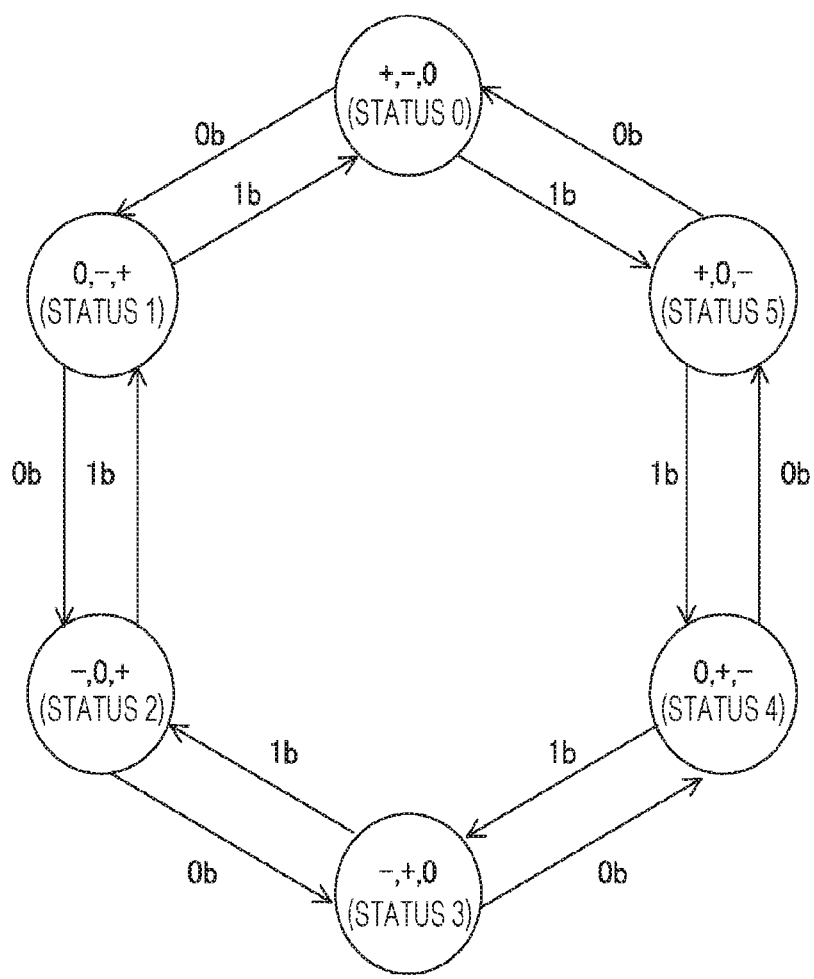
FIG. 36 is an example of a status transition diagram of a 6-status 2-transition signal in the third embodiment.

FIG. 36 is an example of a status transition diagram of the 6-status 2-transition signal in the third embodiment. For example, a status number "0" is allocated to a status in which values of reception signals D, E and F are "+, −, 0," and a status number "1" is allocated to a status in which the values of the reception signals D, E and F are "0, −, +." A status number "2" is allocated to a status in which the values of the reception signals A, B and C are "−, 0, +," and a status number "3" is allocated to a status in which the values of the reception signals A, B and C are "−, +, 0." Further, a status number "4" is allocated to a status in which the values of the reception signals A, B and C are "0, +, −," and a status number "5" is allocated to a status in which the values of the reception signals A, B and C are "+, 0, −." The transition patterns in which transition from one of the six statuses to the other statuses is performed are classified into two groups, and a data signal of "0" or "1" is allocated to each group. The transmitting circuit 121 causes the status to transition according to the transition pattern corresponding to the data signal when transmitting the data signal.

For example, the transmitting circuit 121 performs transition from the status 0 to the status 1 in synchronization with the clock signal when transmitting the data signal of "0." Subsequently, the transmitting circuit 121 performs transition from the status 1 to the status 2 in synchronization with the clock signal when transmitting the data signal of "0." Then, the transmitting circuit 121 performs transition from the status 2 to the status 1 in synchronization with the clock signal when transmitting the data signal of "1."

Figure 37:
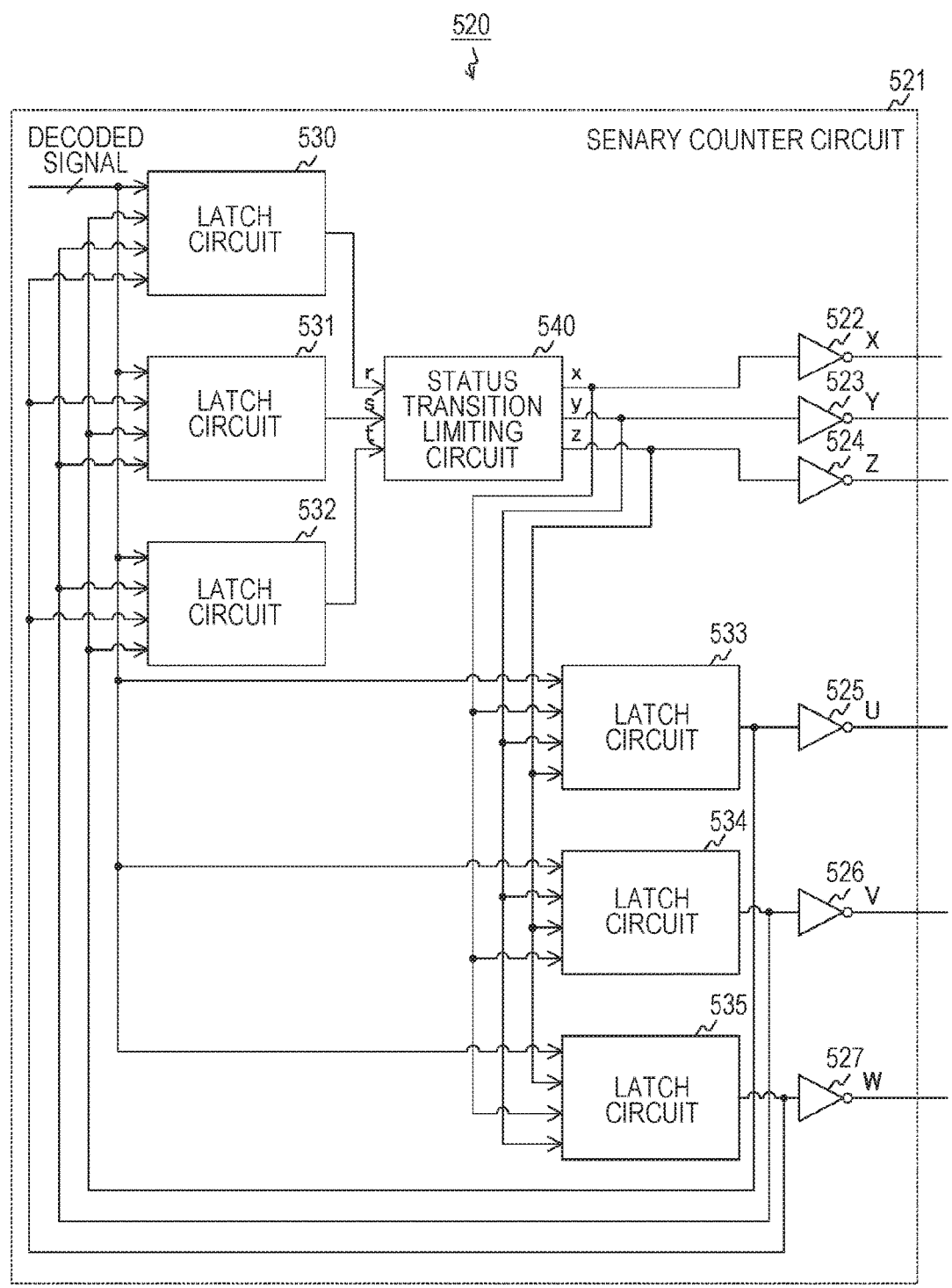
FIG. 37 is a circuit diagram illustrating a configuration example of a separating unit in the third embodiment.

FIG. 37 is a circuit diagram illustrating a configuration example of the separating unit 520 in the third embodiment. The separating unit 520 includes a senary counter circuit 521. The senary counter circuit 521 includes inverters 522, 523, 524, 525, 526, and 527, latch circuits 530, 531, 532, 533, 534, and 535, and a status transition limiting circuit 540.

Decoded signals configured with the status data and the inverted status data are input to the latch circuits 530, 531, 532, 533, 534, and 535. Further, the feedback signals fed back from the latch circuits 533, 534, and 535 are input to the latch circuits 530, 531, and 532. On the other hand, bits x, y, and z from the status transition limiting circuit are input to the latch circuits 533, 534 and 535.

In a case where the decoded signal indicates an even-numbered status, the latch circuits 530, 531, and 532 invert and hold the feedback signals and then output the held values to the status transition limiting circuit 540 as bits r, s, and t. On the other hand, in a case where the decoded signal indicates an odd-numbered status, the latch circuits 533, 534 and 535 invert and hold the input signals and output the held values to the latch circuits 530, 531, and 532 as the feedback signals. Further, the latch circuits 533, 534, and 535 also output the feedback signals to the inverters 525, 526, and 527.

The status transition limiting circuit 540 limits transition patterns of the statuses indicated by the bits r, s, and t to two specific patterns in the 6-status 2-transition signal. If the transition pattern is a specific pattern, the status transition limiting circuit 540 outputs the bits r, s, and t to the inverters 522, 523 and 524 and the latch circuits 533, 534 and 535 as the bits x, y, and z. On the other hand, if the transition pattern is not a specific pattern, the status transition limiting circuit 540 blocks the output of such signals. Since the transition pattern is limited as described above, it is possible to block the input signal even through an invalid input signal is generated when it is powered on or when a noise is mixed in.

The inverters 522, 523, and 524 invert the bits x, y, and z and output X, Y, and Z. The data configured with the bits X, Y, and Z indicates an even-numbered status. The inverters 525, 526 and 527 invert the feedback signals input from the latch circuits 533, 534 and 535 and output U, V, and W. The data configured with the bits UV and W indicates an odd-numbered status. Note that a circuit including the inverters 522, 523, and 524 is an example of a first inverting unit set forth in claims, and a circuit including inverters 525, 526, and 527 is an example of a second inverting unit set forth in claims.

Further, data configured with X, Y, and Z and U, V, and W indicates a counter value of the senary counter circuit 521 which is counted each time the status indicated by the decoded signal transitions.

Figure 38:
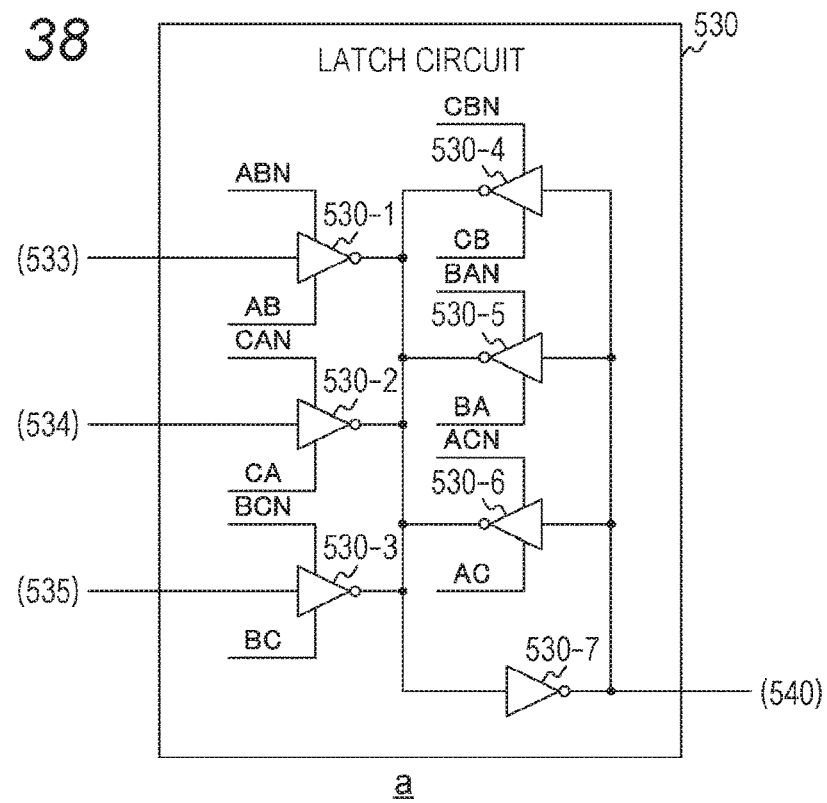
FIG. 38 is a circuit diagram illustrating a configuration example of a latch circuit in the third embodiment.
Figure 38:
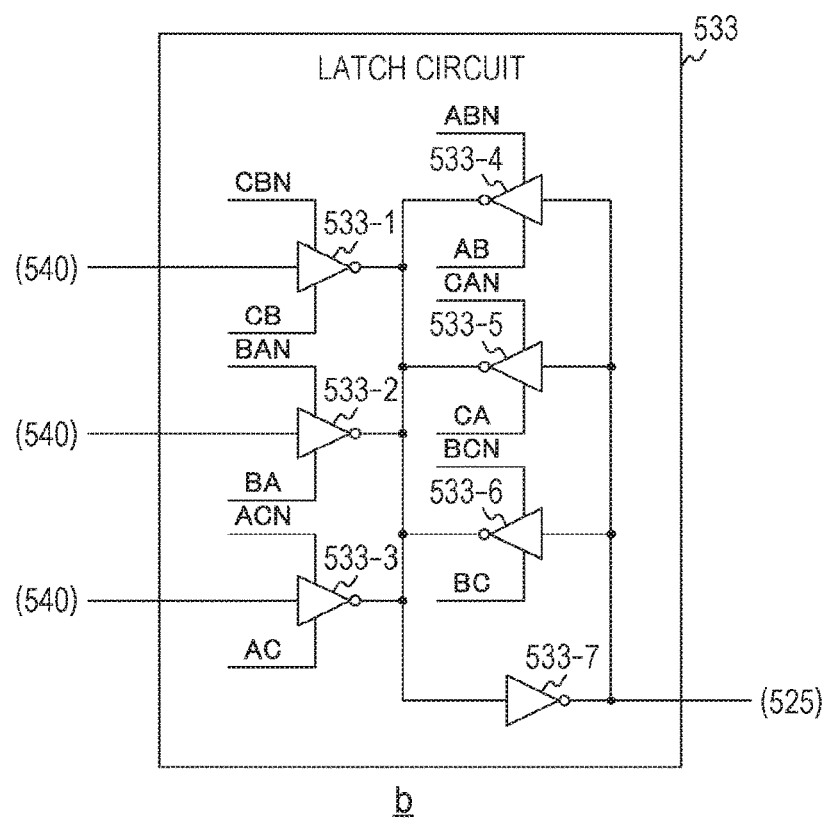

FIG. 38 is a circuit diagram illustrating a configuration example of the latch circuits 530 and 533 in the third embodiment. "a" in FIG. 38 is a circuit diagram illustrating a configuration example of the latch circuit 530. The latch circuit 530 includes inverters 530-1, 530-2, 530-3, 530-4, 530-5, 530-6, and 530-7. Each of the inverters excluding the inverter 530-7 has a differential input enable terminal. Note that configurations of the latch circuits 531 and 532 are similar to that of the latch circuit 530.

ABN is input to a power source side of the enable terminal of the inverter 530-1, and AB is input to a ground side. CAN is input to a power source side of the enable terminal of the inverter 530-2, and CA is input to a ground side. BCN is input to a power source side of the enable terminal of the inverter 530-3 and BC is input to a ground side. Further, an input terminal of the inverter 530-1 is connected to the latch circuit 533, an input terminal of the inverter 530-2 is connected to the latch circuit 534, and an input terminal of the inverter 530-3 is connected to the latch circuit 535. An output terminal of each of the inverters 530-1, 530-2 and 530-3 is connected to an input terminal of the inverter 530-7.

A circuit including the inverters 530-1, 530-2, and 530-3 functions as a multiplexer that selects the feedback signal, inverts the selected signal, and outputs the inverted signal to the inverter 530-7 in a case where the decoded signal indicates an even-numbered status.

Further, CBN is input to a power source side of the enable terminal of the inverter 530-4, and CB is input to a ground side. BAN is input to a power source side of the enable terminal of the inverter 530-5, and BA is input to a ground side. ACN is input to a power source side of the enable terminal of the inverter 530-6, and AC is input to a ground side. Further, an input terminal of each of the inverters 530-4, 530-5 and 530-6 is connected to an output terminal of the inverter 530-7. An output terminal of each of the inverters 530-4, 530-5 and 530-6 is connected to an input terminal of the inverter 530-7. The output terminal of the inverter 530-7 is also connected to the status transition limiting circuit 540.

A circuit including the inverters 530-4, 530-5, 530-6, and 530-7 functions as a holding circuit that holds a signal input from a multiplexer at a preceding stage in a case where the decoded signal indicates an odd-numbered status.

"b" in FIG. 38 is a circuit diagram illustrating a configuration example of the latch circuit 533. The latch circuit 530 includes inverters 533-1, 533-2, 533-3, 533-4, 533-5, 533-6, and 533-7. A configuration of the latch circuit 533 is similar to that of the latch circuit 531 except that a signal input to the enable terminal of the inverter is different. Further, configurations of the latch circuits 534 and 535 are similar to that of the latch circuit 533.

CBN is input to a power source side of the enable terminal of the inverter 533-1, and CB is input to a ground side. BAN is input to a power source side of the enable terminal of the inverter 533-2, and BA is input to a ground side. ACN is input to a power source side of the enable terminal of the inverter 533-3, and AC is input to a ground side.

ABN is input to a power source side of the enable terminal of the inverter 533-4, and AB is input to a ground side. CAN is input to a power source side of the enable terminal of the inverter 533-5, and CA is input to a ground side. BCN is input to a power source side of the enable terminal of the inverter 533-6, and BC is input to a ground side.

Figure 39:
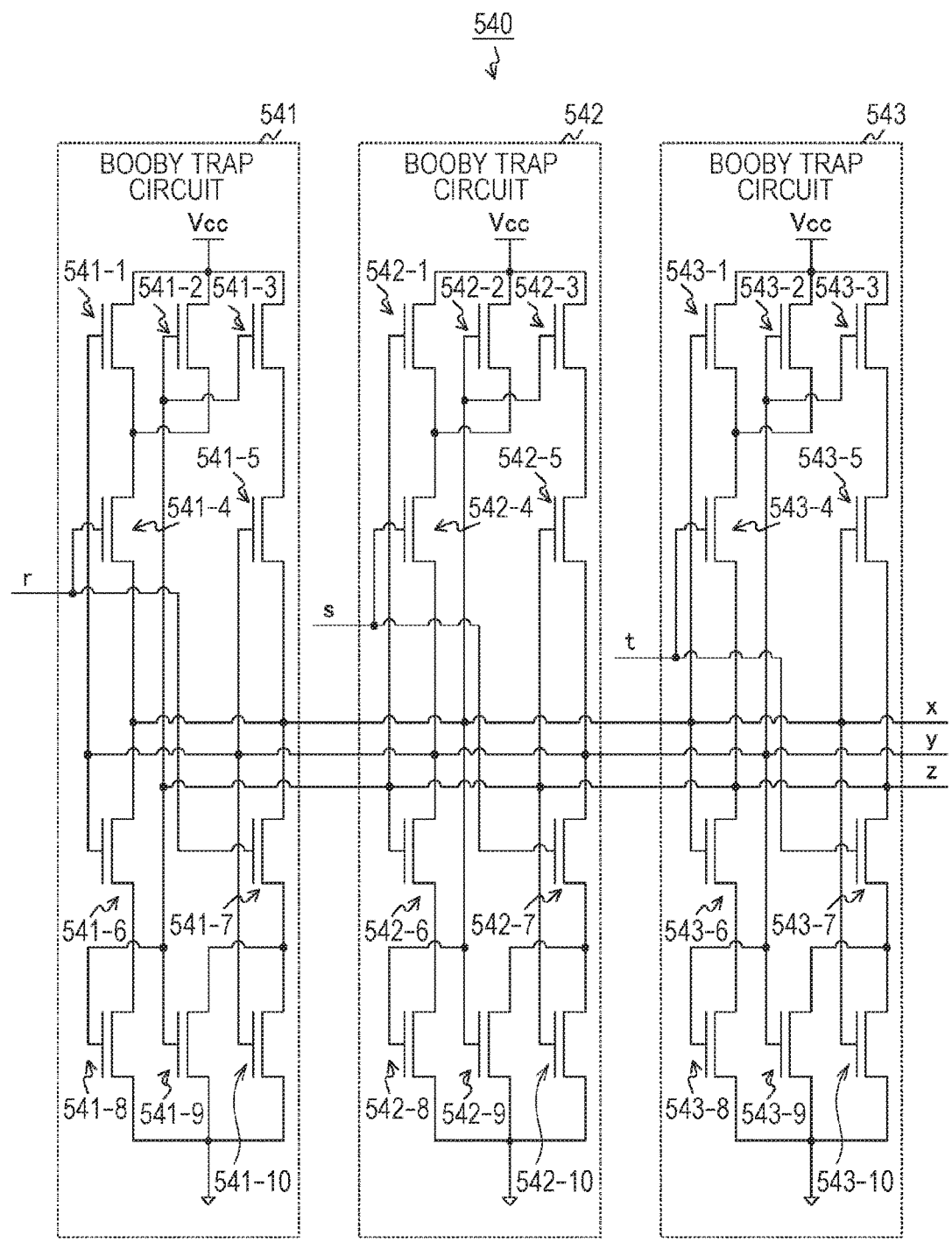
FIG. 39 is a circuit diagram illustrating a configuration example of a status transition limiting circuit in the third embodiment.

FIG. 39 is a circuit diagram illustrating a configuration example of the status transition limiting circuit 540 in the third embodiment. The status transition limiting circuit 540 includes booby trap circuits 541, 542, and 543.

The booby trap circuit 541 includes 10 N-type transistors 541-1 to 541-10. For example, a field effect transistor is used as the transistors.

The N-type transistors 541-1, 541-4, 541-6, and 541-8 are connected in series between a power source and a ground terminal. Further, the N-type transistors 541-3, 541-5, 541-7, and 541-10 are connected in series between the power source and the ground terminal. The transistor 541-2 is connected in parallel with the transistor 541-1 between the power source and the transistor 541-4. The transistor 541-9 is connected in parallel with the transistor 541-10 between the ground terminal and the transistor 541-7.

Gates of the transistors 541-1, 541-5, 541-6 and 541-10 are connected to an output terminal that outputs y. Gates of the transistors 541-2, 541-3, 541-8 and 541-9 are connected to an output terminal that outputs z. Gates of the transistors 541-4 and 541-7 are connected to an input terminal to which r is input. Further, a connection point of the transistors 541-4 and 541-6 and a connection point of the transistors 541-5 and 541-7 are connected to a connection point which outputs x.

Further, the booby trap circuit 542 includes 10 N-type transistors 542-1 to 542-10. For example, a field effect transistor is used as the transistors. Connections of the transistors are similar to those of the booby trap circuit 541 except that connection destinations with the input and output terminals of the status transition limiting circuit 540 are different.

Gates of the transistors 542-1, 542-5, 542-6 and 542-10 are connected to an output terminal that outputs z. Gates of the transistors 542-2, 542-3, 542-8 and 542-9 are connected to an output terminal that outputs x. Gates of the transistors 542-4 and 542-7 are connected to an input terminal to which s is input. A connection point of the transistors 542-4 and 542-6 and a connection point of the transistors 542-5 and 542-7 are connected to a connection point that outputs y.

Further, the booby trap circuit 543 includes 10 N-type transistors 543-1 to 543-10. For example, a field effect transistor is used as the transistors. Connections of the transistors are similar to those of the booby trap circuit 541 except that connection destinations with input and output terminals of the status transition limiting circuit 540 are different.

Gates of the transistors 543-1, 543-5, 543-6 and 543-10 are connected to an output terminal that outputs x. Gates of the transistors 543-2, 543-3, 543-8 and 543-9 are connected to an output terminal that outputs y. Gates of the transistors 543-4 and 543-7 are connected to an input terminal to which t is input. A connection point of the transistors 543-4 and 543-6 and a connection point of the transistors 543-5 and 543-7 are connected to a connection point that outputs z.

Note that the status transition limiting circuit 540 illustrated in FIG. 39 is a circuit that limits all transition patterns that do not correspond to two transition patterns of the 6-status 2-transition signal, but in a case where it is not necessary to limit all the transition patterns, some circuits may be omitted.

FIG. 40 illustrates an example of a truth table of the booby trap circuit 541 in the third embodiment. In a case where the bits r, y, and z are "000," "100," "010," "001," or "111," the booby trap circuit 541 outputs the bit x of "1." Otherwise, the booby trap circuit 541 outputs the bit x of "0." A truth table of the booby trap circuit 542 is similar to one in which r, y, and z are replaced with s, x and z, and x is replaced with y in FIG. 40. A truth table of the booby trap circuit 543 is similar to one in which r, y, and z are replaced with t, x, and y, and x is replaced with z in FIG. 40.

With this operation, the status transition limiting circuit 540 limits five transition patterns from one of the six statuses to the other statuses to two transition patterns.

FIG. 41 is a table illustrating an example of an operation of the separating unit 520 in the third embodiment. In a case where a previous status number is an odd number, and a current status number is an even number, the separating unit 520 updates the counter value configured with the bits U, V, and W. On the other hand, in a case where the previous status number is an even number, and the current status number is an odd number, the separating unit 520 updates the counter value configured with the bits X, Y, and Z.

As described above, according to the third embodiment of the present technology, the processing circuit 131 generates the data signal, and thus it is not necessary to install the low-speed data decoder that generates the data signal in the receiving circuit 201. Further, the receiving circuit 201 receives the 6-status 2-transition signal instead of the 6-status 5-transition signal, and thus it is possible to generate the clock signal through the clock signal generating unit 510 configured with one OR gate.

4. Fourth Embodiment

In the third embodiment, the receiving circuit 201 receives the 6-status 2-transition signal but may receive the 3-status 2-transition signal instead. Here, in a case where it is desired to use the circuit that processes the 6-status 2-transition signal in the receiving circuit 201 without change when a design is changed to deal with the 3-status 2-transition signal, it is preferable that the receiving circuit 201 convert the received 3-status 2-transition signal to the 6-status 2-transition signal and then process the 6-status 2-transition signal. The receiving circuit 201 of a fourth embodiment is different from that of the third embodiment in that the receiving circuit 201 converts the 3-status 2-transition signal into the 6-status 2-transition signal.

Figure 42:
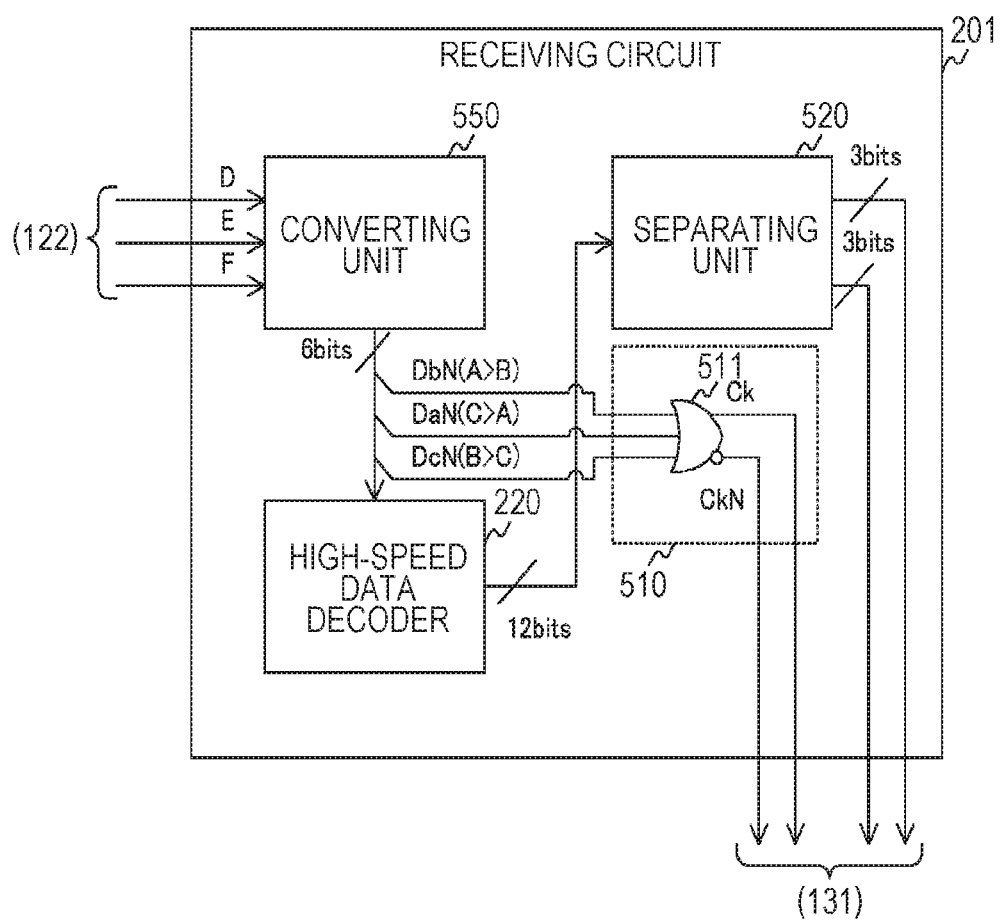
FIG. 42 is a block diagram illustrating a configuration example of a receiving circuit in a fourth embodiment.

FIG. 42 is a block diagram illustrating a configuration example of the receiving circuit 201 in the fourth embodiment. The receiving circuit 201 of the fourth embodiment is different from that of the third embodiment in that the receiving circuit 201 further includes a converting unit 550.

Further, the receiving circuit 201 receives the reception signal from a transmitting circuit 122 instead of the transmitting circuit 121. The transmitting circuit 122 transmits the 3-status 2-transition signal including the bits D, E, and F as the reception signal. Further, the converting unit 550 converts the 3-status 2-transition signal into the 6-status 2-transition signal and outputs the 6-status 2-transition signal to the high-speed data decoder 220.

Figure 43:
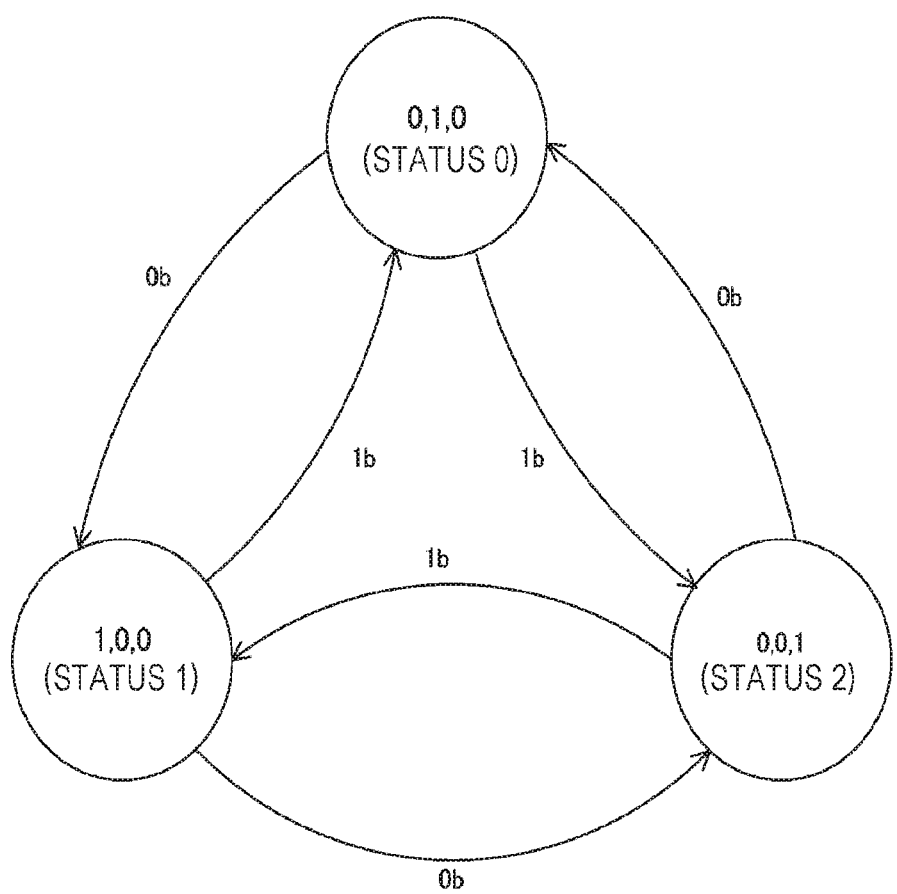
FIG. 43 is an example of a status transition diagram of a 3-status 2-transition signal in the fourth embodiment.

FIG. 43 is an example of a status transition diagram of the 3-status 2-transition signal in the fourth embodiment. A potential of each of the three signal lines is controlled to be the high level or the low level. In FIG. 43, "1" indicates the high level, and "0" indicates the low level. The statuses of the signal lines are classified into a status 0 of "0, 1, 0," a status 1 of "1, 0, 0," and a status 2 of "0, 0, 1." For example, a data signal of a binary number "0" is allocated to a transition pattern from the status 0 to the status 1, a transition pattern from the status 1 to the status 2, and a transition pattern from the status 2 to the status 0. For example, a data signal of a binary number "1" is allocated to the other transition patterns.

Figure 44:
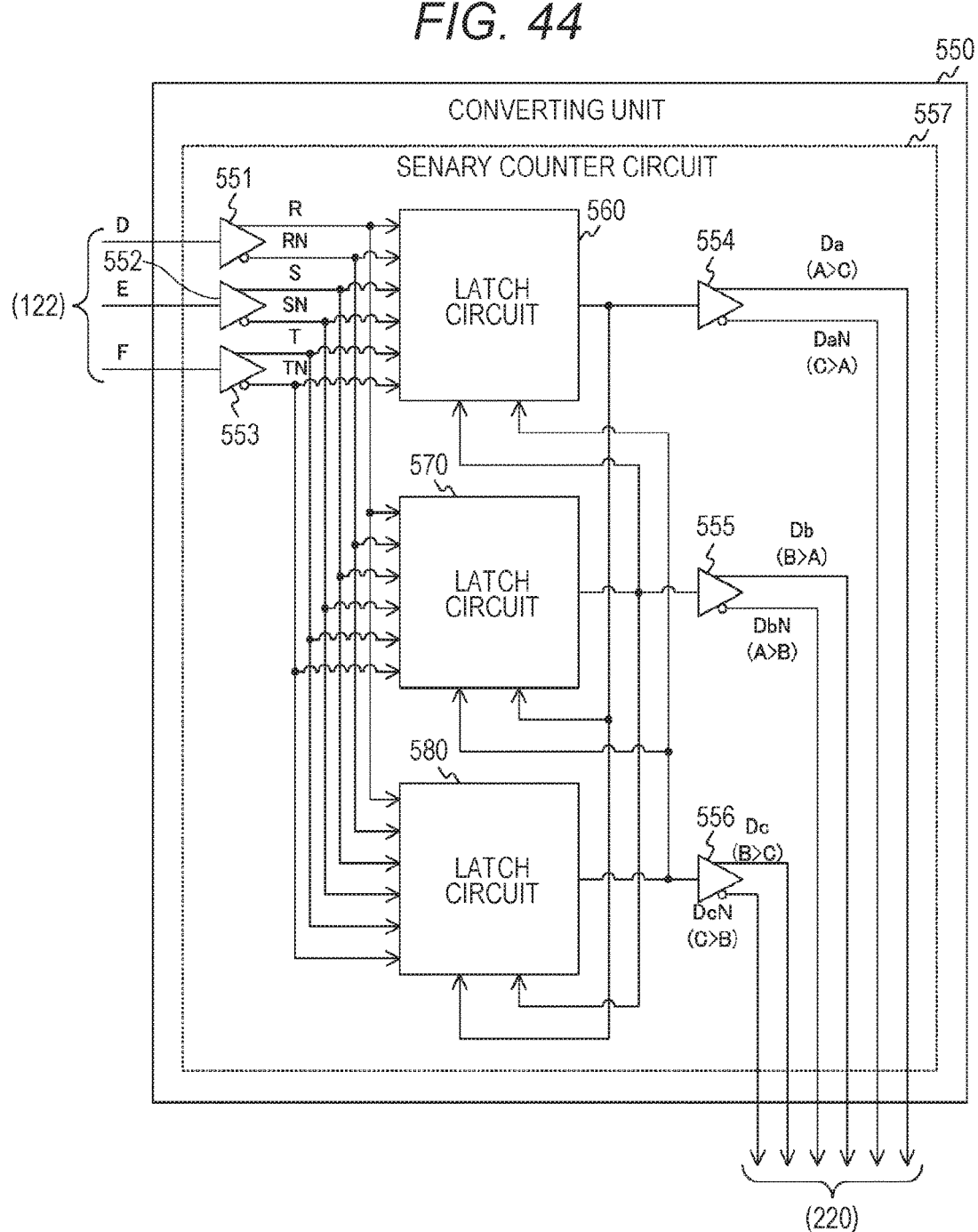
FIG. 44 is a circuit diagram illustrating a configuration example of a converting unit in the fourth embodiment.

FIG. 44 is a circuit diagram illustrating a configuration example of the converting unit 550 in the fourth embodiment. The converting unit 550 includes a senary counter circuit 557. The senary counter circuit 557 includes inverters 551, 552, 553, 554, 555, and 556 and latch circuits 560, 570, and 580.

The inverter 551 supplies a bit D to each of the latch circuits as a bit R, and supplies a bit RN obtained by inverting the bit D to each of the latch circuits. The inverter 552 supplies a bit E to each of the latch circuits as a bit S, and supplies a bit SN obtained by inverting the bit E to each of the latch circuits. The inverter 553 supplies a bit F to each latch circuit as a bit T, and supplies a bit FN obtained by inverting the bit F to each of the latch circuits.

Different statuses are allocated to the latch circuits 560, 570, and 580. The latch circuits hold previous feedback signals in a case where a signal configured with R, S, T, RN, SN, and TN indicates a corresponding status, and invert the feedback signals and output the inverted feedback signals otherwise. Further, the latch circuits feed back output signals to the other latch circuits as the feedback signals. Further, the latch circuits 560, 570, and 580 supply the output signals to the inverters 554, 555, and 556.

The inverter 554 outputs the output signal of the latch circuit 560 to the high-speed data decoder 220 as a bit Da and outputs a signal obtained by inverting the bit Da to the high-speed data decoder 220 as a bit DaN. The inverter 555 outputs the output signal of the latch circuit 570 to the high-speed data decoder 220 as a bit Db and outputs a signal obtained by inverting the bit Db to the high-speed data decoder 220 as a bit DbN. The inverter 556 outputs the output signal from the latch circuit 580 to the high-speed data decoder 220 as a bit Dc and outputs a signal obtained by inverting the bit Dc to the high-speed data decoder 220 as a bit DcN. The binary data configured with Da, Db, and Dc indicates the counter value of the senary counter circuit 557 which is counted each time the status of 3-status 2-transition signal transitions.

Figure 45:
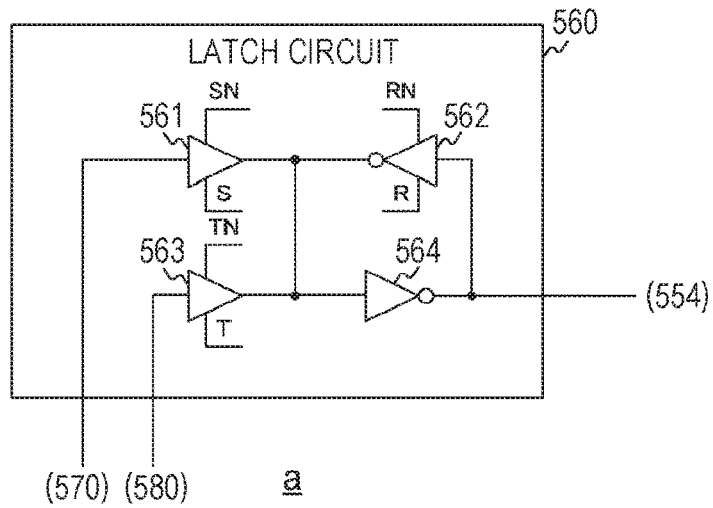
FIG. 45 is a circuit diagram illustrating a configuration example of a latch circuit in the fourth embodiment.
Figure 45:
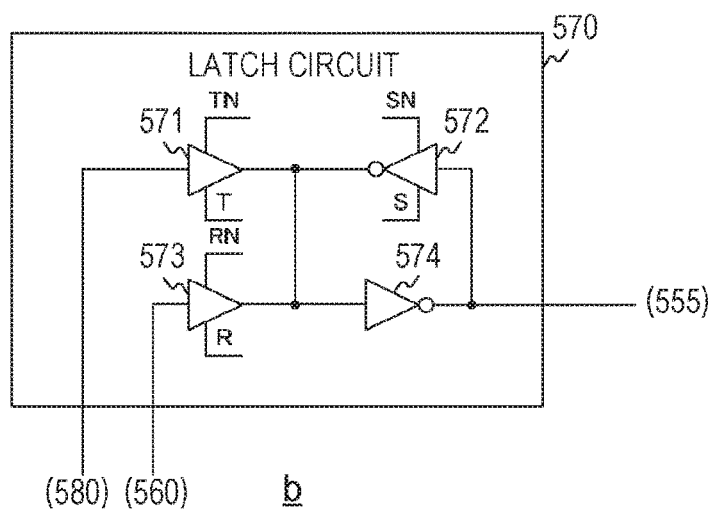
Figure 45:
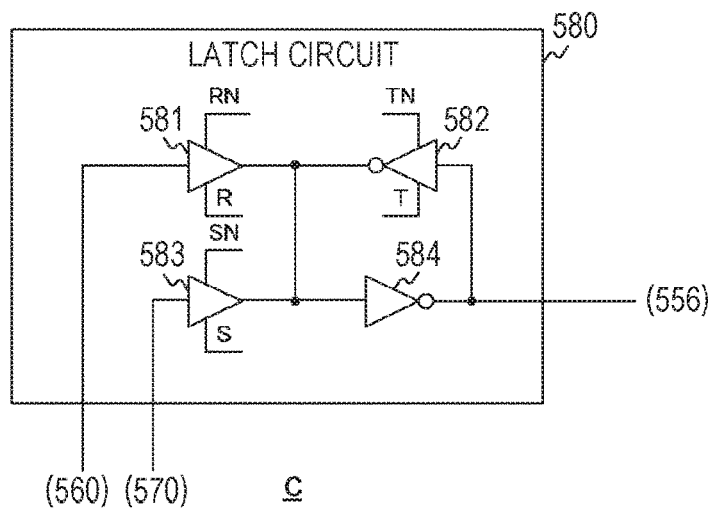

FIG. 45 is a circuit diagram illustrating a configuration example of the latch circuits 560, 570, and 580 in the fourth embodiment. "a" in FIG. 45 is a circuit diagram illustrating a configuration example of the latch circuit 560. The latch circuit 560 includes buffers 561 and 563 and inverters 562 and 564. Each of the buffers 561 and 563 and the inverter 562 includes a differential input enable terminal.

A feedback signal from the latch circuit 570 is input to the buffer 561, and a feedback signal from the latch circuit 580 is input to the buffer 563. Output terminals of the buffers 561 and 563 and the inverter 562 are connected to an input terminal of the inverter 564, and an output terminal of the inverter 564 is connected to input terminals of the inverter 562 and the inverter 554.

Further, SN is input to a power source side of the enable terminal of the buffer 561, and S is input to a ground side. TN is input to a power source side of the enable terminal of the buffer 563, and T is input to a ground side. RN is input to a power source side of the enable terminal of the inverter 562, and R is input to a ground side.

"b" in FIG. 45 is a circuit diagram illustrating a configuration example of the latch circuit 570, and "c" in FIG. 45 is a circuit diagram illustrating a configuration example of the latch circuit 580. The latch circuit 570 includes buffers 571 and 573 and inverters 572 and 574. The latch circuit 580 includes buffers 581 and 583 and inverters 582 and 584. A connection of the elements is similar to that of the latch circuit 560. However, a connection destination of the input terminal of buffer and a connection destination of the enable terminal are different.

The buffer 571 is connected to the latch circuit 580, and the buffer 573 is connected to the latch circuit 560. Further, the buffer 581 is connected to the latch circuit 560, and the buffer 583 is connected to the latch circuit 570.

Further, TN is input to a power source side of the enable terminal of the buffer 571, and T is input to a ground side. RN is input to a power source side of the enable terminal of the buffer 573, and R is input to a ground side. SN is input to a power source side of the enable terminal of the inverter 572, and S is input to a ground side.

Further, RN is input to a power source side of the enable terminal of the buffer 581, and R is input to a ground side. SN is input to a power source side of the enable terminal of the buffer 583, and S is input to a ground side. TN is input to a power source side of the enable terminal of the inverter 582, and T is input to a ground side.

With this configuration, the latch circuit 580 holds a previous feedback signal in a case where only R among R, S, and T has the high level, and inverts and outputs the feedback signal otherwise. Further, the latch circuit 570 holds a previous feedback signal in a case where only S has the high level, and inverts and outputs the feedback signal otherwise. The latch circuit 580 holds a previous feedback signal in a case where only T has the high level, and inverts and outputs the feedback signal otherwise.

Figure 46:
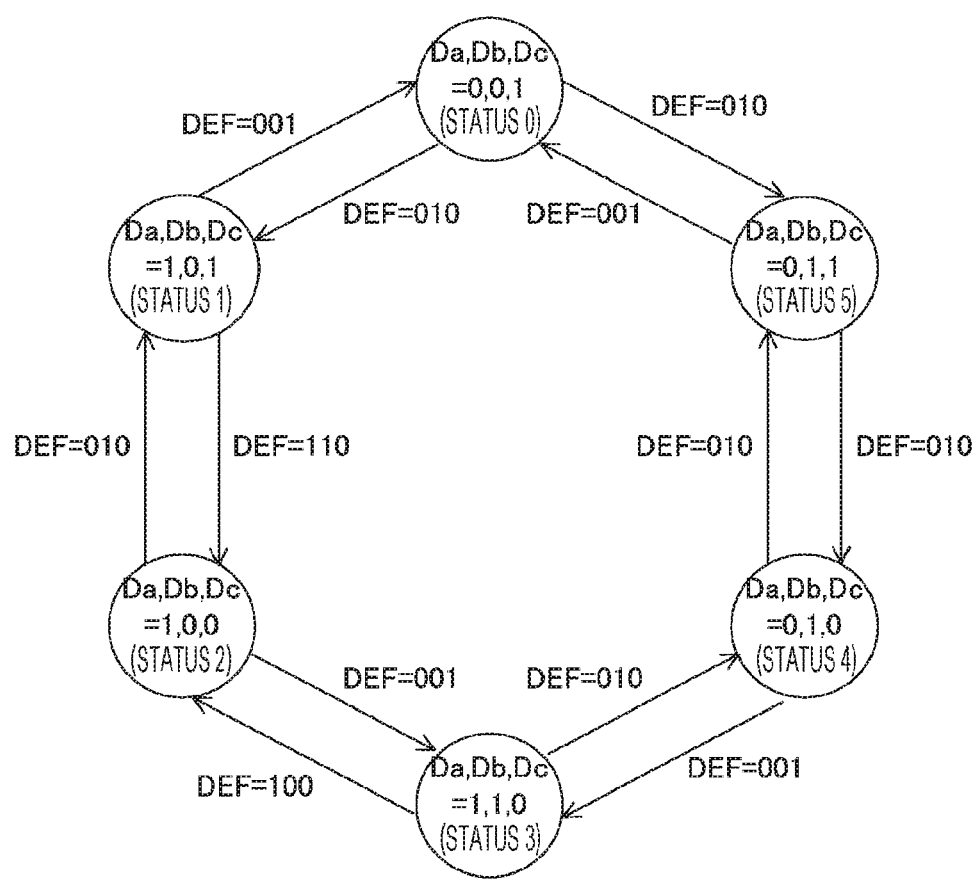
FIG. 46 is an example of a status transition diagram of a 6-status 2-transition signal in the fourth embodiment.

FIG. 46 is an example of a status transition diagram of the 6-status 2-transition signal in the fourth embodiment. A different status number is allocated to each of the six statuses of the counter value configured with the bits Da, Db, and Dc. For example, a status 0 is allocated to a status in which Da, Db, and Dc are "001," a status 1 is allocated to a status in which Da, Db, and Dc are "101," and a status 2 is allocated to a status in which Da, Db, and Dc are "100." Further, a status 3 is allocated to a status in which Da, Db, and Dc are "110," a status 4 is allocated to a status in which Da, Db, and Dc are "010," and a status 5 is allocated to a status in which Da, Db, and Dc are "011."

The senary counter circuit 557 causes the status of the counter value to transition (in other words, counts the counter value) each time the reception signal configured with the bits D, E, and F transitions. For example, if DEF transitions from "001" to "010" in the status 0, the senary counter circuit 557 causes the counter value to transition to the status 1. Further, if DEF transitions from "010" to "110" the in status 1, the senary counter circuit 557 causes the counter value to transition to the status 2.

As described above, according to the fourth embodiment, since the 3-status 2-transition signal is converted into the 6-status 2-transition signal, it is unnecessary to replace the circuit that generates the clock signals or the like from the 6-status 2-transition signal in a case where the design of the configuration of receiving the 3-status 2-transition signal is changed.

First Modified Example

In the fourth embodiment, only one set of the high-speed data decoder 220, the separating unit 520, and the clock signal generating unit 510 is provided, but two sets thereof may be provided. In this configuration, the receiving circuit 200 may further divide the 6-status 2-transition signal into 2 systems and input them into each set. Since the signal is separated into 2 systems through each set, the 6-status 2-transition signal is finally divided into 4 systems. A receiving circuit 201 of a first modified example of the fourth embodiment is different from that the fourth embodiment in that the receiving circuit 201 separates the 6-status 2-transition signal into 4 systems.

Figure 47:
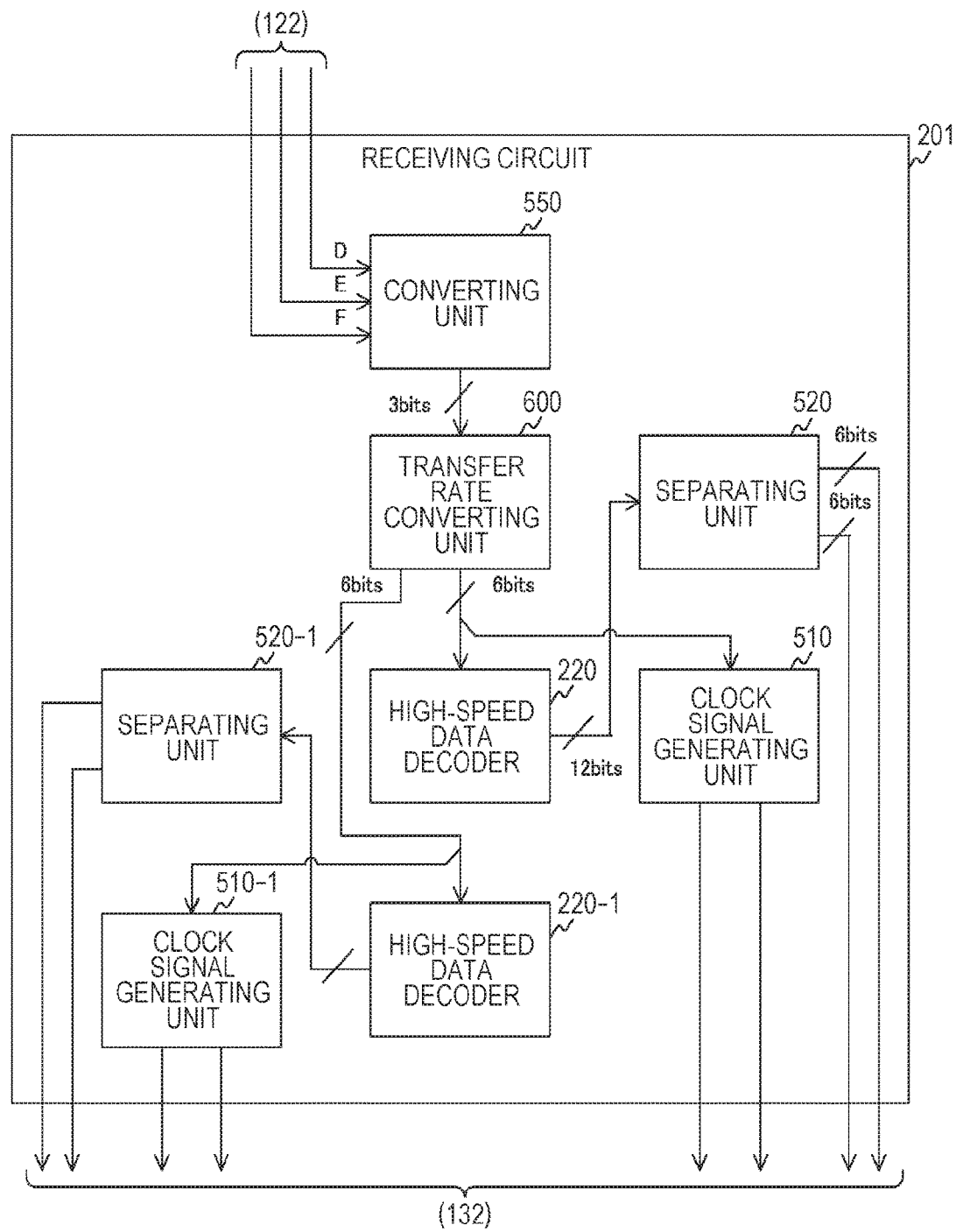
FIG. 47 is a block diagram illustrating a configuration example of a receiving circuit in a first modified example of the fourth embodiment.

FIG. 47 is a block diagram illustrating a configuration example of the receiving circuit 201 in the first modified example of the fourth embodiment. The receiving circuit 201 in the first modified example of the fourth embodiment is different from that the fourth embodiment in that the receiving circuit 201 further includes a transfer speed converting unit 600, a high-speed data decoder 220-1, a separating unit 520-1, and a clock signal generating unit 510-1. Further, the converting unit 550 converts the reception signal configured with D, E, and F into a 6-status 2-transition signal of 3 bits including d, e, and f and outputs the 6-status 2-transition signal.

The transfer speed converting unit 600 separates the 6-status 2-transition signal input from the converting unit 550 into two 6-status 2-transition signals whose transfer speed is half. The transfer speed converting unit 600 supplies one of the two 6-status 2-transition signals to the high-speed data decoder 220 and the clock signal generating unit 510, and supplies the other two 6-status 2-transition signal to the high-speed data decoder 220-1 and the clock signal generating unit 510-1.

Configurations of the high-speed data decoder 220-1, the separating unit 520-1, and the clock signal generating unit 510-1 are similar to those of the high-speed data decoder 220, the separating unit 520, and the clock signal generating unit 510.

Further, the receiving circuit 201 supplies the status data and the clock signals of 4 system to a processing circuit 132. The processing circuit 132 generates data signals of 4 systems from the signals.

Figure 48:
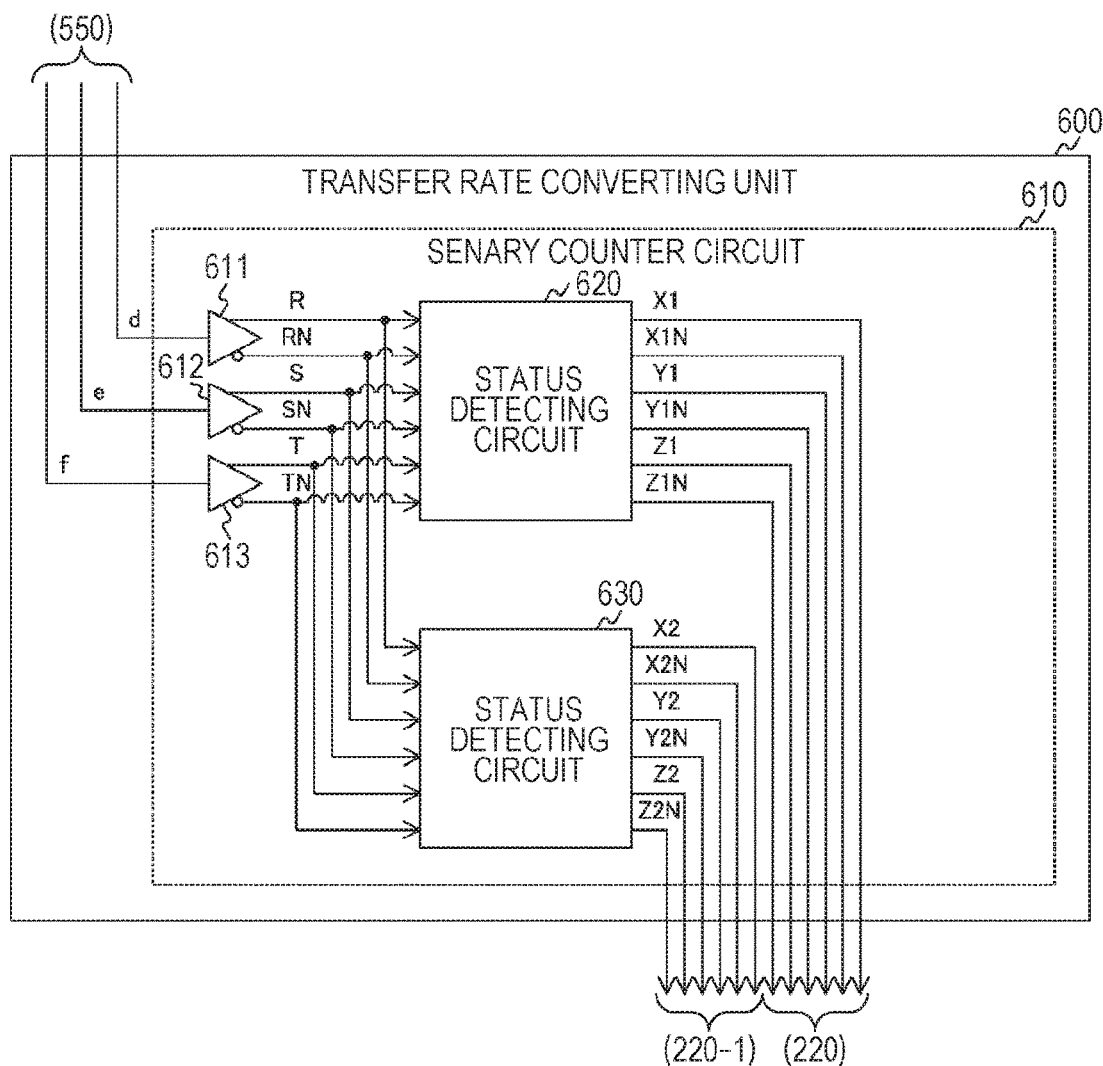
FIG. 48 is a block diagram illustrating a configuration example of a transfer speed converting unit in the first modified example of the fourth embodiment.

FIG. 48 is a block diagram illustrating a configuration example of the transfer speed converting unit 600 in the first modified example of the fourth embodiment. The transfer speed converting unit 600 includes a senary counter circuit 610. The senary counter circuit 610 includes inverters 611, 612, and 613 and status detecting circuits 620 and 630.

The inverter 611 supplies a bit d to the status detecting circuits 620 and 630 as R and supplies RN obtained by inverting R to the status detecting circuits 620 and 630. Further, the inverter 612 supplies a bit e to the status detecting circuits 620 and 630 as S and supplies SN obtained by inverting S to the status detecting circuits 620 and 630. The inverter 613 supplies a bit f to the status detecting circuits 620 and 630 as T and supplies TN obtained by inverting T to the status detecting circuits 620 and 630.

Each of the status detecting circuits 620 and 630 generates the 6-status 2-transition signal whose transfer speed is half from R, S, T, RN, SN, and TN.

Figure 49:
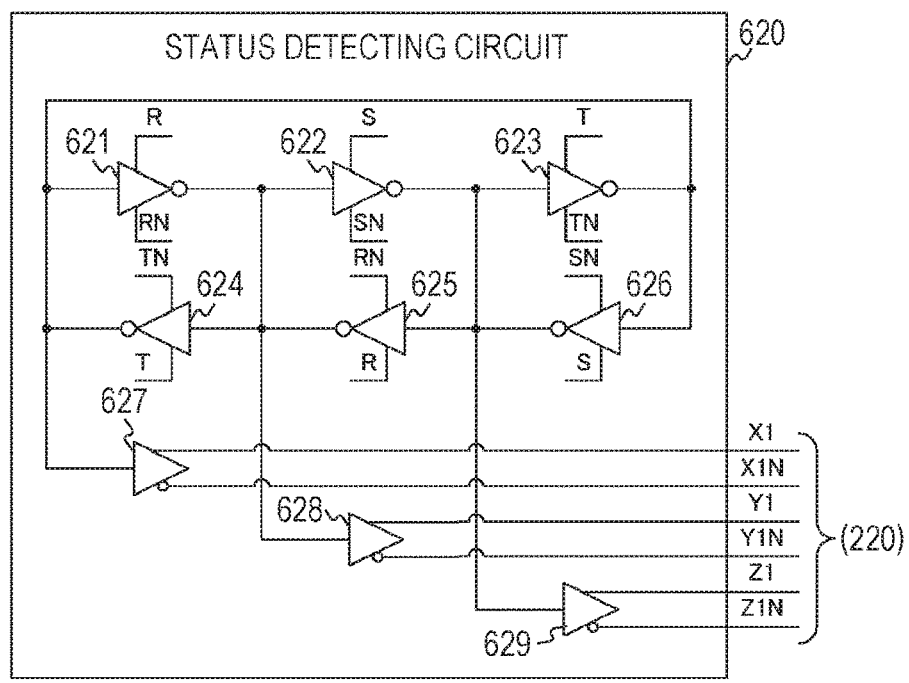
FIG. 49 is a circuit diagram illustrating a configuration example of a status detecting circuit in the first modified example of the fourth embodiment.
Figure 49:
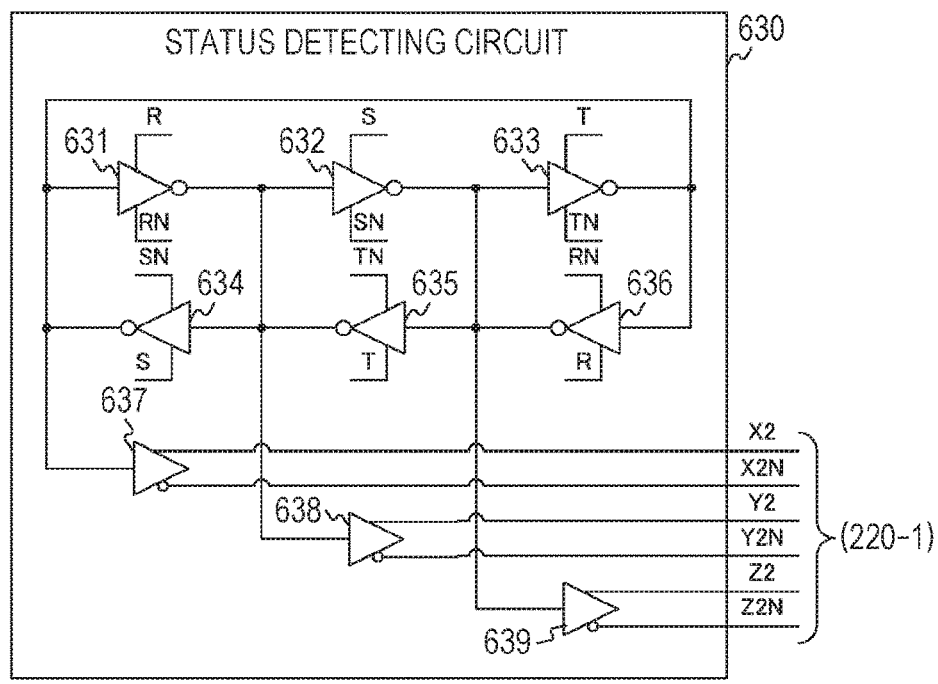

FIG. 49 is a circuit diagram illustrating a configuration example of the status detecting circuits 620 and 630 in the first modified example of the fourth embodiment. "a" in FIG. 49 is a circuit diagram illustrating a configuration example of the status detecting circuit 620. The status detecting circuit 620 includes inverters 621, 622, 623, 624, 625, 626, 627, 628, and 629.

Each of the inverters 621, 622, 623, 624, 625, and 626 includes a differential input enable terminal. R is input to a power source side of the enable terminal of the inverter 621, and RN is input to a ground side. Further, S is input to a power source side of the enable terminal of the inverter 622, and SN is input to a ground side. T is input to a power source side of the enable terminal of the inverter 623, and TN is input to a ground side.

TN is input to a power source side of the enable terminal of the inverter 624, and T is input to a ground side. Further, RN is input to a power source side of the enable terminal of the inverter 625, and R is input to a ground side. SN is input to a power source side of the enable terminal of the inverter 626, and S is input to a ground side.

An output terminal of the inverter 621 is connected to the inverters 622, 624, and 628, and an output terminal of the inverter 622 is connected to the inverters 623, 625, and 629. Further, an output terminal of the inverter 623 is connected to the inverters 621, 626, and 627. An output terminal of the inverter 624 is connected to the inverters 621, 626 and 627, and an output terminal of the inverter 625 is connected to the inverters 622, 624, and 628. An output terminal of the inverter 626 is connected to the inverters 623, 625, and 629.

The inverter 627 outputs an input signal X1 and an inverted signal X1N to the high-speed data decoder 220 or the like. The inverter 628 outputs an input signal Y1 and an inverted signal Y1N to the high-speed data decoder 220 or the like. The inverter 629 outputs an input signal Z1 and an inverted signal Z1N to the high-speed data decoder 220 or the like. The output signals are 6-status 2-transition signals whose transfer speed is half of that of the signal configured with d, e, and f.

"b" in FIG. 49 is a circuit diagram illustrating a configuration example of the status detecting circuit 630. The status detecting circuit 630 includes inverters 631, 632, 633, 634, 635, 636, 637, 638, and 639. A connection configuration of the input/output terminals is similar to that of the status detecting circuit 620. However, the signals input to the enable terminals of the inverters 634, 635, and 636 are different.

SN is input to a power source side of the enable terminal of the inverter 634, and S is input to a ground side. Further, TN is input to a power source side of the enable terminal of the inverter 635, and T is input to a ground side. RN is input to a power source side of the enable terminal of the inverter 636, and R is input to a ground side.

The inverters 637, 638, and 639 output signals X2, X2N, Y2, Y2N, Z2, and Z2N to the high-speed data decoder 220 or the like. These output signals are 6-status 2-transition signals whose transfer speed is half of that of the signal configured with d, e, and f.

As described above, according to the first modified example of the fourth embodiment of the present technology, since the receiving circuit 201 separates the 6-status 2-transition signal into 4 systems, it is possible to reduce the transfer speed to be lower than when the 6-status 2-transition signal is separated into 2 systems.

Second Modified Example

In the first modified example of the fourth embodiment described above, the receiving circuit 201 converts the transfer speed using the senary counter circuit 610, but it is also possible to convert the transfer speed using a duodecimal counter circuit. A receiving circuit 201 in a second modified example of the fourth embodiment is different from that of the first modified example in that the transfer speed is converted using the duodecimal counter circuit.

Figure 50:
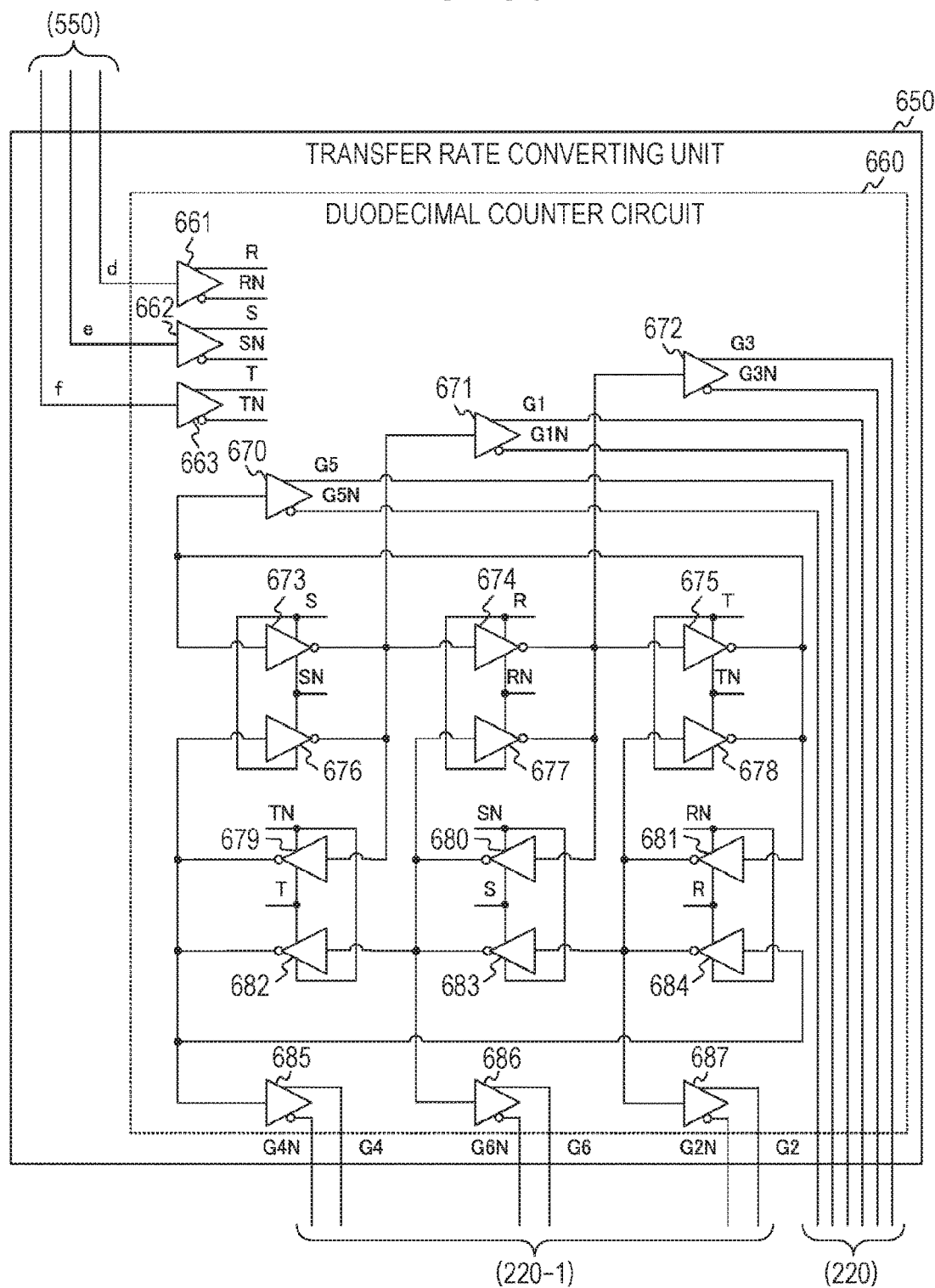
FIG. 50 is a circuit diagram illustrating a configuration example of a transfer speed converting unit in a second modified example of the fourth embodiment.

FIG. 50 is a circuit diagram illustrating a configuration example of a transfer speed converting unit 650 in the second modified example of the fourth embodiment. In the second modified example, the transfer speed converting unit 650 is installed instead of the transfer speed converting unit 600. The transfer speed converting unit 650 includes a duodecimal counter circuit 660. The duodecimal counter circuit 660 includes inverters 661, 662, 663, 670, 671, 672, 673, 674, 675, 676, 677, and 678. Further, the duodecimal counter circuit 660 also includes inverters 679, 680, 681, 682, 683, 684, 685, 686, and 687.

The inverters 661, 662, and 663 generate the bits R, S, T, RN, SN, and TN, similarly to the first modified example.

Each of the inverters 673, 674, 675, 676, 677, 678, 679, 680, 681, 682, 683, and 684 includes a differential input enable terminal. S is input to a power source side of the enable terminal of the inverter 673, and SN is input to a ground side. R is input to a power source side of the enable terminal of the inverter 674, and RN is input to a ground side. T is input to a power source side of the enable terminal of the inverter 675 and TN is input to a ground side. SN is input to a power source side of the enable terminal of the inverter 676 and S is input to a ground side. RN is input to a power source side of the enable terminal of the inverter 677, and R is input to a ground side. TN is input to a power source side of the enable terminal of the inverter 678, and T is input to a ground side.

TN is input to a power source side of the enable terminal of the inverter 679, and T is input to a ground side. SN is input to a power source side of the enable terminal of the inverter 680, and S is input to a ground side. RN is input to a power source side of the enable terminal of the inverter 681, and R is input to a ground side. T is input to a power source side of the enable terminal of the inverter 682, and TN is input to a ground side. S is input to a power source side of the enable terminal of the inverter 683, and SN is input to a ground side. R is input to a power source side of the enable terminal of the inverter 684, and RN is input to a ground side.

Output terminals of the inverters 673 and 676 are connected to input terminals of the inverters 671 and 679, and output terminals of the inverters 674 and 677 are connected to input terminals of the inverters 672 and 680. Output terminals of the inverters 675 and 678 are connected to input terminals of the inverters 670, 673 and 681.

Output terminals of the inverters 679 and 682 are connected to input terminals of the inverters 676, 685, and 684, and output terminals of the inverters 680 and 683 are connected to input terminals of the inverters 677, 682, and 686. Output terminals of inverters 681 and 684 are connected to input terminals of inverters 678, 683, and 687.

Further, the inverter 670 outputs an input signal G5 and an inverted signal as G5N to the high-speed data decoder 220, and the inverter 671 outputs an input signal G1 and an inverted signal G1N to the high-speed data decoder 220. The inverter 672 outputs an input signal G3 and an inverted signal G3N to the high-speed data decoder 220.

Further, the inverter 685 outputs an input signal G4 and an inverted signal G4N to the high-speed data decoder 220-1, and the inverter 686 outputs an input signal G6 and an inverted signal G6N to the high-speed data decoder 220-1.

The inverter 687 outputs an input signal G2 and an inverted signal G2N to the high-speed data decoder 220-1.

Figure 51:
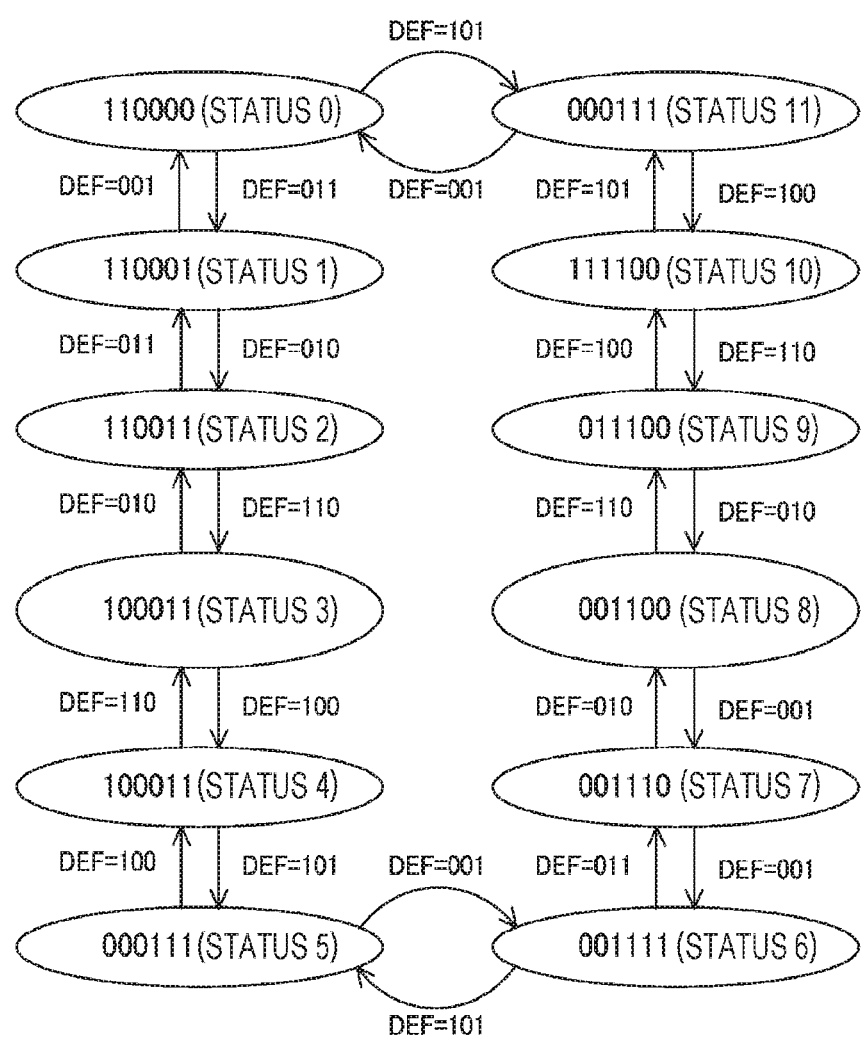
FIG. 51 is a diagram illustrating an example of a status transition diagram of the transfer speed converting unit in the second modified example of the fourth embodiment.

FIG. 51 is a diagram illustrating an example of a status transition diagram of the transfer speed converting unit 650 in the second modified example of the fourth embodiment. The statuses of the 6-status 2-transition signals of G1 to G6 input from the transfer speed converting unit 650 are classified into 12 statuses. The transfer speed converting unit 650 causes the statuses of G1 to G6 to transition each time the statuses of the 6-status 2-transition signals D, E, and F transition. For example, in a case where D, E, and F transition from "001" to "011," the transfer speed converting unit 650 causes G1 to G6 to transition from "110000" to "110001."

As described above, according to the second modified example of the fourth embodiment of the present technology, since the receiving circuit 201 halves the transfer speed through the duodecimal counter circuit 660, the processing circuit 132 at the subsequent stage is able to process the data signal at a slower speed than on the transmission side.

5. Fifth Embodiment

In the first embodiment described above, the reception signal is separated into 2 systems, but the reception signal may be separated into 3 systems. A receiving circuit 200 of a fifth embodiment is different from that of the first embodiment in that the reception signal is separated into 3 systems.

Figure 52:
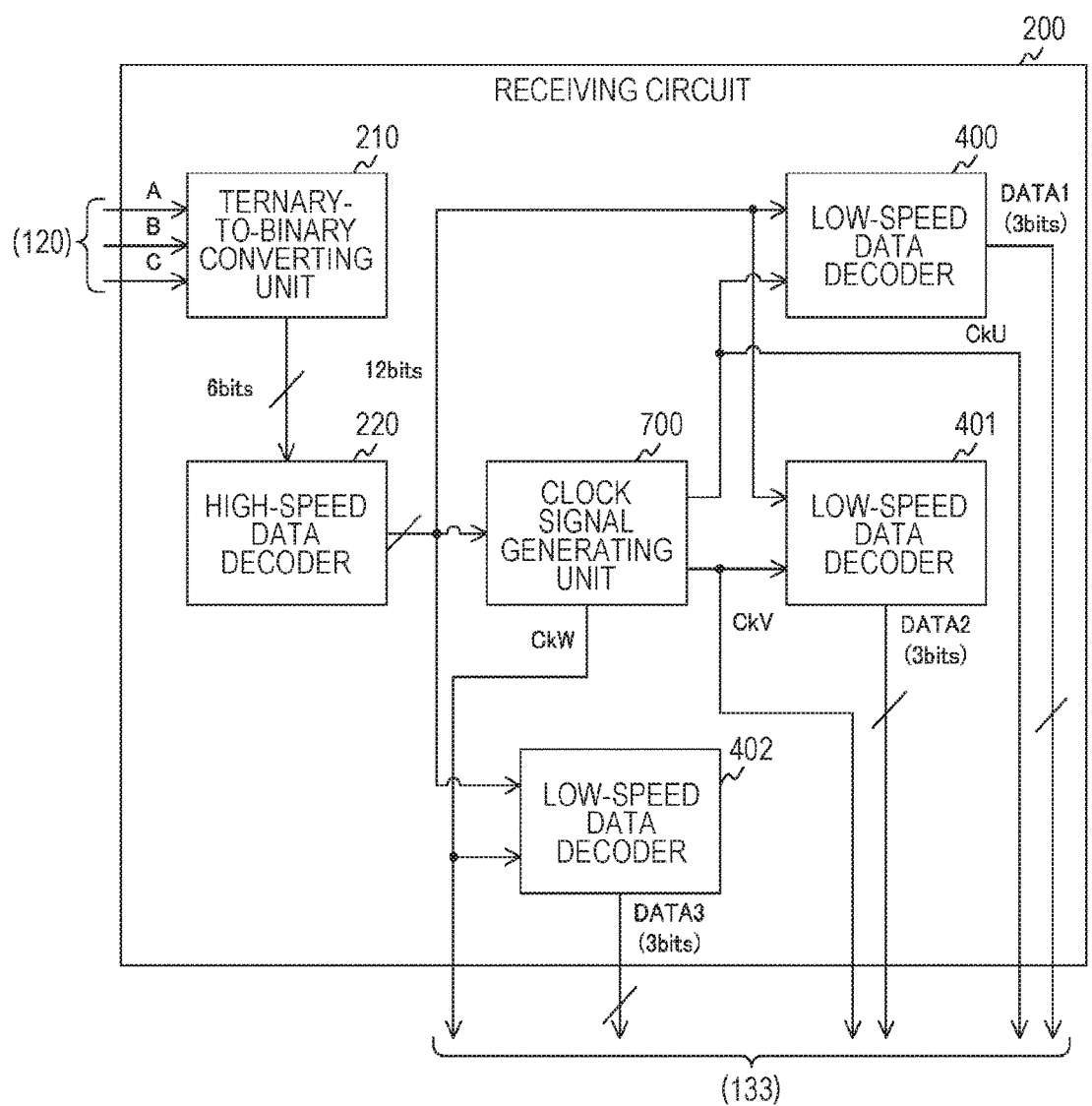
FIG. 52 is a block diagram illustrating a configuration example of a receiving circuit in a fifth embodiment.

FIG. 52 is a block diagram illustrating a configuration example of the receiving circuit 200 in the fifth embodiment. The receiving circuit 200 of the fifth embodiment does not include the separating unit 520 but includes a clock signal generating unit 700 and low-speed data decoders 400, 401, and 402 instead of the clock signal generating unit 300 and the low-speed data decoders 260 and 298.

The clock signal generating unit 700 sequentially selects and inverts one of clock signals CkU, CkV, and CkW each time the status indicated by the status data and the inverted status data transitions. The clock signal generating unit 700 supplies the clock signals CkU, CkV, and CkW to the low-speed data decoders 400, 401, and 402. The low-speed data decoders 400, 401, and 402 of the fifth embodiment have a similar configuration to that of the low-speed data decoder 400 of the second modified example of the first embodiment.

Further, the clock signal generating unit 700 supplies the clock signal CkV to a processing circuit 133 as a signal corresponding to the data signal DATA1, and supplies the clock signal CkW to the processing circuit 133 as a signal corresponding to the data signal DATA2. Further, the clock signal generating unit 700 supplies the clock signal CkU to the processing circuit 133 as a signal corresponding to the data signal DATA3. The low-speed data decoders 400, 401, and 402 supply the data signals to the processing circuit 133. The processing circuit 133 acquires and processes the data signals.

Figure 53:
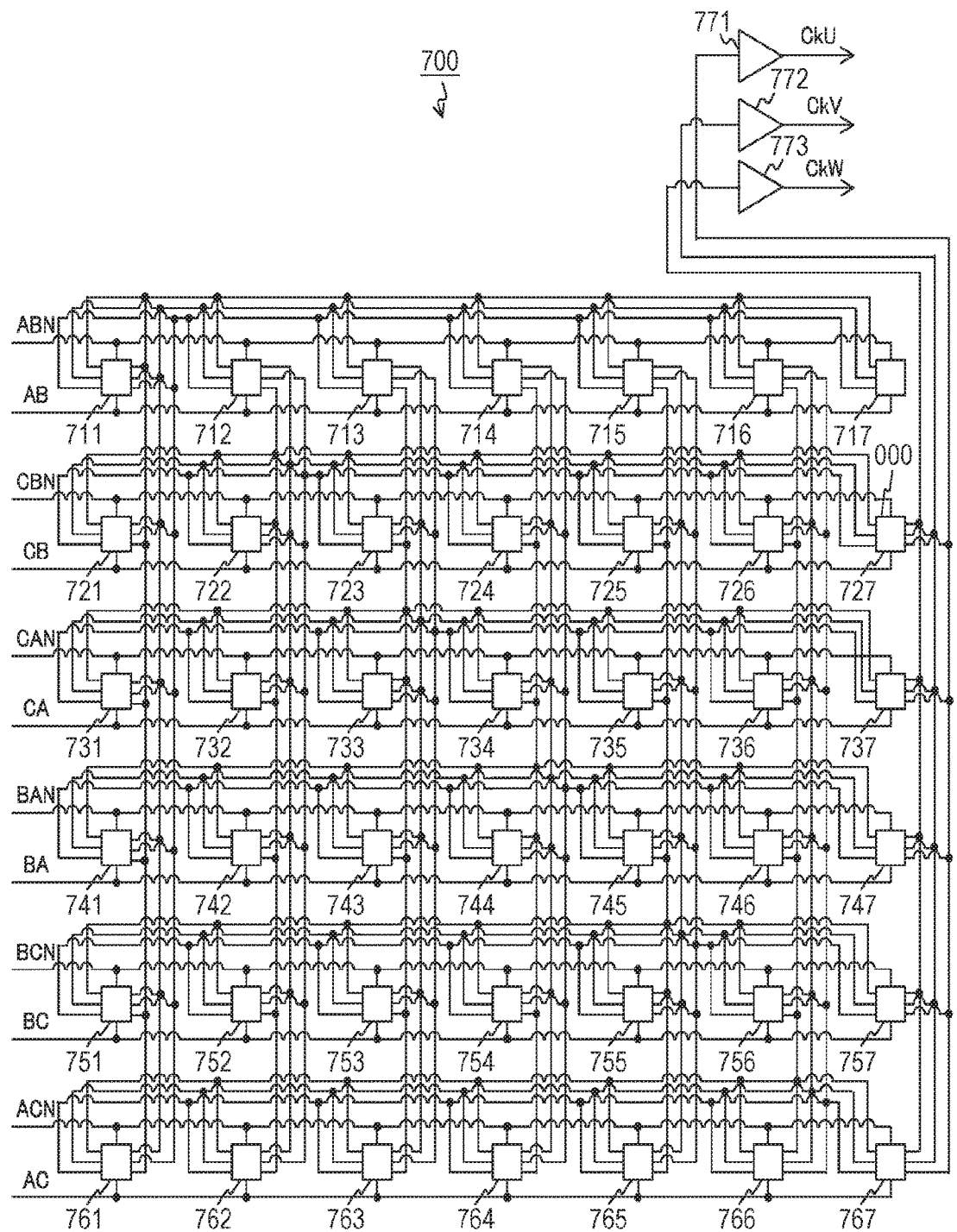
FIG. 53 is a circuit diagram illustrating a configuration example of a clock signal generating unit in the fifth embodiment.

FIG. 53 is a circuit diagram illustrating a configuration example of the clock signal generating unit 700 in the fifth embodiment. The clock signal generating unit 700 includes status control circuits 711, 722, 733, 744, 755, and 766. Further, the clock signal generating unit 700 includes multiplexers 712, 713, 714, 715, 716, 717, 721, 723, 724, 725, 726, 727, 731, 732, 734, 735, 736, and 737. Further, the clock signal generating unit 700 includes multiplexers 741, 742, 743, 745, 746, 747, 751, 752, 753, 754, 756, 757, 761, 762, 763, 764, 765, and 767. Each of the circuits includes a differential input enable terminal, three input terminals, and three output terminals d. Further, the clock signal generating unit 700 includes buffers 771, 772, and 773.

Further, the status transition limiting unit 711 and the multiplexers 712 to 717 are arranged in a first row, the multiplexer 721, the status transition limiting unit 722, and the multiplexers 723 to 727 are arranged in a second row. The multiplexers 731 and 732, the status transition limiting unit 733, and the multiplexers 734 to 737 are arranged in a third row. The multiplexers 741 to 743, the status transition limiting unit 744, and the multiplexers 745 to 747 are arranged in a fourth row. The multiplexers 751 to 754, the status transition limiting unit 755, and the multiplexers 756 and 757 are arranged in a fifth row. The multiplexers 761 to 765, the status transition limiting unit 766, and the multiplexer 767 are arranged in a sixth row. As described above, the circuits are arranged in the form of a 6×7 matrix.

ABN is input to a power source side of the enable terminal of each of the circuits in the first row, and AB is input to a ground side. CBN is input to a power source side of the enable terminal of each of the circuits in the second row, and CB is input to a ground side. CAN is input to a power source side of the enable terminal of each of the circuits in the third row, and CA is input to a ground side. BAN is input to a power source side of the enable terminal of each of the circuits in the fourth row, and BA is input to a ground side. BCN is input to a power source side of the enable terminal of each of the circuits in the fifth row, and BC is input to a ground side. ACN is input to a power source side of the enable terminal of each of the circuits in the sixth row and AC is input to a ground side.

The output terminal of the status transition limiting unit 711 is connected to the input terminals of the circuits in the first row including the status transition limiting unit 711. Similarly, the output terminals of the status transition limiting units 722, 733, 744, 755, and 766 are also connected to the input terminals of the circuits in the row including the circuit.

A first output terminal of the multiplexer (721 or the like) in a first column is connected to a second input terminal of each circuit in the first row, a second output terminal is connected to a third input terminal of each circuit in the first row, and a third output terminal is connected to a first input terminal of each circuit in the first row. A first output terminal of the multiplexer in a second column is connected to the second input terminal of each circuit in the second row, a second output terminal is connected to a third input terminal of each circuit in the second row, and a third output terminal is connected to the first input terminal of each circuit in the second row. A first output terminal of the multiplexer in a third column is connected to the second input terminal of each circuit in the third row, a second output terminal is connected to the third input terminal of each circuit in the third row, and a third output terminal is connected to the first input terminal of each circuit in the third row.

A first output terminal of the multiplexer in a fourth column is connected to the second input terminal of each circuit in the fourth row, a second output terminal is connected to the third input terminal of each circuit in the fourth row, and a third output terminal is connected to the first input terminal of each circuit in the fourth row. A first output terminal of the multiplexer in a fifth column is connected to the second input terminal of each circuit in the fifth row, a second output terminal is connected to the third input terminal of each circuit in the fifth row, and a third output terminal is connected to the first input terminal of each circuit in the fifth row. A first output terminal of the multiplexer in a sixth column is connected to the second input terminal of each circuit in the sixth row, a second output terminal is connected to the third input terminal of each circuit in the sixth row, and a third output terminal is connected to the first input terminal of each circuit in the sixth row.

The output terminal of the multiplexer in a seventh column is connected to the buffers 771, 772, and 773. The buffer 771 outputs an input signal as the clock signal CkU, and the buffer 772 outputs an input signal as the clock signal CkV. The buffer 773 outputs the input signal as the clock signal CkW.

Figure 54:
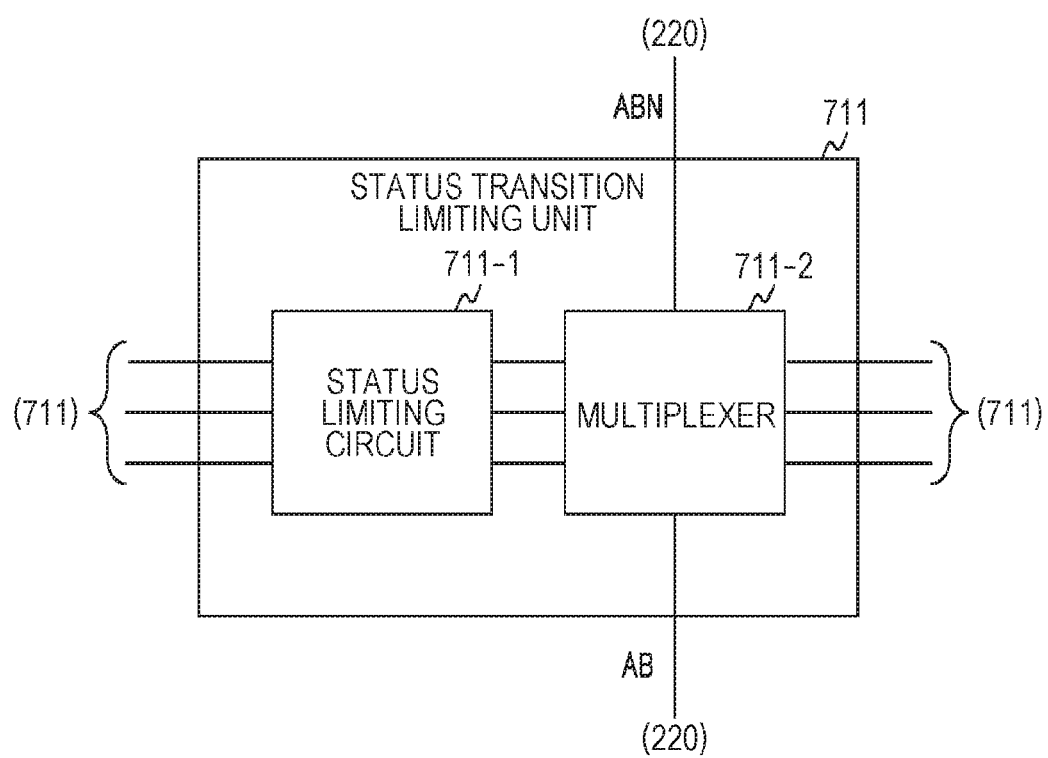
FIG. 54 is a block diagram illustrating a configuration example of a status transition limiting unit in the fifth embodiment.

FIG. 54 is a block diagram illustrating a configuration example of the status transition limiting unit 711 in the fifth embodiment. The status transition limiting unit 711 includes a status transition limiting circuit 711-1 and a multiplexer 711-2. A configuration of the status transition limiting circuit 711 is similar to that of the status transition limiting circuit 540 of the third embodiment. The status transition limiting unit 711 limits the transition pattern of the status of the signal input from the input terminal and supplies it to the multiplexer 711-2. A configuration of the multiplexer 711-2 will be described later. Note that configurations of the status transition limiting units 722, 733, 744, 755, and 766 are similar to that of the status transition limiting unit 711.

Figure 55:
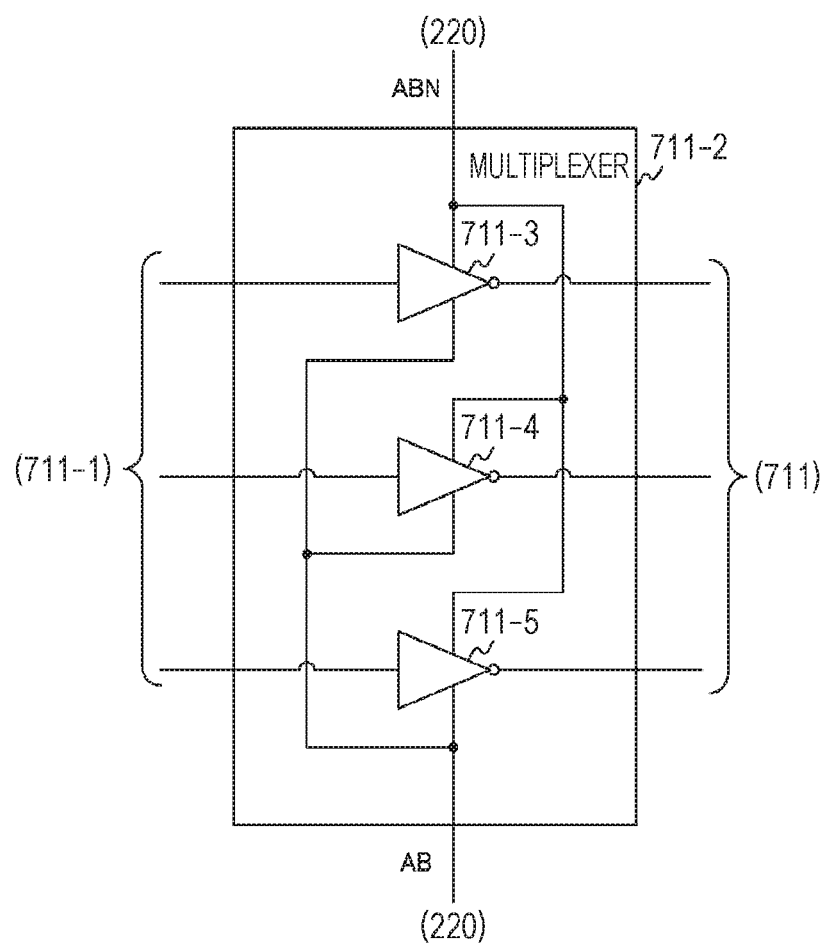
FIG. 55 is a circuit diagram illustrating a configuration example of a multiplexer in the fifth embodiment.

FIG. 55 is a circuit diagram illustrating a configuration example of the multiplexer 711-2 in the fifth embodiment. The multiplexer 711-2 includes inverters 711-3, 711-4, and 711-5. Each of the inverters includes a differential input enable terminal, ABN is input to a power source side thereof, and AB is input to a ground side thereof. Each of the inverters 711-3, 711-4 and 711-5 inverts a signal input from the status transition limiting unit 711-1 and feed the inverted signal back to the input terminal of the status transition limiting unit 711 or the like. Note that configurations of the multiplexers 712, 713, 714, 715, 716, 717, 721, 723, 724, 725, 726, 727, 731, 732, 734, 735, 736 and 737 are similar to that of the multiplexer 711-2. Further, configurations of the multiplexers 741, 742, 743, 745, 746, 747, 751, 752, 753, 754, 756, 757, 761, 762, 763, 764, 765, and 767 are similar to that of the multiplexer 711-2.

With the above configuration, the clock signals CkU, CkV, and CkW in which a frequency is ⅓ of that on the transmission side, and phases are different from one another are generated.

As described above, according to the fifth embodiment of the present technology, since the receiving circuit 200 separates the reception signal into the data signals of 3 systems, the receiving circuit 200 is able to delay the transfer speed of the data signal to be later than when the reception signal is separated into 2 systems.

Note that the above embodiments are examples for carrying out the present technology, and matters in the embodiment and invention specifying matters in claims have a correspondence relation. Similarly, the invention specifying matters in claims and the matters in the embodiments of the present technology having the same name have a correspondence relation. However, the present technology is not limited to the embodiment and may be implemented by variously modifying the embodiments within the scope not departing from the gist thereof.

Further, the processing procedure described in the above embodiments may be regarded as a method having a series of procedures and may be regarded as a program causing a computer to execute the series of procedures or a recording medium having the program stored therein. For example, a compact disc (CD), a mini disc (MD), a digital versatile disc (DVD), a memory card, or a Blu-ray (a registered trademark) disc can be used as the recording medium.

Note that the effects described herein are not necessarily limited, and any of the effects described in the present disclosure may be included.

Note that the present technology may have the following configuration.

(1) A receiving circuit including:
a timing signal generating unit that generates a plurality of timing signals indicating different timings in synchronization with a timing at which a status of a reception signal transitions;
a first data signal generating unit that generates, each time a predetermined first timing signal among the plurality of timing signals becomes a specific value, a first data signal from statuses of the reception signal before and after a timing at which the predetermined first timing signal becomes the specific value, and outputs the first data signal in synchronization with a second timing signal different from the first timing signal among the plurality of timing signals; and
a second data signal generating unit that generates, each time the second timing signal becomes the specific value, a second data signal from statuses of the reception signal before and after timing at which the second timing signal becomes the specific value, and outputs the second data signal in synchronization with a timing signal different from the first timing signal among the plurality of timing signals.

(2) The receiving circuit according to (1), further including a separating unit that separates the statuses of the reception signal into a first status just before the first timing signal becomes the specific value and a second status just before the second timing signal becomes the specific value,
in which the first data signal generating unit generates data indicating a transition pattern from the first status to the second status as the first data signal, and
the second data signal generating unit generates data indicating a transition pattern from the second status to the first status as the second data signal.

(3) The receiving circuit according to (1) or (2),
in which the timing signal generating unit includes
a binary counter circuit that counts a 1-bit counter value each time the reception signal transitions and outputs a signal of the counter value as the first timing signal, and
a second timing signal generating circuit that generates a signal obtained by inverting the first timing signal as the second timing signal.

(4) The receiving circuit according to (3),
in which the binary counter circuit includes
a plurality of latch circuits associated with different statuses, and
a multiplexer,
each of the plurality of latch circuits holds an inverted signal obtained by inverting a feedback signal in a case where the reception signal transitions to the corresponding status, and
the multiplexer inverts the held inverted signal, feeds the held inverted signal back to the plurality of latch circuits as a new feedback signal, and outputs the new feedback signal as the first timing signal.

(5) The receiving circuit according to (1), further including a third data signal generating unit that generates, each time a third timing signal different from the first and second timing signals among the plurality of timing signals becomes a specific value, a third data signal from statuses of the reception signal before and after a timing at which the third timing signal becomes the specific value, and outputs the third data signal in synchronization with the first timing signal,
in which the second data signal generating unit outputs the second data signal in synchronization with the third timing signal.

(6) The receiving circuit according to (5),
in which the clock signal generating unit includes a senary counter circuit that counts a 3-bit counter value each time the status transitions, separates the counter value into the first, second, and third timing signals, and outputs the first, second, and third timing signals.

(7) The receiving circuit according to (1), further including:
a third data signal generating unit that generates, each time a third timing signal different from the first and second timing signals among the plurality of timing signals becomes a specific value, a third data signal from statuses of the reception signal before and after a timing at which the third timing signal becomes the specific value, and outputs the third data signal in synchronization with a fourth timing signal different from the first, second, and third timing signals among the plurality of timing signals; and
a fourth data signal generating unit that generates, each time the fourth timing signal becomes a specific value, a fourth data signal from statuses of the reception signal before and after a timing at which the fourth timing signal becomes the specific value, and outputs the fourth data signal in synchronization with the first timing signal,
in which the second data signal generating unit outputs the second data signal in synchronization with the third timing signal.

(8) The receiving circuit according to (7),
in which the timing signal generating unit includes
a quaternary counter circuit that counts a 2-bit counter value each time the reception signal transitions, and
a counter value decoder that analyzes the counter value and generates the first, second, third, and fourth timing signals on the basis of an analysis result.

(9) An electronic device, including:
a receiving circuit that generates a plurality of timing signals indicating different timings in synchronization with a timing at which a status of a reception signal transitions; and
a processing circuit including a first data signal generating unit that generates, each time a predetermined first timing signal among the plurality of timing signals becomes a specific value, a first data signal from statuses of the reception signal before and after a timing at which the predetermined first timing signal becomes the specific value, and outputs the first data signal in synchronization with a second timing signal different from the first timing signal among the plurality of timing signals, and a second data signal generating unit that generates, each time the second timing signal becomes the specific value, a second data signal from statuses of the reception signal before and after timing at which the second timing signal becomes the specific value, and outputs the second data signal in synchronization with a timing signal different from the first timing signal among the plurality of timing signals.

(10) The electronic device according to (9),
in which the receiving circuit includes
a timing signal generating unit that generates the plurality of timing signals, and a separating unit that separates statuses of the reception signal into a first status just before the first timing signal becomes the specific value and a second status just before the second timing signal becomes the specific value, the first data signal generating unit generates data indicating a transition pattern from the first status to the second status as the first data signal, and the second data signal generating unit generates data indicating a transition pattern from the second status to the first status as the second data signal.

(11) The electronic device according to (10),
in which the separating unit includes
a first latch circuit that holds a signal obtained by inverting a previous feedback signal each time the status of the reception signal transitions to the first status and outputs the held value as an output signal,
a second latch circuit that holds a signal obtained by inverting the previous output signal each time the status of the reception signal transitions to the second status, and outputs the held value as the feedback signal,
a first inverting unit that outputs a signal obtained by inverting the output signal as first status data indicating the first status, and
a second inverting unit that outputs a signal obtained by inverting the feedback signal as second status data indicating the second status.

(12) The electronic device according to (11), further including
a status transition limiting circuit that limits the transition pattern of the output signal to a plurality of specific patterns.

(13) The electronic device according to (11), further including
a converting unit that converts the reception signal into a new reception signal having a different number of statuses,
in which the timing signal generating unit generates the first and second timing signals from the new reception signal.

(14) The electronic device according to (13),
in which the converting unit converts the reception signal in which the number of statuses is 6 into the new reception signals in which the number of statuses is 3.

(15) The electronic device according to (14),
in which the converting unit counts a counter value each time the status of the reception signal transitions and supplies a signal indicating the counter value to the timing signal generating unit as the new reception signal.

(16) The electronic device according to (14) or (15), further including
a transfer speed converting unit that converts the reception signal into a plurality of new reception signals having a transfer speed slower than the reception signal and supplies any one of the plurality of reception signals to the timing signal generating unit and the separating circuit.

(17) A transmission/reception system, including:
a transmitting circuit that transmits a transmission signal;
a timing signal generating unit that receives the transmission signal as a reception signal and generates a plurality of timing signals indicating different timings in synchronization with a timing at which a status of the reception signal transitions;
a first data signal generating unit that generates, each time a predetermined first timing signal among the plurality of timing signals becomes a specific value, a first data signal from statuses of the reception signal before and after a timing at which the predetermined first timing signal becomes the specific value, and outputs the first data signal in synchronization with a second timing signal different from the first timing signal among the plurality of timing signals; and
a second data signal generating unit that generates, each time the second timing signal becomes the specific value, a second data signal from statuses of the reception signal before and after timing at which the second timing signal becomes the specific value, and outputs the second data signal in synchronization with a timing signal different from the first timing signal among the plurality of timing signals.

(18) A receiving circuit control method, including:
a timing signal generating process of generating a plurality of timing signals indicating different timings in synchronization with a timing at which a status of a reception signal transitions;
a first data signal generating process of generating, each time a predetermined first timing signal among the plurality of timing signals becomes a specific value, a first data signal from statuses of the reception signal before and after a timing at which the predetermined first timing signal becomes the specific value, and outputting the first data signal in synchronization with a second timing signal different from the first timing signal among the plurality of timing signals; and
a second data signal generating process of generating, each time the second timing signal becomes the specific value, a second data signal from statuses of the reception signal before and after timing at which the second timing signal becomes the specific value, and outputting the second data signal in synchronization with a timing signal different from the first timing signal among the plurality of timing signals.

REFERENCE SIGNS LIST

100 Electronic device
110 AD converting unit
120 Transmitting circuit
130 Processing circuit
140 Clock generating unit
200 Receiving circuit
210 Ternary-to-binary converting unit
211 to 213 Resistor
214, 215, 216 Comparator
220 High-speed data decoder
221 to 226, 271 to 276, 281 to 286, 289 to 294 Logical product (AND) gate
230, 520 Separating unit
231 to 236 Separating circuit
240, 250, 620, 630 Status detecting circuit
241, 245, 251, 255 Exclusive logical sum (XOR) gate
242 to 244, 252 to 254, 261 to 266 Flip flop
260, 298, 400 to 403 Low-speed data decoder
267, 277 to 279, 287, 288, 295 to 297 Logical sum (OR) gate
270 Same phase generating unit
280 Data phase generating unit
300 Clock signal generating unit
310 Binary counter circuit
311 to 316 Latch circuit
317 to 326, 331 Inverter
327, 328 P-type transistor
329, 330 N-type transistor

The invention claimed is:

1. A receiving circuit comprising:
   a timing signal generating unit that generates a plurality of timing signals indicating different timings in synchronization with a timing at which a status of a reception signal transitions;
   a first data signal generating unit that generates, each time a predetermined first timing signal among the plurality of timing signals becomes a specific value, a first data signal from statuses of the reception signal before and after a timing at which the predetermined first timing signal becomes the specific value, and outputs the first data signal in synchronization with a second timing signal different from the first timing signal among the plurality of timing signals; and
   a second data signal generating unit that generates, each time the second timing signal becomes the specific value, a second data signal from statuses of the reception signal before and after timing at which the second timing signal becomes the specific value, and outputs the second data signal in synchronization with a timing signal different from the first timing signal among the plurality of timing signals.

2. The receiving circuit according to claim 1, further comprising
   a separating unit that separates the statuses of the reception signal into a first status just before the first timing signal becomes the specific value and a second status just before the second timing signal becomes the specific value,
   wherein the first data signal generating unit generates data indicating a transition pattern from the first status to the second status as the first data signal, and
   the second data signal generating unit generates data indicating a transition pattern from the second status to the first status as the second data signal.

3. The receiving circuit according to claim 1,
   wherein the timing signal generating unit includes
   a binary counter circuit that counts a 1-bit counter value each time the reception signal transitions and outputs a signal of the counter value as the first timing signal, and
   a second timing signal generating circuit that generates a signal obtained by inverting the first timing signal as the second timing signal.

4. The receiving circuit according to claim 1, further comprising
   a third data signal generating unit that generates, each time a third timing signal different from the first and second timing signals among the plurality of timing signals becomes a specific value, a third data signal from statuses of the reception signal before and after a timing at which the third timing signal becomes the specific value, and outputs the third data signal in synchronization with the first timing signal,
   wherein the second data signal generating unit outputs the second data signal in synchronization with the third timing signal.

5. The receiving circuit according to claim 4,
   wherein the clock signal generating unit includes a senary counter circuit that counts a 3-bit counter value each time the status transitions, separates the counter value into the first, second, and third timing signals, and outputs the first, second, and third timing signals.

6. The receiving circuit according to claim 3,
   wherein the binary counter circuit includes
   a plurality of latch circuits associated with different statuses, and
   a multiplexer,
   each of the plurality of latch circuits holds an inverted signal obtained by inverting a feedback signal in a case where the reception signal transitions to the corresponding status, and
   the multiplexer inverts the held inverted signal, feeds the held inverted signal back to the plurality of latch circuits as a new feedback signal, and outputs the new feedback signal as the first timing signal.

7. The receiving circuit according to claim 1, further comprising:
   a third data signal generating unit that generates, each time a third timing signal different from the first and second timing signals among the plurality of timing signals becomes a specific value, a third data signal from statuses of the reception signal before and after a timing at which the third timing signal becomes the specific value, and outputs the third data signal in synchronization with a fourth timing signal different from the first, second, and third timing signals among the plurality of timing signals; and
   a fourth data signal generating unit that generates, each time the fourth timing signal becomes a specific value, a fourth data signal from statuses of the reception signal before and after a timing at which the fourth timing signal becomes the specific value, and outputs the fourth data signal in synchronization with the first timing signal,
   wherein the second data signal generating unit outputs the second data signal in synchronization with the third timing signal.

8. The receiving circuit according to claim 7,
   wherein the timing signal generating unit includes
   a quaternary counter circuit that counts a 2-bit counter value each time the reception signal transitions, and
   a counter value decoder that analyzes the counter value and generates the first, second, third, and fourth timing signals on the basis of an analysis result.

9. An electronic device, comprising:
   a receiving circuit that generates a plurality of timing signals indicating different timings in synchronization with a timing at which a status of a reception signal transitions; and
   a processing circuit including a first data signal generating unit that generates, each time a predetermined first timing signal among the plurality of timing signals becomes a specific value, a first data signal from statuses of the reception signal before and after a timing at which the predetermined first timing signal becomes the specific value, and outputs the first data signal in synchronization with a second timing signal different from the first timing signal among the plurality of timing signals, and a second data signal generating unit that generates, each time the second timing signal becomes the specific value, a second data signal from statuses of the reception signal before and after timing at which the second timing signal becomes the specific value, and outputs the second data signal in synchronization with a timing signal different from the first timing signal among the plurality of timing signals.

10. The electronic device according to claim 9,
    wherein the receiving circuit includes
    a timing signal generating unit that generates the plurality of timing signals, and
    a separating unit that separates statuses of the reception signal into a first status just before the first timing signal becomes the specific value and a second status just before the second timing signal becomes the specific value, the first data signal generating unit generates data indicating a transition pattern from the first status to the second status as the first data signal, and the second data signal generating unit generates data indicating a transition pattern from the second status to the first status as the second data signal.

11. The electronic device according to claim 10, wherein the separating unit includes a first latch circuit that holds a signal obtained by inverting a previous feedback signal each time the status of the reception signal transitions to the first status and outputs the held value as an output signal, a second latch circuit that holds a signal obtained by inverting the previous output signal each time the status of the reception signal transitions to the second status, and outputs the held value as the feedback signal, a first inverting unit that outputs a signal obtained by inverting the output signal as first status data indicating the first status, and a second inverting unit that outputs a signal obtained by inverting the feedback signal as second status data indicating the second status.

12. The electronic device according to claim 11, further comprising a status transition limiting circuit that limits the transition pattern of the output signal to a plurality of specific patterns.

13. The electronic device according to claim 11, further comprising a converting unit that converts the reception signal into a new reception signal having a different number of statuses, wherein the timing signal generating unit generates the first and second timing signals from the new reception signal.

14. The electronic device according to claim 13, wherein the converting unit converts the reception signal in which the number of statuses is 6 into the new reception signals in which the number of statuses is 3.

15. The electronic device according to claim 14, wherein the converting unit counts a counter value each time the status of the reception signal transitions and supplies a signal indicating the counter value to the timing signal generating unit as the new reception signal.

16. The electronic device according to claim 14, further comprising a transfer speed converting unit that converts the reception signal into a plurality of new reception signals having a transfer speed slower than the reception signal and supplies any one of the plurality of reception signals to the timing signal generating unit and the separating circuit.

17. A transmission/reception system, comprising:

a transmitting circuit that transmits a transmission signal;

a timing signal generating unit that receives the transmission signal as a reception signal and generates a plurality of timing signals indicating different timings in synchronization with a timing at which a status of the reception signal transitions;

a first data signal generating unit that generates, each time a predetermined first timing signal among the plurality of timing signals becomes a specific value, a first data signal from statuses of the reception signal before and after a timing at which the predetermined first timing signal becomes the specific value, and outputs the first data signal in synchronization with a second timing signal different from the first timing signal among the plurality of timing signals; and a second data signal generating unit that generates, each time the second timing signal becomes the specific value, a second data signal from statuses of the reception signal before and after timing at which the second timing signal becomes the specific value, and outputs the second data signal in synchronization with a timing signal different from the first timing signal among the plurality of timing signals.

18. A receiving circuit control method, comprising:

a timing signal generating process of generating a plurality of timing signals indicating different timings in synchronization with a timing at which a status of a reception signal transitions;

a first data signal generating process of generating, each time a predetermined first timing signal among the plurality of timing signals becomes a specific value, a first data signal from statuses of the reception signal before and after a timing at which the predetermined first timing signal becomes the specific value, and outputting the first data signal in synchronization with a second timing signal different from the first timing signal among the plurality of timing signals; and a second data signal generating process of generating, each time the second timing signal becomes the specific value, a second data signal from statuses of the reception signal before and after timing at which the second timing signal becomes the specific value, and outputting the second data signal in synchronization with a timing signal different from the first timing signal among the plurality of timing signals.

* * * * *

UNITED STATES PATENT AND TRADEMARK OFFICE
CERTIFICATE OF CORRECTION

PATENT NO. : 10,171,228 B2
APPLICATION NO. : 15/554362
DATED : January 1, 2019
INVENTOR(S) : Hajime Hosaka It is certified that error appears in the above-identified patent and that said Letters Patent is hereby corrected as shown below:

On the Title Page

Page 2, Column 1, Line 7, Item (56) Foreign Patent Documents:
Please replace "JP 2010-520175," with --JP 2010-520715--

Signed and Sealed this
Nineteenth Day of February, 2019

Andrei Iancu
*Director of the United States Patent and Trademark Office*